(12) United States Patent
Webster et al.

(10) Patent No.: US 11,827,804 B2
(45) Date of Patent: Nov. 28, 2023

(54) CURABLE COATING COMPOSITIONS CONTAINING GLYCIDYL CARBAMATE RESINS AND AMPHIPHILIC GLYCIDYL-CARBAMATE-FUNCTIONAL PREPOLYMERS HAVING FOULING-RELEASE AND ANTI-ICING PROPERTIES

(71) Applicant: NDSU RESEARCH FOUNDATION, Fargo, ND (US)

(72) Inventors: Dean C. Webster, Fargo, ND (US); AliReza Rahimi, N Royalton, OH (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 52 days.

(21) Appl. No.: 17/162,227

(22) Filed: Jan. 29, 2021

(65) Prior Publication Data

US 2022/0243091 A1    Aug. 4, 2022

(51) Int. Cl.
| | |
|---|---|
| *C09D 175/04* | (2006.01) |
| *C08K 5/00* | (2006.01) |
| *C09D 5/16* | (2006.01) |
| *C09K 3/18* | (2006.01) |
| *C08G 18/75* | (2006.01) |

(Continued)

(52) U.S. Cl.
CPC ........... *C09D 175/04* (2013.01); *C08G 18/12* (2013.01); *C08G 18/2845* (2013.01); *C08G 18/4833* (2013.01); *C08G 18/61* (2013.01); *C08G 18/755* (2013.01); *C08G 18/7893* (2013.01); *C08G 77/16* (2013.01); *C08G 77/20* (2013.01); *C08K 5/0025* (2013.01); *C08K 5/17* (2013.01); *C08L 77/00* (2013.01); *C09D 5/1637* (2013.01); *C09D 163/00* (2013.01); *C09K 3/18* (2013.01)

(58) Field of Classification Search
None
See application file for complete search history.

(56) References Cited

U.S. PATENT DOCUMENTS

| | | | |
|---|---|---|---|
| 2,617,269 | A | 11/1952 | Smith-Johannsen |
| 7,989,074 | B2 | 8/2011 | Webster et al. |

(Continued)

OTHER PUBLICATIONS

Wong et al., Nature 2011, 477 (7365), 443-447.
(Continued)

*Primary Examiner* — Jeffrey D Washville
(74) *Attorney, Agent, or Firm* — RAPHAEL BELLUM PLLC

(57) ABSTRACT

The invention relates to a curable coating composition comprising at least one glycidyl carbamate (GC) resin, at least one amphiphilic GC-functional prepolymer, and at least one curing agent. The invention also relates to a method of making the curable coating compositions. The invention also relates to an article of manufacture comprising the curable coating composition of the invention and a method of making such article. The invention also relates to a fouling-release (FR) coating system and an anti-coating system, each of which comprises the curable coating compositions of the invention, methods of applying the FR coating systems and anti-coating systems to substrates, and methods for reducing or preventing biofouling or icing of a surface exposed to an aqueous environment using the FR coating systems.

26 Claims, 23 Drawing Sheets

(51) Int. Cl.
- C08G 18/48 (2006.01)
- C08G 18/28 (2006.01)
- C08G 18/61 (2006.01)
- C08G 18/78 (2006.01)
- C08G 77/16 (2006.01)
- C08G 77/20 (2006.01)
- C08G 18/12 (2006.01)
- C08K 5/17 (2006.01)
- C08L 77/00 (2006.01)
- C09D 163/00 (2006.01)

(56) References Cited

U.S. PATENT DOCUMENTS

| | | | |
|---|---|---|---|
| 8,604,152 | B2 | 12/2013 | Webster et al. |
| 8,629,210 | B2 | 1/2014 | Webster et al. |
| 9,169,359 | B2 | 10/2015 | Webster et al. |
| 10,647,878 | B2 | 5/2020 | Webster et al. |
| 10,759,950 | B2 | 9/2020 | Webster et al. |
| 2009/0171459 | A1* | 7/2009 | Linhardt ............ C08F 130/08 427/2.24 |
| 2010/0319580 | A1* | 12/2010 | Webster ............ C08G 65/3322 524/590 |
| 2011/0263753 | A1* | 10/2011 | Harkal ............ C09D 163/00 523/415 |
| 2019/0309187 | A1 | 10/2019 | Webster et al. |
| 2021/0292573 | A1 | 9/2021 | Webster et al. |
| 2021/0348021 | A1 | 11/2021 | Webster et al. |
| 2022/0025209 | A1 | 1/2022 | Webster et al. |
| 2022/0119651 | A1 | 4/2022 | Webster et al. |
| 2022/0243091 | A1 | 8/2022 | Webster et al. |

OTHER PUBLICATIONS

Wyszogrodzka et al., Biomacromolecules 2009, 10 (5), 1043-1054.
Yamada et al., Langmuir 2019, 35 (50), 16401-16406.
Yebra et al., Progress in Organic Coatings 2004, 50 (2), 75-104.
Yi et al., Applied Surface Science 2019, 480, 923-933.
Zhang et al., Coatings 2018, 8 (5), 157-157.
Zhu et al., ACS Applied Materials and Interfaces 2013, 5 (10), 4053-4062.
Zhu et al., Langmuir 2016, 32 (5), 1338-1346.
Pieper et al., J. Coatings Tech. & Res., 4(4), 453-461 (2007).
Jung et al., Langmuir 2011, 27 (6), 3059-3066.
Jung et al., Nature Communications 2012, 3, 615.
Karmouch et al., IEEE Electrical Power & Energy Conference 2009, 1-6.
Konstantinou et al., Environment International 2004, 30 (2), 235-248.
Kulinich et al., Langmuir 2010, 27 (1), 25-29.
Lafuma et al., EPL 2011, 96 (5), 56001.
Landy et al., Journal of Colloid and Interface Science 1967, 25 (2), 231-244.
Lejars et al., Chemical Reviews 2012, 112 (8), 4347-4390.
Li et al., ACS Applied Materials and Interfaces 2017, 9 (27), 22959-22969.
Li et al., Applied Surface Science 2014, 316, 222-231.
Li et al., Thin Solid Films 2014, 573, 67-73.
Liu et al., Journal of Colloid and Interface Science 2016, 480, 91-101.
Lv et al., ACS Nano 2014, 8 (4), 3152-3169.
Magin et al., Materials Today 2010, 13 (4), 36-44.
Maitra et al., Nano Letters 2013, 14 (1), 172-182.
Majumdar et al., ACS Combinatorial Science 2011, 13 (3), 298-309.
Martinelli et al., Polymer 2018, 145, 426-433.
Marwitz et al., Bulletin of the American Meteorological Society 1997, 78 (1), 41-52.
Menini et al., Cold Regions Science and Technology 2011, 65 (1), 65-69.
Menini et al., Journal of Adhesion Science and Technology 2011, 25 (9), 971-992.
Menini et al., Surface & Coatings Technology 2009, 203 (14), 1941-1946.
Mishchenko et al., ACS Nano 2010, 4 (12), 7699-7707.
Owens et al., Journal of Applied Polymer Science 1969, 13, 1741-1747.
Petrone et al., Biofouling 2011, 27 (9), 1043-1055.
Pollack et al., ACS Applied Materials and Interfaces 2014, 6 (21), 19265-19274.
Ratay et al., Proceedings of the Royal Society A 1958, 245 (1241), 184-201.
Rasulev et al., ACS Applied Materials and Interfaces 2017, 9 (2), 1781-179.
Rath et al., JCT Research 2018, 15 (1), 185-198.
Ravindran et al., Polymer Degradation and Stability 2010, 95 (7), 1160-1166.
Rittschof et al., Biofouling 2008, 24 (1), 1-9.
Rittschof et al., Scientia Marina 1989, 53 (2), 411-416.
Rykaczewski et al., Langmuir 2013, 29 (17), 5230-5238.
Saito et al., Surface Coatings International 1997, 80, 168-171.
Salmon et al., British Journal of Industrial Medicine 1985, 42 (12), 795-798.
Selim et al., Superhydrophobic Polymer Coatings 2019, 181-203.
Selim et al., ChemistrySelect 2019, 4 (12), 3395-3407.
Sojoudi et al., Soft Matter 2016, 12 (7), 1938-1963.
Sommer et al., Biofouling 2010, 26 (8), 961-972.
Sonnenschein, Polyurethanes: Science, Technology, Markets, and Trends 2014.
Stafslien et al., Journal of Coatings Technology and Research 2012, 9 (6), 651-665.
Stafslien et al., Review of Scientific Instruments 2007, 78 (7), 072204-072204.
Stafslien, et al., Biofouling 2007, 23 (1), 45-54.
Tan et al., Polymer Chemistry 2010, 1, 276-279.
Tourkine et al., Langmuir 2009, 25 (13), 7214-7216.
Upadhyay et al., Journal of Coatings Technology and Research 2013, 10 (6), 865-878.
Upadhyay et al., Progress in Organic Coatings 2017, 112, 191-199.
Van Zoelen et al., ACS Macro Letters 2014, 3 (4), 364-368.
Varanasi et al., Applied Physics Letters 2010, 97 (23), 234102.
Wang et al., Macromolecules 2011, 44 (4), 878-885.
Wilson et al., Physical Chemistry Chemical Physics 2013, 15 (2), 581-585.
Aldred et al., Biofouling 2019, 35 (2), 159-172.
Aldred et al., Biofouling 2010, 26 (6), 673-683.
Andersson et al., Accident Analysis and Prevention 2011, 43 (1), 284-289.
Antonini et al., Cold Regions Science and Technology 2011, 67 (1-2), 58-67.
Beemer et al., Journal of Materials Chemistry A 2016. 4 (47), 18253-18258.
Bellucci et al., Corrosion 1993, 49 (3), 235-247.
Bierwagen et al., Progress in Organic Coatings 2000, 39 (1), 67-78.
Bierwagen et al., Progress in Organic Coatings 2003, 46, 148-157.
Bodkhe et al., Journal of Coatings Technology and Research 2012, 9, 235-249.
Bodkhe et al., Progress in Organic Coatings 2012, 75, 38-48.
Bodkhe et al., Progress in Organic Coatings 2015, 78, 369-380.
Boinovich et al., Langmuir 2014, 30 (6), 1659-1668.
Brasher et al., Journal of Applied Chemistry 1954, 4 (2), 62-72.
Callow et al., Applied and Environmental Microbiology 2000, 66 (8), 3249-3254.
Callow et al., Biologist 2002, 49 (1), 10-14.
Callow et al., Journal of the Royal Society Interface 2005, 2 (4), 319-325.
Callow et al., Nature Communications 2011, 2 (1), 244-244.
Callow et al., Biofouling Methods 2014, 10, 291-316.
Casse et al., Biofouling 2007, 23 (2), 121-130.
Cassé et al., Biofouling 2007, 23 (4), 267-276.
Charles et al., Thorax 1976, 31 (2), 127-36.
Chattopadhyay et al., Progress in Organic Coatings 2008, 63 (4), 405-415.

(56) References Cited

OTHER PUBLICATIONS

Chattopadhyay et al., Progress in Organic Coatings 2009, 64 (2-3), 128-137.
Chattopadhyay et al., Progress in Organic Coatings 2009, 66 (1), 73-85.
Chen et al., ACS Applied Materials & Interfaces 2017, 9 (4), 4202-4214.
Cui et al., Journal of Colloid and Interface Science 2020, 558, 251-258.
Dalili et al., Renewable and Sustainable Energy Reviews 2009, 13 (2), 428-438.
Darmanin et al., Journal of Materials Chemistry A 2014, 2 (39), 16319-16359.
Deflorian et al., Electrochimica Acta 1999, 44 (24), 4243-4249.
DeGaetano, Bulletin of the American Meteorological Society 2000, 81 (2), 237-254.
Di Fino et al., Biofouling 2014, 30 (2), 143-152.
Dotan et al., Journal of Adhesion Science and Technology 2009, 23 (15), 1907-1915.
Edwards et al., JCT Research 2005, 2 (7), 517-527.
Edwards et al., Progress in Organic Coatings 2006, 57 (2), 128-139.
Finlay et al., Integrative and Comparative Biology 2002, 42 (6), 1116-1122.
Fisher, The British Medical Journal 1936, 1 (3923), 554.
Galhenage et al., ACS Applied Materials & Interfaces 2016, 8 (42), 29025-29036.
Galhenage et al., JCT Research 2017, 14 (2), 307-322.
Gatley-Montross et al., Biointerphases 2017, 12 (5), 051003.
Gent et al., Philosophical Transactions: Mathematical, Physical and Engineering Sciences 2000, 358 (1776), 2873-2911.
Gudipati et al., Langmuir 2005, 21 (7), 3044-3053.
Harkal et al., JCT Research 2010, 7 (5), 531-546.
Harkal et al., JCT Research 2013, 10 (2), 141-151.
Harkal et al., Progress in Organic Coatings 2012, 73 (1), 19-25.
Hejazi et al., Scientific Reports 2013, 3, 2194.
Hu et al., Langmuir 2020, 36 (9), 2170-2183.
Huggett et al., Biofouling 2009, 25 (5), 387-399.
Iguerb et al., Langmuir 2008, 24 (21), 12272-12281.
Irajizad et al., Nature Communications 2016, 7 (1), 13395.
Jiang et al., Advanced Materials 2010, 22 (9), 920-932.

\* cited by examiner

CURABLE COATING COMPOSITIONS CONTAINING GLYCIDYL CARBAMATE RESINS AND AMPHIPHILIC GLYCIDYL-CARBAMATE-FUNCTIONAL PREPOLYMERS HAVING FOULING-RELEASE AND ANTI-ICING PROPERTIES

STATEMENT OF U.S. GOVERNMENT SUPPORT

This invention was supported by the Department of the Navy Office of Naval Research under Grant number N00014-16-1-3064. The U.S. government has certain rights in the invention.

BACKGROUND OF THE INVENTION

Marine biofouling is recognized as the undesirable settlement of marine organisms on submerged surfaces in seawater. Callow et al., Nat. Commun. 2011, 2 (1), 244-244. Marine biofouling causes many issues such as increased drag, reduced maneuverability, high fuel consumption, and even transportation of invasive species. Lejars et al., Chem. Rev. 2012, 112 (8), 4347-4390; Callow et al., Biologist 2002, 49 (1), 10-14. As an example, the US Navy spends $1 billion per year to maintain their ships from biofouling. Callow et al., Biologist 2002, 49 (1), 10-14; Magin et al., Mater. Today 2010, 13 (4), 36-44. Marine biofouling is a complex problem since reports indicate that more than 4000 marine organisms, involving various surface affinities and mechanisms of adhesion, can potentially biofoul a surface. Callow et al., Nat. Commun. 2011, 2 (1), 244-244; Lejars et al., Chem. Rev. 2012, 112 (8), 4347-4390; Yebra et al., Prog. Org. Coat. 2004, 50 (2), 75-104.

Ships have been around for thousands of years and humans developed a variety of systems to fight biofouling. Initially, copper alloys and lead sheaths opposed biofouling on hulls of ships, but they had limitations in terms of metallic corrosion and availability of resources. Biocide-containing antifouling paints and tributyltin-based self-polishing coatings were eventually introduced as alternatives in 1900s. Despite their stellar performance, the novel systems caused toxic effects on aquatic environments, resulting in a worldwide ban of tin-containing marine coatings by International Marine Organization (IMO) and motivating the development of non-toxic antifouling and fouling-release coating systems. Lejars et al., Chem. Rev. 112 (8), 4347-4390; Konstantinou et al., Environ. Int. 2004, 30 (2), 235-248.

Current antifouling (AF) coatings typically contain copper-based biocides with organic booster biocides to contend with biofouling. Copper is less toxic than tin, but it still has potential to poison ecosystems. Alternatively, fouling-release (FR) systems offer non-toxic and environmental-friendly solution to tackle biofouling. Instead of leaching biocides, FR systems function by forbidding strong adhesion of biofoulants to the surface of a structure and facilitating their release under hydrodynamic pressure. Callow et al., Nat. Commun. 2011, 2 (1), 244-244; Lejars et al., Chem. Rev. 2012, 112 (8), 4347-4390. Thus, FR systems have been favored due to the absence of biocides in their design.

Traditionally, FR systems are made of elastomeric materials such as polydimethylsiloxane (PDMS) and fluoroalkyl polymers. These materials are widely explored due to their low surface energy that delays biofouling and acts as a driving force for the fouling-release mechanism. Wyszogrodzka et al., Biomacromolecules 2009, 10 (5), 1043-1054; Lejars et al., Chem. Rev. 2012, 112 (8), 4347-4390. Nevertheless, the low surface energy materials suffer from durability (adhesion and mechanical), requiring a tie-coat to attain proper adhesion to a surface. Lejars et al., Chem. Rev. 2012, 112 (8), 4347-4390; Yebra et al., Prog. Org. Coat. 2004, 50 (2), 75-104. Hydrophobic siloxane-polyurethane (SiPU) FR coatings have shown promising performance to address the limitations of the traditional FR systems such as durability and the need for a tie-coat. The SiPU FR system takes advantage of self-stratification of the non-polar low-surface-energy PDMS over the polar PU layer, while both layers are connected through covalently-bonded crosslinks. Sommer et al., Biofouling 2010, 26 (8), 961-972; Bodkhe et al., J. Coating. Tech. Res. 2012, 9 (3), 235-249

Hydrophobic FR systems like SiPU demonstrate a great potential to fight biofouling, but such systems still lack desirable performance against some organisms. Hu et al., Langmuir 2020, 36 (9), 2170-2183; Selim et al., Chemistry Select 2019, 4 (12), 3395-3407; Selim et al., Chapter 8—Superhydrophobic foul resistant and self-cleaning polymer coating. In Superhydrophobic Polymer Coatings, Samal et al., Eds. Elsevier: 2019; pp 181-203. There are organisms out of the ~4000 biofoulants in seawater that prefer to settle on a hydrophobic system. Yebra et al., Prog. Org. Coot. 2004, 50 (2), 75-104. For example, diatom (N. incerta) attaches strongly to a hydrophobic system while barnacles or mussels prefer a hydrophilic surface. Therefore, amphiphilic systems that contain both hydrophilic and hydrophobic moieties on the surface have been investigated to deter biofouling of a wider range of marine organisms. Lejars et al., Chem. Rev. 2012, 112 (8), 4347-4390; Iguerb et al., Langmuir 2008, 24 (21), 12272-12281; Rath et al., J. Coating. Tech. Res. 2018, 15 (1), 185-198; Yi et al., Appl. Surf. Sci. 2019, 480, 923-933; Zhang et al., Coatings 2018, 8 (5), 157-157; Galhenage et al., J. Coating. Tech. Res. 2017, 14 (2), 307-322.

Amphiphilic coatings also have exhibited promising performance for anti-icing. Chen et al., ACS Appl. Mater. Interfaces 2017, 9 (4), 4202-4214; Upadhyay et al., Prog. Org. Coat. 2017, 112, 191-199; Li et al., ACS Appl. Mater. Interfaces 2017, 9 (27), 22959-22969. Amphiphilic systems show icephobic characteristic via a "self-lubricating" mechanism where the PEG component strongly hydrogen-bonds with water molecules. Chen et al., ACS Appl. Mater. Interfaces 2017, 9 (4), 4202-4214. This mechanism prevents the water molecules from freezing and serves as a self-lubricating interfacial layer that diminishes the strength of ice adhesion. Icephobic surfaces offer desired advantages for many applications including transportation, infrastructure, and energy systems. Andersson et al., Accid. Anal. Prey. 2011, 43 (1), 284-289; Gent et al., Philos. Trans. R. Soc. A: Mathematical, Physical and Engineering Sciences 2000, 358 (1776), 2873-2911; Antonini et al., Cold Reg. Sci. Technol. 2011, 67 (1-2), 58-67; Dalili et al., Renew. Sust. Energ. Rev. 2009, 13 (2), 428-438. The accumulation and adhesion of ice causes significant damage to exposed surfaces such as wind turbine blades and results in undesirable situations such as mechanical failure. Marwitz et al., Bull. Am. Meteorol. Soc. 1997, 78 (1), 41-52; DeGaetano, Bull. Am. Meteorol. Soc. 2000, 81 (2), 237-254. Not surprisingly, the quest for reliable anti-icing coatings has been going on for decades. Anti-icing or icephobic coatings have surfaces with low adhesion to ice (Menini et al., Cold Reg. Sci. Technol. 2011, 65 (1), 65-69; Menini et al., J. Adhes. Sci. Tech. 2011, 25 (9), 971-992; Hejazi et al., Sci. Rep. 2013, 3, 2194), though other definitions introduce such coatings as surfaces that delay ice nucleation or surfaces that repel water droplets below its freezing point (Hejazi et al., *Sci. Rep.* 2013, 3, 2194; Menini et al., *Surf. Coat. Technol.* 2009, 203 (14), 1941-1946; Jung et al., *Langmuir* 2011, 27 (6), 3059-3066; Jung et al., *Nat. Commun.* 2012, 3, 615; Maitra et al., *Nano letters* 2013, 14 (1), 172-182; Dotan et al., *J. Adhes. Sci. Tech.* 2009, 23 (15), 1907-1915).

(Super)Hydrophobic surfaces demonstrated primary avenues for anti-icing applications with their ability to trap air in the interface of a substrate and water to prevent wetting, resulting in a reduced contact area between the materials to form ice. Hejazi et al., *Sci. Rep.* 2013, 3, 2194; Jung et al., *Nat. Commun.* 2012, 3, 615; Maitra et al., *Nano letters* 2013, 14 (1), 172-182; Li et al., *Appl. Surf. Sci.* 2014, 316, 222-231; Li et al., *Thin Solid Films* 2014, 573, 67-73; Sojoudi et al., *Soft Matter* 2016, 12 (7), 1938-1963; Cui et al., *J. Colloid Interface Sci.* 2020, 558, 251-258; Darmanin et al., *J. Mater. Chem. A* 2014, 2 (39), 16319-16359; Tourkine et al., *Langmuir* 2009, 25 (13), 7214-7216; Varanasi et al., *Appl. Phys. Lett.* 2010, 97 (23), 234102; Kulinich et al., *Langmuir* 2010, 27 (1), 25-29; Mishchenko et al., *ACS Nano* 2010, 4 (12), 7699-7707; Boinovich et al., *Langmuir* 2014, 30 (6), 1659-1668; Yamada et al., *Langmuir* 2019, 35 (50), 16401-16406. The theory behind this approach is that a low surface energy of (super)hydrophobic surfaces will minimize the work of adhesion, and hence discourage ice accumulation. Dotan et al., *J. Adhes. Sci. Tech.* 2009, 23 (15), 1907-1915; Beemer et al., *J. Mater. Chem. A* 2016, 4 (47), 18253-18258; Raraty et al., *Proc. R. Soc. A. Mathematical and Physical Sciences* 1958, 245 (1241), 184-201. However, the presence of a high-energy solid-liquid interface is a major limitation of such surfaces, promoting well-adhered heterogeneous ice nucleation. Irajizad et al., *Nat. Commun.* 2016, 7 (1), 13395. Researchers have used a similar concept in developing antifouling/fouling-release (AF/FR) coatings as well. Lejars et al., *Chem. Rev.* 2012, 112 (8), 4347-4390; Magin et al., *Mater. Today* 2010, 13 (4), 36-44. The hydrophobic systems typically contain fluorocarbon-based (Menini et al., *Surf Coat. Technol.* 2009, 203 (14), 1941-1946; Karmouch et al., In *Icephobic PTFE coatings for wind turbines operating in cold climate conditions,* 2009; IEEE: pp 1-6; Saito et al., *Surf. Coat. Int.* 8: Coat. Trans. 1997, 80 (4), 168-171) and silicone-based materials (Dotan et al., *J. Adhes. Sci. Tech.* 2009, 23 (15), 1907-1915; Beemer et al., *J. Mater. Chem. A* 2016, 4 (47), 18253-18258) or a mixture of both (Dotan et al., *J. Adhes. Sci. Tech.* 2009, 23 (15), 1907-1915; Li et al., *Appl. Surf. Sci.* 2014, 316, 222-231; Li et al., *Thin Solid Films* 2014, 573, 67-73; Sojoudi et al., *Soft Matter* 2016, 12 (7), 1938-1963.). Slippery liquid-infused porous surfaces (SLIPS) are another recent approach for icephobicity. Wong et al., *Nature* 2011, 477 (7365), 443; Lafuma et al., *EPL (Europhysics Letters)* 2011, 96 (5), 56001; Wilson et al., *Phys. Chem. Chem. Phys.* 2013, 15 (2), 581-585. While SLIPS materials enhance the mobility of water droplets and reduce adhesion strength of ice, these surfaces lack longevity due to depletion of infused-liquid and instability under high shear flows. Lv et al., *ACS Nano* 2014, 8 (4), 3152-3169; Rykaczewski et al., *Langmuir* 2013, 29 (17), 5230-5238.

Amphiphilic surfaces have been explored using many approaches based on layer-by-layer polyanion-polycation (Zhu et al., *Langmuir* 2016, 32 (5), 1338-1346; Martinelli et al., *Polymer* 2018, 145, 426-433), hyperbranched (Gudipati et al., *Langmuir* 2005, 21 (7), 3044-3053; Pollack et al., *ACS Appl. Mater. Interfaces* 2014, 6 (21), 19265-19274), UV-cured (Wang et al., *Macromolecules* 2011, 44 (4), 878-885), zwitterionic (Bodkhe et al., *Prog. Org. Coat.* 2015, 78, 369-380; Jiang et al., *Adv. Mater.* 2010, 22 (9), 920-932; Liu et al., *J. Colloid Interface Sci.* 2016, 480, 91-101), self-stratification (Sommer et al., *Biofouling* 2010, 26 (8), 961-972; Bodkhe et al., *Prog. Org. Coat.* 2012, 75 (1-2), 38-48) and polypeptide/peptide-mimic chemistries. Van Zoelen et al., *ACS Macro Lett.* 2014, 3 (4), 364-368. Recently, PEG-modified amphiphilic SiPU systems have shown desirable fouling-release performance. Galhenage et al., *J. Coating. Tech. Res.* 2017, 14 (2), 307-322. The system is founded on an amphiphilic prepolymer: partial functionalization of an isocyanate resin with hydrophobic and hydrophilic moieties. The amphiphilic isocyanate-based prepolymer, isocyanate resin, and acrylic polyol constitute the coating system. Even though there are health concerns for workers who use isocyanates in 2K coating formulations as a final product (Salmon et al., *Occup. Environ. Med.* 1985, 42 (12), 795-798; Charles et al., *Thorax* 1976, 31 (2), 127-36; Sonnenschein, *Polyurethanes: science, technology, markets, and trends.* Hoboken, N J, 2015), it is tough to discard the desired properties that urethane linkages contribute to a coating system. Thus, there is a need for a solution that reduces the exposure of workers to isocyanates as a final product while it still sustains the benefits of isocyanate.

Glycidyl-carbamate (GC) coating systems have been introduced as a viable alternative to deliver both properties of urethane linkage and isocyanate-free formulations. Chattopadhyay et al., *Prog. Org. Coat.* 2009, 66 (1), 73-85; Harkal et al., *J. Coating. Tech. Res.* 2010, 7 (5), 531-546; Harkal et al., *J. Coating. Tech. Res.* 2013, 10 (2), 141-151; Edwards et al., *J. Coating. Tech. Res.* 2005, 2 (7), 517-527; Chattopadhyay et al., *Prog. Org. Coat.* 2009, 64 (2-3), 128-137; Chattopadhyay et al., *Prog. Org. Coat.* 2008, 63 (4), 405-415; Edwards et al., *Prog. Org. Coat.* 2006, 57 (2), 128-139; Ravindran et al., *Polym. Degrad. Stab.* 2010, 95 (7), 1160-1166; Harkal et al., *Prog. Org. Coat.* 2012, 73 (1), 19-25. GC coatings are composed of a GC resin which can undergo either polycondensation curing with an amine (Harkal et al., *J. Coating. Tech. Res.* 2013, 10 (2), 141-151) or self-crosslinking (Edwards et al., *Prog. Org. Coat.* 2006, 57 (2), 128-139). A GC resin is facily synthesized by reaction of an isocyanate resin with glycidol, generating a urethane/carbamate linkage and introducing epoxy functional groups. Thus, a GC resin offers highly sought urethane properties combined with epoxy groups for facile curing chemistries.

Disclosed herein are amphiphilic fouling-release coatings utilizing glycidyl-carbamate technology. New synthetic methods to re-functionalize a commercially-available isocyanate resin with epoxy functional groups to access an isocyanate-based epoxy resin and with amphiphilic chains to attain fouling-release performance are disclosed. Thermodynamic principles were applied to utilize self-stratification of low surface energy components like PDMS-containing materials to the surface. Bodkhe et al., *J. Coating. Tech. Res.* 2012, 9 (3), 235-249. In addition to efforts to find a facile synthesis for attaching PEG and PDMS chains in the same backbone (which usually requires several steps), a series of coatings to find answers for three dimensions that paves the way for effective design of amphiphilic systems is disclosed: 1) Optimum molecular weight of PDMS and PEG for a system, 2) Optimum total weight of PEG and PDMS in a system, and 3) Effect of cross-linking agent. To this effect, the synthesis and characterization of glycidyl-carbamate (GC)-based resin and amphiphilic prepolymers and their incorporation in developing amphiphilic self-stratified fouling-release coatings are also disclosed.

Also disclosed herein are icephobic amphiphilic glycidyl-carbamate-based coatings that can be applied in a single step, taking advantage of self-stratification of covalently-bonded PEG and PDMS to the surface. Two criteria were considered: 1) As tackling ice adhesion is a complex problem, the solution requires to find the optimum balance of hydrophilic and hydrophobic components that is not well understood (Chen et al., *ACS Appl. Mater. Interfaces* 2017, 9 (4), 4202-4214), and 2) A facile synthesis method should be used that eases the incorporation of PEG and PDMS chains in a backbone which usually requires several steps (Lejars et al., *Chem. Rev.* 2012, 112 (8), 4347-4390). Hence, three aspects of the developed amphiphilic glycidyl-carbamate (GC)-based (urethane-based) coating systems (AmpSiGC) are disclosed. First, the synthesis of GC resin and amphiphilic prepolymers are disclosed and their characterization using Fourier transform infrared spectroscopy (FTIR) and epoxy titration is disclosed. Second, the results of ice-adhesion tests, electrochemical impedance spectroscopy (EIS), and mechanical tests are disclosed. Third, surface characterization of the coatings using ATR (attenuated total reflectance)-FTIR, X-ray photoelectron spectroscopy (XPS), and atomic force microscopy (AFM) is disclosed.

SUMMARY OF THE INVENTION

The invention relates to a curable coating composition comprising at least one glycidyl carbamate (GC) resin, at least one amphiphilic GC-functional prepolymer, and at least one curing agent. The invention also relates to a method of making the curable coating compositions.

The invention also relates to an article of manufacture comprising the curable coating composition of the invention and a method of making such article.

The invention also relates to a fouling-release (FR) coating system comprising the curable coating compositions of the invention, methods of applying the FR coating systems to substrates, and methods for reducing or preventing biofouling of a surface exposed to an aqueous environment using the FR coating systems.

The invention also relates to an anti-icing coating system comprising the curable coating compositions of the invention, methods of applying the anti-icing coating systems to substrates, and methods for reducing or preventing icing of a surface exposed to an aqueous environment using the anti-icing coating systems.

BRIEF DESCRIPTION OF THE FIGURES

FIG. 2(A) Spectra of coatings with ranging degree of amphiphilicity from 5 wt. % to 20 wt. % of 750 $\overline{M}_n$ PEG and 10,000 $\overline{M}_n$ PDMS; and FIG. 2(B) Spectra of F11 and F14 coatings crosslinked with PACM and 702B75 crosslinkers, respectively. Each spectra is labeled to reflect a coating ID and its composition.

FIG. 3(A) Water contact angles (WCA) and methylene iodide contact angles (MICA) as a function of time at 0 minute and 6 minutes; and FIG. 3(B) Surface energy (SE) of the coatings at 0 minute and 6 minutes, calculated by Owens-Wendt method utilizing the average WCAs and MICAs for each coating. The X-axis is labeled to specify the formulations and its components including PEG MW, PDMS MW, wt. % of PEG and PDMS, and crosslinker type.

FIG. 4(A) Water droplet slip angle (roll-off angle for water to slide from a surface); and FIG. 4(B) Advancing contact angle (Adv CA) and receding contact angle (Rec CA) data, measured by tilting method. The X-axis is labeled to specify the formulations and its components including PEG MW, PDMS MW, wt. % of PEG and PDMS, and crosslinker type.

FIG. 5(A) XPS depth profile analysis for coating F8 (10-10 kPDMS-750PEG system), indicating self-stratification of the PDMS-based materials into the surface; FIG. 5(B) XPS depth profile data for silicon atom for coatings F4 (5 wt. %), F8 (10 wt. %), F10 (15 wt. %), and F11 (20 wt. %) that demonstrates effect of amount of amphiphilic prepolymers in a system on the surface composition; and FIG. 5(C) XPS depth profile data for coatings F8 (PACM-cured) and F13 (702B75-cured), comparing effect of crosslinker type on self-stratification and surface composition.

FIG. 15(A) Water Contact Angles (WCA) and methylene iodide contact angles (MICA) as a function of time at 0 minutes and 6 minutes; FIG. 15(B) Surface energy (SE) of coatings at 0 minute and 6 minutes, calculated by Owens-Wendt method utilizing the average WCAs and MICAs for each coating; FIG. 15(C) Slip angle of coatings where a water droplet starts to roll off; and FIG. 15(D) Advancing contact angle (Adv CA) and receding contact angle (Rec CA) data, measured by tilting method. X-axis is labeled to specify the formulation and its components including PEG MW, PDMS MW, and wt. % of PEG and PDMS.

FIG. 17(A) Depth profiling XPS data for coating F8 (10%-10 kPDMS-750PEG formulation), demonstrating self-stratification of PDMS-containing materials on to the surface; and FIG. 17(B) Depth profiling XPS data for Si atom of coatings F4, F8, F9, and F10 that contain 5, 10, 15, 20 wt. % of PEG and PDMS each in their composition, illustrating the extent of self-stratification and presence of PDMS directly depends on the incorporated amount of a prepolymer.

DESCRIPTION OF THE INVENTION

Figure 1:
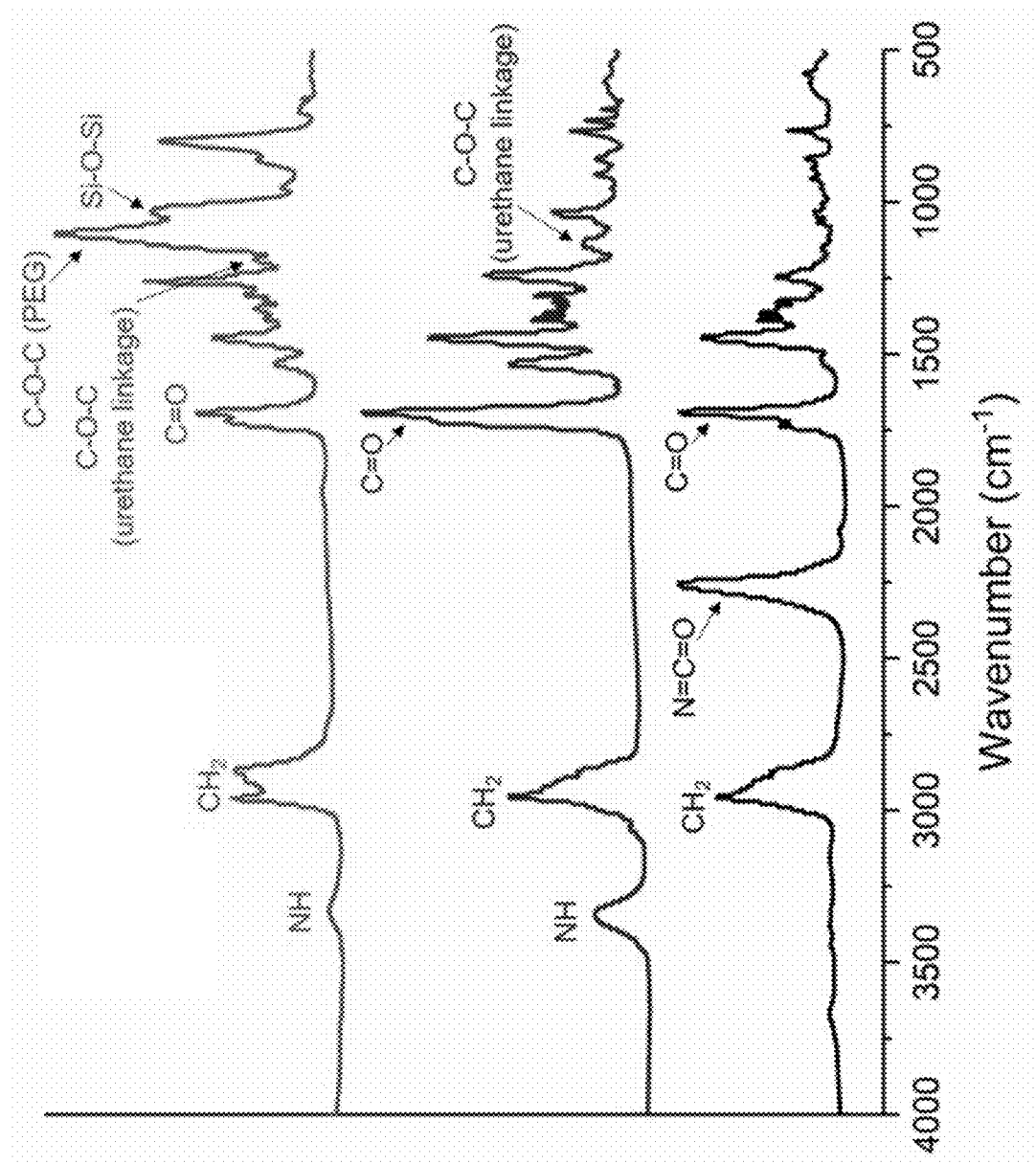
FIG. 1 shows the FTIR spectrum for the IPDI trimer resin (black line), GC resin (red line), and amphiphilic prepolymer 10 kPDMS-750PEG (blue line).

The invention relates to a curable coating composition comprising, consisting essentially of, or consisting of:
   a) at least one glycidyl carbamate (GC) resin,
   b) at least one amphiphilic GC-functional prepolymer, and
   c) at least one curing agent.

The at least one GC resin, a), comprises, consists essentially of, or consists of the reaction product of:
   a1) at least one organic polyisocyanate, and
   a2) glycidol.

The at least one amphiphilic GC-functional prepolymer, b), comprises, consists essentially of, or consists of the reaction product of:
   b1) at least one organic polyisocyanate,
   b2) glycidol,
   b3) at least one poly(ethylene glycol) methyl ether (mPEG), and
   b4) at least one polydimethylsiloxane (PDMS).

Organic Polyisocyanate

The at least one organic polyisocyanate, a1) and b1), are, independent of one another, any suitable organic polyisocyanate, such as an aliphatic, cycloaliphatic, araliphatic, or aromatic polyisocyanate, either singly or in mixtures of two or more. The aliphatic isocyanates provide generally better light stability than the aromatic compounds. Aromatic polyisocyanates, on the other hand, are generally more economical and reactive toward polyols and other poly(active hydrogen) compounds than aliphatic polyisocyanates. Suitable aromatic polyisocyanates include, but are not limited to, those selected from the group consisting of 2,4-toluene diisocyanate, 2,6-toluene diisocyanate, a dimer of toluene diisocyanate (available under the Desmodur® trademark from Covestro LLC (formerly Bayer Materials Science), Leverkusen, Germany, diphenyl methane 4,4'-diisocyanate (MDI), 1,5-diisocyanato-naphthalene, 1,4-phenylene diisocyanate, 1,3-phenylene diisocyanate, fluorinated and/or silicone containing derivatives of the aforementioned, and mixtures thereof. Examples of useful cycloaliphatic polyisocyanates include, but are not limited to, those selected from the group consisting of dicyclohexylmethane diisocyanate ($H_{12}$ MDI, commercially available under the Desmodur® trademark from Covestro LLC (Bayer Materials Science), Leverkusen, Germany, isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane ($H_6$ XDI), and mixtures thereof. Examples of useful aliphatic polyisocyanates include, but are not limited to, those selected from the group consisting of hexamethylene 1,6-diisocyanate (HDI), 1,5-pentanediisocyanate (PDI) 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, and mixtures thereof. Examples of useful araliphatic polyisocyanates include but are not limited to those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, or mixtures thereof. Preferably, the organic polyisocyanate may be a polyfunctional resin derived from isocyanate or biuret selected from the group consisting of TDI (toluene diisocyanate), TDI biuret, MDI (diphenyl methane diisocyanate), MDI biuret, HDI (hexamethylene diisocyanate), HDI biuret, NDI (naphthalene diisocyanate), NDI biuret, HMDI (hydrogenated MDI), HMDI biuret, and IPDI (isophorone diisocyanate), and IPDI biuret. More preferably, the organic polyisocyanate is IPDI. For example, the organic polyisocyanate, a1) and b1), may each be an isophorone diisocyanate trimer.

Exemplary organic polyisocyanates include those of formula (I) and (II) below:

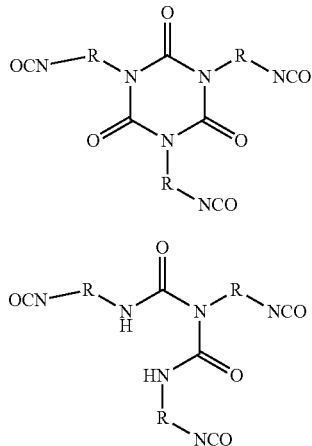

In formulas (I) and (II), R is independently an optionally substituted, divalent $C_1$-$C_{15}$ alkyl, an optionally substituted $C_3$-$C_{15}$ cycloalkyl, or a group selected from:

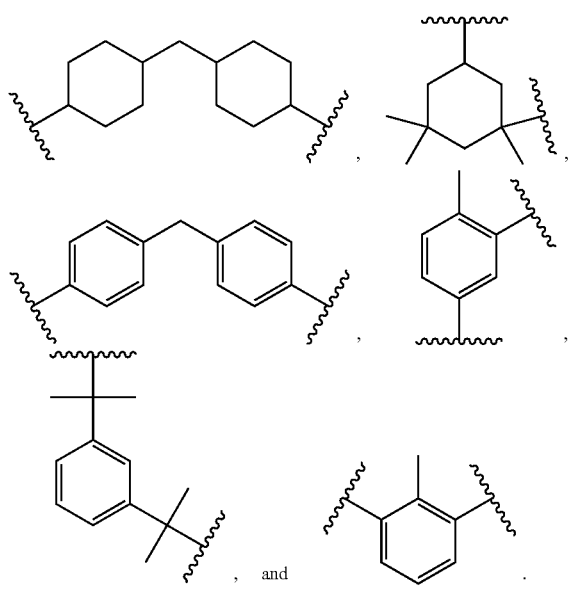

The divalent group R in formulas (I) and (II) may be a $C_2$-$C_{10}$ straight chain or branched alkyl, preferably a $C_4$-$C_8$ straight chain alkyl, pentyl, or hexyl.

Poly(Ethylene Glycol) Methyl Ether (mPEG)

The mPEG, b3), has a molecular weight ranging from about 350 $\overline{M}_n$ to 20,000 $\overline{M}_n$ (e.g., 500 $\overline{M}_n$ to 10,000 $\overline{M}_n$, 750 $\overline{M}_n$ to 5,000 $\overline{M}_n$, 1,000 $\overline{M}_n$ to 2,500 $\overline{M}_n$). Preferably, the mPEG has a molecular weight ranging from about 550 $\overline{M}_n$ to 750 $\overline{M}_n$. The mPEG is present in amount ranging from 0 to about 50 wt. % (e.g., 0.01-50 wt. %, 0.1-40 wt. %, 1-30 wt. %, 5-25 wt. %), based on the solid content of the amphiphilic GC-functional prepolymer. Preferably, the mPEG is present in amount ranging from about 5-20 wt. %, based on the solid content of the amphiphilic GC-functional prepolymer.

Polydimethylsiloxane (PDMS)

The PDMS, b4), has a molecular weight ranging from about 400 $\overline{M}_n$ to 50,000 $\overline{M}_n$ (e.g., 1,000 $\overline{M}_n$ to 25,000 $\overline{M}_n$, 5,000 $\overline{M}_n$ to 20,000 $\overline{M}_n$, 10,000 $\overline{M}_n$ to 15,000 $\overline{M}_n$). Preferably, the PDMS has a molecular weight ranging from about 5000 $\overline{M}_n$ to 10,000 $\overline{M}_n$.

The PDMS may be, for example, a hydroxy-terminated PDMS. The hydroxy-terminated PDMS may have the following general structure:

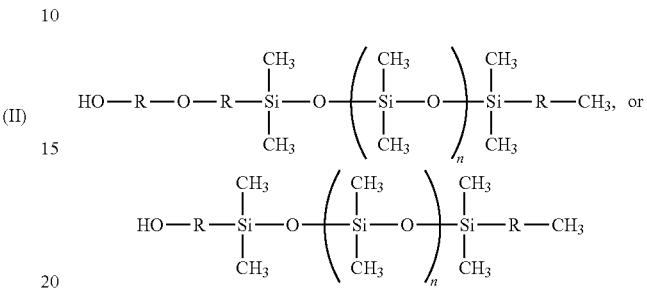

wherein R, independent of one another, is a $C_3$-$C_{12}$ straight chain alkyl or an alkylene ether; and wherein n ranges from 0 to about 270. The variable "n" may be varied such that the molecular weight of the monocarbinol-terminated PDMS may range from about 400 $\overline{M}_n$ to 50,000 $\overline{M}_n$, preferably from about 5000 $\overline{M}_n$ to 10,000 $\overline{M}_n$.

The PDMS may be a monocarbinol-terminated PDMS. The monocarbinol-terminated PDMS may have the following general structure:

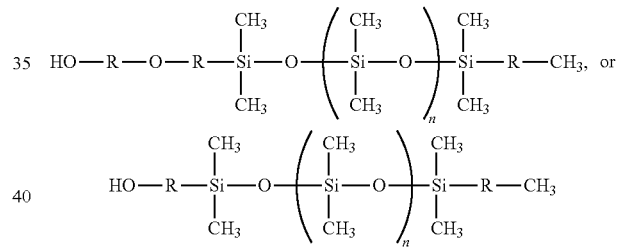

wherein R, independent of one another, is a $C_3$-$C_{12}$ straight chain alkyl or an alkylene ether; and wherein n ranges from 0 to about 270. The variable "n" may be varied such that the molecular weight of the monocarbinol-terminated PDMS may range from about 400 $\overline{M}_n$ to 50,000 $\overline{M}_n$, preferably from about 5000 $\overline{M}_n$ to 10,000 $\overline{M}_n$.

The PDMS is present in amount ranging from 0 to about 50 wt. % (e.g., 0.01-50 wt. %, 0.1-40 wt. %, 1-30 wt. %, 5-25 wt. %), based on the solid content of the amphiphilic GC-functional prepolymer. Preferably, the PDMS is present in amount ranging from about 5-20 wt. %, based on the solid content of the amphiphilic GC-functional prepolymer.

Curing Agent

The at least one curing agent may be an amine functional curing agent. The amine functional curing agent may be an amine crosslinker, a polyamide crosslinker, or mixtures thereof.

The at least one curing agent includes, but is not limited to, PACM (bis(para-aminocyclohexyl)methane), polyamines, polyamides, or mixtures thereof. Amine curing agents known in the art that may be used in the invention include, for example, diethylenetriamine, triethylenetetramine, tetraethylene-pentamine, etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononae; 1,12-diaminododecane; 4-azaheptamethylenediamine; N,N"-bis(3-aminopropyl)butane-1,4-diamine; 1-ethyl-1,3-propanediamine; 2,2 (4),4-trimethyl-1,6-hexanediamin; bis(3-aminopropyl) piperazine; N-aminoethylpiperazine; N,N-bis(3-aminopropyl)ethylenediamine; 2,4(6)-toluenediamine; dicyandiamide; melamine formaldehyde; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclo-hexane; 1,2-diamino-4-cyclohexylcyclohexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl) cyclohexane; and 1-cyclohexyl-3,4-dimino-cyelohexane. As exemplary aralipathic amines, in particular those amines are employed in which the amino groups are present on the aliphatic radical for example m- and p-xylylenediamine or their hydrogenation products as well as diamide diphenylmethane; diamide diphenylsulfonic acid (amine adduct); 4,4"-methylenedianiline; 2,4-bis(p-aminobenzyl)aniline; diethyltoluenediamine; and m-phenylene diamine. The amine curing agents may be used alone or as mixtures. Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above. Exemplary amine curing agents are PACM, such as Amicure® PACM. polyamines, such as Ancamine® 2143 or Ancamine® 2432, and polyamides, such as Ancamide® 2634, Ancamide® 2767, Ancamide® 702B75, diethylene triamine (DETA), and 4,4'-methylene dianiline (MDA). Preferably, the curing agent is selected from the group consisting of Ancamide® 702E375, Amicure® PACM, and mixtures thereof.

The amine functional curing agent may also be an aminopropyl-terminated PDMS. Aminopropyl-terminated PDMS may be added to the coating compositions to find the optimum formulation suited for fouling release (FR) applications. This amine functional curing agent can be used by itself or in mixtures with one of the curing agents listed above.

The ratio of the GC resin and amphiphilic GC-functional prepolymer to the curing agent may be varied. For example, the ratio of the GC resin and amphiphilic GC-functional prepolymer to the amine functional curing agent may be based on the stoichiometric ratio between the epoxy groups present in the GC resin and amphiphilic GC-functional prepolymer and the amine hydrogen groups present in the amine functional curing agent. The ratios of epoxy to amine hydrogen groups may be varied. For example, the stoichiometric ratio of epoxy to amine hydrogens may range from about 1:0.1 to about 1:3, from about 1:0.5 to about 1:2, or it may be about 1:1 to 1:2.

The invention also relates to a method for making the curable coating compositions of the invention, comprising, consisting essentially of, or consisting of: reacting the at least one organic polyisocyanate, a1), with the glycidol, a2), to make the at least one GC resin, a); reacting the at least one organic polyisocyanate, b1), with the glycidol, b2), the at least one mPEG, b3), and the at least one PDMS, b4) to make the at least one amphiphilic GC-functional prepolymer, b); and mixing the at least one GC resin, a) and the at least one amphiphilic GC-functional prepolymer, b), with the at least one curing agent, c), to make the curable coating composition of the invention.

The curable coating compositions of the invention, the GC resins, and/or the amphiphilic GC-functional prepolymers can be prepared in the presence of at least one optional solvent and/or at least one optional catalyst. The type and amount of solvent and catalyst used to prepare the curable coating compositions of the invention, the GC resins, and/or the amphiphilic GC-functional prepolymers may be the same or different. The solvent and catalyst may be used during any step of the synthesis of the curable coating compositions of the invention, the GC resins, and/or the amphiphilic GC-functional prepolymers.

The solvent that may be used in the invention includes, but is not limited to, toluene, xylenes, n-butyl acetate (nBA), t-butyl acetate (TBA), acetone, methyl ethyl ketone (MEK), methyl n-amyl ketone (MAK), N-methyl pyrollidone (NMP), ethyl 3-ethoxyproprionate (EEP), and mixtures thereof. The amount of solvent used may vary. For example, the solvent may be present in an amount of about 90%, preferably about 50%, and more preferably about 20% or less. A mixture of two or more solvents may be used, such as a mixture of toluene and EEP. In the case of the use of a mixture of solvents, for example a mixture of EEP and toluene, the amount of solvents used may be calculated such that the final resin has a target of 20%, preferably 50%, and more preferably 80%, solid in 50/50 w/w solvent blend of EEP and toluene. One or more solvents may be used to solubilize the resin.

The catalyst that may be used in the invention can be organometallic complexes, organic bases, or mixtures thereof. Examples of organometallic compounds include, but are not limited to, dibutyl tin dilaurate, dibutyl tin diacetate, bismuth carboxylate, and compounds of zirconium and aluminum, such as, but not limited to, K-Kat® 4205, K-Kat® 5218, and K-Kat® XC-6212. Examples of organic base catalysts includes, but is not limited to, 1,4-diazabicyclo[2.2.2]octane, which is sold under the DABCO® trade name by Air Products. The amount of catalyst used may vary. For example, the catalyst may be present in an amount ranging from 0.001-0.10%, preferably 0.005-0.05%, and more preferably 0.05%, weight of total solids.

The GC resin can be prepared by a variety of methods, including, but not limited to, the methods described below in the examples and generally depicted in Scheme 1— Route 1. In preparing the GC resin, the at least one organic polyisocyanate, a1), and the glycidol, a2), may be reacted in a 1:1 equivalent ratio of NCO:OH. A slight excess of the at least one organic polyisocyanate can be used in the reaction. Also, an excess of glycidol can be used in the reaction to ensure complete consumption of the organic isocyanate, but may be removed prior to using the GC resin in the curable coating compositions of the invention, for example.

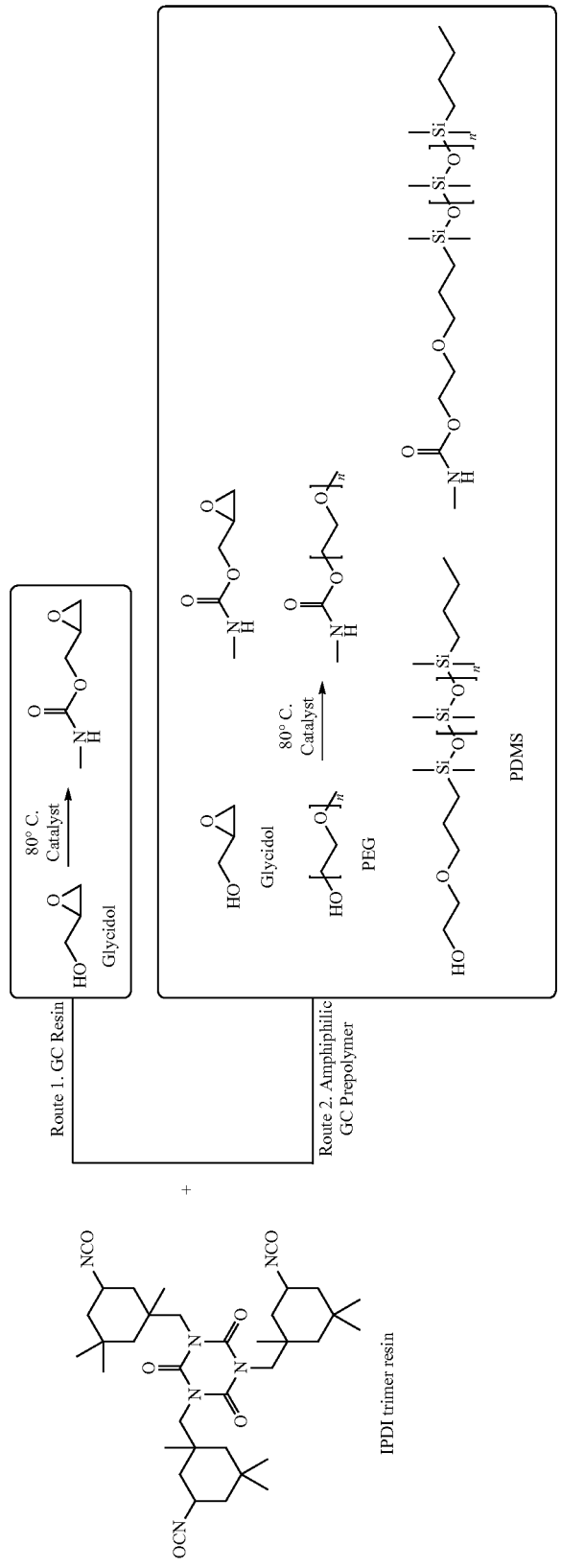

The reaction to make the GC resins may be carried out from about 40° C. to about 90° C., more preferably from about 50° C. to about 80° C. For example, the GC resin may be made by reacting the glycidol with the at least one organic polyisocyanate and at least one solvent, at about 80° C. The reaction may be carried out for any period of time necessary to react the at least one organic polyisocyanate with the glycidol, for example, 0.5-5 hours, preferably 1-2 hours, more preferably 1-1.5 hours. The GC resin reaction may also be completed at ambient conditions for about 24 hours. At least one optional catalyst may be added at any point during this reaction. Completion of the reaction may be determined, for example, by the disappearance of the NCO peak at 2250 cm-1 and appearance of the secondary amine (due to the formation of the urethane linkage) and ether peaks at 3350 cm-1 and 1128 cm-1, respectively, as observed using FTIR.

The amphiphilic GC-functional prepolymer can be prepared by a variety of methods, including, but not limited to, the methods described below in the examples and generally depicted in Scheme 1—Route 2. In preparing the amphiphilic GC-functional prepolymer, the ratio of stoichiometric equivalents of isocyanate:hydroxyl groups of glycidol+PDMS+mPEG is preferably 1:1 (for example, preferably, the ratio of NCO:PDMS-OH:mPEG-OH:glycidol is 6:2:2:2). For example, glycidol may be used to functionalize about 33.3% of the NCO groups and the remaining 66.6% of the NCO groups may be converted to urethane linkages by attachment of mPEG and/or PDMS chains. The PDMS and/or mPEG can be used in the amount of 0.01 to 0.9 equivalents relative to NCO, preferably 0.05 to 0.5 equivalents, most preferably 0.05 to 0.2 equivalents. Also, an excess of glycidol can be used in the reaction to ensure complete consumption of isocyanate, but may be removed prior to using the resin in coatings of the invention, for example. The at least one organic polyisocyanate, glycidol, and PDMS and/or mPEG may be reacted step-wise (e.g., in a first step, the at least one organic polyisocyanate is reacted with the PDMS and/or mPEG, and in a second step, glycidol is reacted with the product of the first step, or in a first step, the at least one organic polyisocyanate is reacted with glycidol, and in a second step, the PDMS and/or mPEG is reacted with the product of the first step) or in a one-pot procedure.

The reaction to make the amphiphilic GC-functional prepolymers may be carried out from about 40° C. to about 90° C., more preferably from about 50° C. to about 80° C. For example, the amphiphilic GC-functional prepolymer may be made by reacting the at least one organic polyisocyanate, the glycidol, the PDMS and/or mPEG, and at least one solvent, at about 80° C. The reaction may be carried out for any period of time necessary to react the at least one organic polyisocyanate with the glycidol and PDMS and/or mPEG, for example, 0.5-5 hours, preferably 1-2 hours, more preferably 1-1.5 hours. At least one optional catalyst may be added at any point during this reaction. Completion of the reaction may be determined, for example, by the complete disappearance of the isocyanate signal and appearance of the urethane linkage signal, and the appearance of the overlapping stretching for siloxane (Si—O—Si of PDMS) at 1030 cm$^{-1}$ and/or ether (C—O—C of PEG) at 1105 cm$^{-1}$, confirming attachment of the amphiphilic chains.

Pigments, Additives, Solvents, and Fillers

Pigments and other additives known in the art to control coating rheology and surface properties can also be incorporated in a curable coating composition of the invention. For example, a curable coating composition of the invention may further contain coating additives. Such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents that may be used in the coatings of the invention include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents that may be used in the curable coating compositions of the invention include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Solvents may also be added to the curable coating compositions of the invention to reduce the viscosity, some of which may also be used in the synthesis of the GC resins and/or amphiphilic GC-functional prepolymers, as discussed above. For example, hydrocarbon, ester, ketone, ether, ether-ester, alcohol, or ether-alcohol type solvents may be used individually or in mixtures. Examples of solvents that can be added to the curable coating compositions of the invention include, but are not limited to benzene, toluene, xylene, aromatic 100, aromatic 150, acetone, methylethyl ketone, methyl amyl ketone, butyl acetate, t-butyl acetate, tetrahydrofuran, diethyl ether, ethylethoxy propionate, isopropanol, butanol, butoxyethanol, and so on. Alternatively, the solvent system may include water or be water-based (>50% water in the solvent system).

Fillers may also be added to the curable coating compositions of the invention, including, but not limited to, calcium carbonate such as calcite, dolomite, talc, mica, feldspar, barium sulfate, kaolin, nephelin, silica, perlite, magnesium oxide, and quartz flour, etc. Fillers (and pigments) may also be added in the form of nanotubes or fibers, thus, apart from the before-mentioned examples of fillers, the curable coating composition may also comprise fibers, e.g., those generally and specifically described in WO 00/77102, incorporated herein by reference.

The curable coating compositions of the invention may be cured at ambient or elevated (e.g., about 80° C.) temperatures. The at least one curing agent, such as an amine functional curing agent, typically allows the coating to cure at ambient temperatures.

The invention also relates to a fouling-release (FR) coating system and an anti-icing coating system, each of which comprise, consist essentially of, or consist of at least one curable coating composition of the invention, and a method of applying the FR coating systems and anti-icing coating systems to substrates. "Fouling-release" means all types of bio-fouling of a surface (i.e., settlement of organisms on a surface), in particular surfaces exposed to an aqueous environment or to aqueous liquids (e.g., ship surfaces, within tanks, pipes, etc.). The FR coating systems described herein are particularly relevant for avoiding, limiting, or reducing marine bio-fouling, i.e., bio-fouling arising in connection with the exposure of a surface to a marine environment, in particular sea water. "Anti-icing" or "icephobic" means, in the context of coatings, surfaces with low adhesion to ice, surfaces that delay ice nucleation, or surfaces that repel water droplets below its freezing point.

The curable coating composition of the invention is typically applied to at least a part of the surface of a substrate. The term "applying" is used in its normal meaning within the paint industry. Thus, "applying" is conducted by means of any conventional means, e.g., by brush, by roller, by spraying (e.g., convention air-atomized spray, airless spray, HVLP), by dipping, by drawdown, etc. The commercially most interesting way of "applying" the curable coating composition of the invention is by spraying. Hence, the coating composition is preferably sprayable. Spraying is effected by means of conventional spraying equipment known to the person skilled in the art. The coating is typically applied in a dry film thickness of 50-600 such as 50-500 µm, e.g., 75-400 µm, or 20-150 µm, or 30-100 µm.

The term "at least a part of the surface of a substrate" refers to the fact that the curable coating composition of the invention may be applied to any fraction of the surface (or, for that matter, the entire surface). For many applications, the curable coating composition is at least applied to the part of the substrate (e.g., a vessel, wind turbine blades) where the surface (e.g., the ship's hull, surface of wind turbine blades) may come in contact with water (e.g., sea-water, freezing rain).

The term "substrate" means a solid material onto which the curable coating composition is applied. The substrate typically comprises a metal such as steel, iron, aluminum, or glass- or carbon-fiber composite, but also includes wood, plastic, and glass. The substrate may be a metal substrate, in particular a steel substrate. The substrate may also be a glass-fiber reinforced polyester substrate. The substrate may be at least a part of the outermost surface of a marine structure.

The term "surface" is used in its normal sense, and refers to the exterior boundary of an object. Particular examples of such surfaces are the surface of marine structures, such as vessels (including, but not limited to, boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, water-power installations and structures, underwater oil well structures, nets, and other aquatic culture installations, and buoys, etc.

The surface of the substrate may be the "native" surface (e.g., the steel surface). However, the substrate is typically coated, e.g., with an anticorrosive coating, so that the surface of the substrate is constituted by such a coating. When present, the anticorrosive coating is typically applied in a total dry film thickness of 20-200 µm, such as 50-150 e.g., 80-125 µm. Alternatively, the substrate may carry a paint coat, e.g., a worn-out fouling release paint coat, or similar. One advantage of the FR coating systems described herein is that they can be applied directly onto the primed surface without a tie-coat. However, the FR coating systems described herein can also be applied onto a tie-coat if desired.

The substrate may be a metal substrate (e.g., a steel substrate) coated with an anticorrosive coating such as an anticorrosive epoxy-based coating, e.g., cured epoxy-based coating, or a shop-primer, e.g., a zinc-rich shop-primer. The substrate may also be a glass-fiber reinforced polyester substrate coated with an epoxy primer coating.

The invention also relates to a method of establishing a FR coating system or an anti-icing coating system on at least a part of the surface of a substrate, comprising the step of applying one or more layers of at least one coating composition of the invention onto at least a part of the surface of the substrate, e.g., either a native substrate or a substrate already carrying one or more coatings, as the case may be, and allowing the layer(s) to cure.

The invention also relates to a method of establishing a FR coating system or an anti-icing coating system on at least a part of the surface of a substrate, comprising the sequential steps of: a) applying one or more layers of a primer composition onto at least a part of the surface of the substrate, and allowing the layer(s) to cure, thereby forming a primed substrate, b) optionally applying one or more layers of a tie-coat composition onto at least a part of the surface of the primed substrate, and allowing the layer(s) to cure, thereby forming a cured tie-coat; and c) applying one or more layers of at least one curable coating composition of the invention onto at least a part of the surface of the primed substrate or the surface of the tie-coat, as the case may be, and allowing the layer(s) to cure.

The invention further relates to a method of establishing a FR coating system or an anti-icing coating system on at least a part of the surface of an aged antifouling coating system, comprising the sequential steps of: a) applying one or more layers of a sealer/link-coat composition onto at least a part of the surface of the substrate, allowing the layer(s) to cure, thereby forming a sealed substrate, b) optionally applying one or more layers of a tie-coat composition onto at least a part of the surface of the sealed substrate, and allowing the layer(s) to cure, thereby forming a cured tie-coat; and c) applying one or more layers of at least one curable coating composition of the invention onto at least a part of the surface of the primed substrate or at least a part of the surface of the tie-coat, as the case may be, and allowing the layer(s) to cure.

The invention further relates to a method of establishing a FR coating system or an anti-icing coating system on at least a part of the surface of an aged fouling release coating system or an aged anti-icing coating system, comprising the sequential steps of: a) optionally applying one or more layers of a tie-coat composition onto at least a part of the surface of the aged fouling release coating system or aged anti-icing coating system, and allowing the layer(s) to cure, thereby forming a cured tie-coat; and b) applying one or more layers of at least one curable coating composition of the invention onto at least a part of the surface of the primed substrate or the surface of the tie-coat, as the case may be, and allowing the layer(s) to cure.

The invention also provides a marine structure comprising on at least a part of the outer surface thereof an outermost FR coating system as described herein. In particular, at least a part of the outer surface carrying the outermost coating is a submerged part of the structure.

The FR coating system of the marine structure may comprise or consist of an anticorrosive layer, a tie-coat, and the FR coating system as described herein.

The FR coating system may be applied on top of a used FR coating system, e.g., on top of a used coating composition of the invention.

The anticorrosive layer may have a total dry film thickness of 20-200 μm, such as 50-150 μm, e.g., 80-125 μm; the tie-coat has a total dry film thickness of 50-500 μm, such as 50-400 μm, e.g., 75-350 or 75-300 μm or 75-250 μm; and the coating of the FR coating system has a total dry film thickness of 20-500 μm, such as 20-400 μm, e.g., 50-200 μm.

Furthermore, at least a part of the outermost surface of the marine structure may be coated with a FR coating system comprising a total dry film thickness of 80-125 μm of an anticorrosive layer of an epoxy-based coating established by application of 1-4, such as 2-4, layers; a total dry film thickness of 20-400 μm of the tie-coat established by application of 1-2 layers; and a total dry film thickness of 20-400 μm of the coating of the FR coating system established by application of 1-2 layers.

The FR coating system may be applied directly on the anticorrosive layer without the use of tie-coat.

As also discussed above, the invention also relates to an article of manufacture comprising a curable coating composition of the invention and a method of making such article. The invention also provides methods for coating such substrates by applying the curable coating composition to the substrate. The coating may be cured at ambient temperatures or above.

EXAMPLES

1. Materials

Isophorone diisocyanate (IPDI) polyisocyanate Desmodur Z4470 BA was supplied by Covestro LLC. Monocarbinol-terminated polydimethylsiloxane (CT-PDMS) with two molecular weights of 5,000 $\overline{M}_n$ (MCR-C18) and 10,000 $\overline{M}_n$ (MCR-C22) were purchased from Gelest, Inc. Glycidol, poly(ethylene glycol) methyl ether (550 $\overline{M}_n$ and 750 $\overline{M}_n$) (m PEG), ethyl-3-ethoxy propionate, methyl ethyl ketone (MEK), methyl amyl ketone (MAK), hydrobromic acid (5.7 M), and dibutyltin diacetate (DBTDAc) were purchased from Sigma Aldrich. Toluene and glacial acetic acid (for epoxy titration) were purchased from VWR. Ancamide® 702B75 and Amicure® PACM crosslinkers were provided by Evonik Industries. All reagents were used as received.

AkzoNobel International Paint provided the commercial FR standards Intersleek® 700 (IS 700), Intersleek® 900 (IS 900), and Intersleek® 1100SR (IS 1100). Silicone elastomer, Silastic® T2 (T2) was provided by Dow Corning as another commercial standard. Hydrophobic A4-20 coating (A4-20), a siloxane-polyurethane system, was prepared as an internal control following the procedures described elsewhere. Bodkhe et al., J. Coating. Tech. Res. 2012, 9 (3), 235-249. Amphiphilic T-10 coating was prepared following the procedure elsewhere, an isocyanate-based formulation that contained 10 wt. % PEG 750 $\overline{M}_n$ and PDMS 10,000 $\overline{M}_n$. Galhenage et al., J. Coating. Tech. Res. 2017, 14 (2), 307-322. Aluminum and steel panels (4"×8" in., 0.6 mm thick, type A, alloy 3003 H14) purchased from Q-lab were sandblasted and primed with Intergard 264 (International Paint) using air-assisted spray application. Multi-well plates were modified using circular disks (1-inch diameter) of primed aluminum.

Phasebreak Flex MPD Anti-icing Coating (MPD), industrial coating control, was purchased from Microphase Coatings, Inc. Hydrophobic A4-20 coating (A4-20), internal coating control, a siloxane-polyurethane system without PEG, was prepared as an internal control following the procedures described elsewhere. Bodkhe et al., J. Coating. Tech. Res. 2012, 9 (3), 235-249

2. Synthesis of the Glycidyl Carbamate Resin and the Amphiphilic Glycidyl Carbamate Prepolymers 2.1 Synthesis of Glycidyl Carbamate Resin Polyisocyanate IPDI trimer Desmodur Z4470 was reacted with glycidol to prepare the glycidyl-carbamate (GC) resin, an epoxidized urethane-linkage-containing resin (Scheme 1— Route 1). The GC resin was produced by reacting the IPDI trimer resin with glycidol in 1:1 ratio of NCO:OH.

To synthesize the resin used for the fouling-release marine coatings and the anti-icing coating, 13.00 g of IPDI trimer (NCO eq wt.=253), 2.92 g glycidol, 0.48 g DBTDAc catalyst solution (1% by wt. in MAK) and 7.95 g toluene were added in a 50-mL three-neck flask, equipped with a magnetic stirrer, nitrogen inlet, and temperature controller. The reaction was carried at 80° C. for 2 hours. As another method, the reaction could also be completed at ambient condition for 24 hours. A reflux condenser was used when heat was applied.

2.2 Synthesis of Amphiphilic Glycidyl Carbamate Prepolymers

Amphiphilic GC prepolymers were synthesized by attaching epoxy functional groups and PEG and PDMS chains on the polyisocyanate IPDI trimer Desmodur Z4470 resin (Scheme 1— Route 2). The ratio of NCO groups to the combined OH groups was 1:1, where glycidol was used to functionalize 33.3% of the NCO groups and the remaining 66.6% isocyanate groups were converted to urethane linkages by attachment of PEG and PDMS chains. PEG and PDMS were added in equal weight ratios to meet the 66.6% required molar ratio.

As an example, to synthesize prepolymer 5-5 kPDMS-550PEG (Formulation F1, discussed below), PEG 550 $\overline{M}_n$ (2.50 g) was diluted in toluene (2.50 g) in a 50-mL flask. PDMS 5,000 $\overline{M}_n$ (2.50 g) was added to the flask and mixed vigorously using vortex for 2 minutes. Glycidol (0.13 g) was added to the flask and mixed for another 2 minutes. IPDI trimer resin (1.84 g) and DBTDAc catalyst solution (1% by wt. in MAK) (0.35 g) were then added to the flask. The reaction was carried at 80° C. for 2 hours. As another method, the reaction could also be completed at ambient condition for 24 hours. A reflux condenser was used when heat was applied. The flask was equipped with a magnetic stirrer, nitrogen inlet, and temperature controller. Theoretically, the synthesized prepolymer contained 38.5 wt. % PEG and 38.5 wt. % PDMS.

2.3 Synthesis and Curing of the Curable Coating Compositions

The GC resin and amphiphilic GC-functional prepolymer were mixed in a vial and stirred for 24 hours. Curing agent (e.g., PACM) was then added to the vial and stirred for another 20 minutes. The formulation was allowed to sit for 15 minutes to sweat-in before application. The formulation was applied to 8"×4" steel or aluminum substrates using a drawdown bar with a wet film thickness of 80 μm. Coatings with PACM crosslinker were oven-cured at 80° C. for 45 minutes and coatings with 702B75 crosslinker were cured ambiently for 8 hours. Formulation for the resin and prepolymer that was described before is provided here. To formulate coating 5-5 kPDMS-550PEG (Formulation F1), as an example, 2.85 g amphiphilic GC prepolymer (70.26% solid), 21.57 g GC resin (54.68% solid), and 1.6 g PACM crosslinker were used. All outlined formulations for this study in Table 1 were prepared in the same way. The highest amount of PEG and PDMS in a system using PACM as crosslinker was 20 wt. % (Formulation F11) and using 702B75 as crosslinker was 13 wt. % (Formulation F14). The highest amounts were determined by running a series of mechanical tests on the coatings such as hardness, impact, and solvent double rubs.

3. Amphiphilically-Modified, Self-Stratified Siloxane-Glycidyl Carbamate Coatings as Fouling-Release Marine Coating Systems and Anti-Icing Coating Systems 3.1 The Fouling-Release Marine Coating Systems The use of the amphiphilically-modified self-stratified siloxane-GC curable coating compositions as fouling-release marine coating systems were examined for four factors including molecular weight of PEG, molecular weight of PDMS, the amounts of PDMS and PEG in the coating system, and type of crosslinker. To assess these factors, three overlapping designs were utilized. Fisher, *Br Med J* 1936, 1 (3923), 554-554; Anderson et al., *Design of experiments: a realistic approach*. Routledge: 2018. First, an experimental design followed a 23 design, involving 8 coating formulations. For this design, each of the three factors had two levels: PEG in two molecular weights of 550 $\overline{M}_n$ and 750 $\overline{M}_n$; PDMS in two molecular weights of 5000 $\overline{M}_n$ and 10,000 $\overline{M}_n$; and PDMS and PEG amounts of 5 wt. % and 10 wt. % each based on solid contents. These eight formulations are F1-F8 in Table 1. To further evaluate effect of higher amphiphilic amounts in a system, three formulations that contained between 15 wt. % to 20 wt. % of PEG 550/750 $\overline{M}_n$ and PDMS 10,000 $\overline{M}_n$ were evaluated. These formulations result in comparison of formulations F4, F8, F9, F10, and F11 based on one variable (Table 1), amount of PEG and PDMS. To assess effect of crosslinking agent, three additional formulations were introduced that utilized Ancamide® 702B75 as a curing agent, allowing coatings F6, F8, F11, F12, F13, and F14 to be compared (Table 1).

TABLE 1

Fouling-Release Marine Coating Compositions

| Formulation | Formulation Type | PDMS MW ($\overline{M}_n$) | PDMS Wt. % | PEG MW ($\overline{M}_n$) | PEG Wt. % | Crosslinker |
|---|---|---|---|---|---|---|
| F1 | 5-5kPDMS-550PEG | 5,000 | 5 | 550 | 5 | PACM |
| F2 | 5-5kPDMS-750PEG | 5,000 | 5 | 750 | 5 | PACM |
| F3 | 5-10kPDMS-550PEG | 10,000 | 5 | 550 | 5 | PACM |
| F4 | 5-10kPDMS-750PEG | 10,000 | 5 | 750 | 5 | PACM |
| F5 | 10-5kPDMS-550PEG | 5,000 | 10 | 550 | 10 | PACM |
| F6 | 10-5kPDMS-750PEG | 5,000 | 10 | 750 | 10 | PACM |
| F7 | 10-10kPDMS-550PEG | 10,000 | 10 | 550 | 10 | PACM |
| F8 | 10-10kPDMS-750PEG | 10,000 | 10 | 750 | 10 | PACM |
| F9 | 15-5kPDMS-750PEG | 5,000 | 15 | 750 | 15 | PACM |
| F10 | 15-10kPDMS-750PEG | 10,000 | 15 | 750 | 15 | PACM |
| F11 | 20-10kPDMS-750PEG | 10,000 | 20 | 750 | 20 | PACM |
| F12 | 10-5kPDMS-750PEG-RT | 5,000 | 10 | 750 | 10 | Anacamide 702B75 |
| F13 | 10-10kPDMS-750PEG-RT | 10,000 | 10 | 750 | 10 | Anacamide 702B75 |
| F14 | 13-10kPDMS-750PEG-RT | 10,000 | 13 | 750 | 13 | Anacamide 702B75 |

3.2 The Anti-Icing Coating Systems

The use of the amphiphilically-modified self-stratified siloxane-GC curable coating compositions as anti-icing coating systems were examined for three factors including molecular weight of PEG, molecular weight of PDMS, and the amounts of PDMS and PEG in the coating system. Like the fouling-release marine coating systems, the designed experiment followed a 23 design, resulting in 8 coating formulations. For this design, each factor has two levels: PEG in two molecular weights of 550 $\overline{M}_n$ and 750 $\overline{M}_n$; PDMS in two molecular weights of 5000 $\overline{M}_n$ and 10,000 $\overline{M}_n$; and PDMS and PEG amounts of 5 wt. % and 10 wt. % based on overall solids content. These 8 formulations are F1-F8 in Table 2. Additionally, two formulations, F9 and F10 in Table 2, that contained 15 wt. % and 20 wt. % of PEG 750 $\overline{M}_n$ and PDMS 10,000 $\overline{M}_n$ were evaluated to observe the impact of higher amphiphilicity on the performance of the system. As a result, formulations F4, F8, F9, and F10 could be compared based on one variable, amount of PEG and PDMS.

TABLE 2

Anti-Icing Coating Compositions

| Formulation | Formulation Type | PDMS MW ($\overline{M}_n$) | PDMS Wt. % | PEG MW ($\overline{M}_n$) | PEG Wt. % | Crosslinker |
|---|---|---|---|---|---|---|
| F1 | 5-5kPDMS-550PEG | 5,000 | 5 | 550 | 5 | PACM |
| F2 | 5-5kPDMS-750PEG | 5,000 | 5 | 750 | 5 | PACM |
| F3 | 5-10kPDMS-550PEG | 10,000 | 5 | 550 | 5 | PACM |
| F4 | 5-10kPDMS-750PEG | 10,000 | 5 | 750 | 5 | PACM |
| F5 | 10-5kPDMS-550PEG | 5,000 | 10 | 550 | 10 | PACM |
| F6 | 10-5kPDMS-750PEG | 5,000 | 10 | 750 | 10 | PACM |
| F7 | 10-10kPDMS-550PEG | 10,000 | 10 | 550 | 10 | PACM |
| F8 | 10-10kPDMS-750PEG | 10,000 | 10 | 750 | 10 | PACM |
| F9 | 15-10kPDMS-750PEG | 10,000 | 15 | 750 | 15 | PACM |
| F10 | 20-10kPDMS-750PEG | 10,000 | 20 | 750 | 20 | PACM |

The fouling-release marine coating systems F1-F8 (Table 1) are identical to the anti-icing coating systems F1-F8 (Table 2). The fouling-release marine coating systems F10 and E11 (Table 1) are identical to the anti-icing coating systems F9 and F10 (Table 2).

4. Methods of Characterization

4.1 Epoxy Equivalent Weight Titrations

Epoxy equivalent weight (EEW) titrations were used to determine EEW content for both resin and prepolymers and confirm the presence of epoxy groups in prepolymers. The titration was conducted following ASTM D1652. In general, a sample of resin or prepolymer (1-2 g) was weighed in an Erlenmeyer flask. The sample was dissolved in 15 mL of chloroform and an indicator solution of 1% crystal violet in glacial acetic acid was added (4-6 drops). The content of flask was titrated with a standardized solution (0.1 N) of hydrobromic acid in glacial acetic acid until the blue solution displayed a color change to blue-green endpoint. A blank titration was also carried for 15 mL chloroform without any sample in it. Three replicates were recorded for each resin\prepolymer. EEW was calculated using the recorded information and the percent solids content.

4.2 Percent Solids Determination

Percent solids to determine the non-volatile content of resins or prepolymer was assessed following ASTM 2369. In general, a weight empty aluminum pan was filled with resin\ prepolymer sample (1-2 g). Isopropyl alcohol was used to cover the sample. The pan was placed in an oven at 120° C. for 1 hour. After removal from the oven, the pan was weighed again to determine the percent solids. Three replicates were recorded for each resin \prepolymer.

4.3 Fourier Transform Infrared

Fourier transform infrared (FTIR) spectroscopy was employed to characterize GC resin and prepolymers, using a Thermo Scientific Nicolet 8700 FTIR. The resin or prepolymer was spread as a thin layer on a potassium bromide (KBr) plate to collect the spectrum.

4.4 Surface Characterization

A Kruss® DSA 100 (Drop Shape Analyzer) was used to determine the surface wettability of the coatings and their surface energy. For each surface, water and diiodomethane contact angles were measured in 3 replicates. For each replicate, the static contact angle was measured over 6 minutes to monitor changes due to the potential interaction of the surface with the water droplet as a function of time. Surface energy for each surface was calculated using the Owens-Wendt method. Owens et al., *Journal of Applied Polymer Science* 1969, 13 (8), 1741-1747. Also, slip angle, advancing and receding water contact angles for surface was measured using a tilting stage attached on the DSA 100 instrument where a 25-4 water droplet was watched on a coating surface that was tilted at 10°/min. The measured angles and surface energies were auto-calculated using Kruss® Advance software.

Attenuated total reflectance Fourier transform infrared spectroscopy (ATR-FTIR) was used to further characterize the surfaces of the coatings. A Bruker Vertex 70 with Harrick's ATR' accessory using a hemispherical Ge crystal was utilized to collect ATR-FTIR spectra for a coating. The penetration depth for ATR-FTIR is within 0.5-2 μm which depends on factors such as wavelength of the light, angle of incidence, and refractive index of the crystal and a surface of interest.

A Thermo Scientific™ K-Alpha™ X-ray photoelectron spectroscopy (XPS) was used to determine the surface elemental composition of the coatings. The instrument was equipped with monochromatic Al $K_\alpha$ (1486.68 eV) X-ray source and an Ar' ion source (up to 4000 eV) was utilized for the XPS experiments. All of the samples were cleaned to remove trace contaminants; a 2 mm×2 mm area of the sample was sputtered with a large $Ar^+$ ion cluster with a power of 4000 eV using the MAGCIS® cluster gun before analysis. Depth profiling of a coating was evaluated with 20 etch cycles. For each etch cycle, the ion beam was set to 1,000 eV Monatomic Mode with low current and 30 s etch time. After each etching cycle, survey spectra in 5 replicates were collected at low resolution with a constant analyzer pass energy of 200 eV for a total of 20 ms. For each run, photoemission lines for C1s, N1s, O1s, and Si2p were observed. Spectra were collected at an angle normal to the surface (90°) of a 400-μm area. The chamber pressure was maintained below $1.5 \times 10^{-7}$ Torr and samples were analyzed at ambient temperature. Atomic concentrations were quantified by the instrument's software as a representation of the atomic intensities as a percentage of the total intensity of all elements.

Atomic force microscopy (AFM) was utilized to receive insights about the surface topography of the coatings. A Dimension 3100 microscope with Nanoscope controller scanned the surface of experimental coatings, collecting images on a sample area of 100 μm×100 μm in the tapping mode. The experiment condition was in air under ambient conditions, using a silicon probe with a spring constant (0.1-0.6 N/m) and resonant frequency (15-39 kHz). For each surface, two to three replicates were collected to ensure consistency and accuracy of the data.

4.5 Biological Laboratory Assays

Growth and Release of Macroalgae (*Ulva linza*)

A set of multiwall plates was used, following water-immersion for 28 days, to evaluate the fouling-release performance of coatings against *U. linza*. The detailed description of the assessment can be found elsewhere. Cassé et al., *Biofouling* 2007, 23 (2), 121-130. Briefly, after leaching collection, all multiwall plates were equilibrated in 0.22 μm filtered artificial seawater for 2 hours at Newcastle. To each well, 1 mL spores of *U. linza* suspension was added, adjusted to $3.3 \times 10^5$ spores/mL (0.05 OD at absorbance 660 nm) in double strength enriched seawater. Spores settled on the discs were grown for 7 days inside an illuminated incubator at 18° C. with a 16:8 light: dark cycle (photon flux density 45 $\mu mol \cdot m^{-2} \cdot s^{-1}$). There was no washing to remove unsettled spores after settlement. After 7 days, the biomass generated was assessed from a single row of wells (6) from each plate. The chlorophyll was extracted by adding 1 mL DMSO to each water-pressured well (water pressure of 67 kPa) and followed by measuring the fluorescence at 360 nm excitation and 670 nm emission. Fluorescence is directly proportional to the biomass present on each coating surface. The removal of *U. linza* at each pressure was compared with the unsprayed wells that were used to determine initial growth.

Bacterial (*Cellulophaga lytica*) Biofilm Adhesion

Fouling-release properties towards bacteria were evaluated using retention and adhesion assays described previously. Stafslien, et al., *Biofouling* 2007, 23 (1), 45-54; Stafslien, et al., *Review of Scientific Instruments* 2007, 78 (7), 072204-072204; Callow et al., Efficacy testing of non-biocidal and fouling-release coatings. John Wiley & Sons, Ltd: 2014; pp 291-316. Briefly, a suspension consisting of the marine bacterium *Cellulophaga lytica* at $10^7$ cells/mL concentration in artificial seawater (ASW) containing 0.5 g/L peptone and 0.1 g/L yeast extract was deposited into 24-well plates (1 mL/well). The plates were then incubated statically at 28° C. for 24 hours. The ASW growth medium was then removed and the coatings were subjected to water-jet treatments. The first column of each coating (3 replicate wells) was not treated and served as the initial amount of bacterial biofilm growth. The second and third columns (3 replicate wells) were subjected to water-jetting at 10 psi and 20 psi, respectively, for 5 seconds. Following water-jet treatments, the coating surfaces were stained with 0.5 mL of a crystal violet solution (0.3 wt. % in deionized water) for 15 minutes and then rinsed three times with deionized water. After 1 hour of drying at ambient laboratory conditions, the crystal violet dye was extracted from the coating surfaces by adding 0.5 mL of 33% acetic acid solution for 15 minutes. The resulting eluates were transferred to a 96-well plate (0.15 mL/coating replicate) and subjected to absorbance measurements at 600 nm wavelength using a multi-well plate spectrophotometer. The absorbance values were considered to be directly proportional to the amount of bacterial biofilm present on coating surfaces before and after water-jetting treatments. Harkal et al., *J. Coating. Tech. Res.* 2013, 10 (2), 141-151.

Growth and Release of Microalgae (*Navicula incerta*)

Laboratory biological assay diatom (*Navicula incerta*) was conducted at NDSU following a similar procedure described previously. Callow et al., *Nat. Commun.* 2011, 2 (1), 244-244; Cassé et al., *Biofouling* 2007, 23 (2), 121-130; Cassé et al., *Biofouling* 2007, 23 (4), 267-276. Briefly, a suspension with $4 \times 10^5$ cells/mL of *N. incerta* (adjusted to 0.03 OD at absorbance 660 nm) in Guillard's F/2 medium was deposited into each well (1 mL per well) and cell attachment was stimulated by static incubation for 2 hours under ambient conditions in the dark. Coating surfaces were then subjected to water-jet treatments. Stafslien et al., *Rev. Sci. Instrum.* 2007, 78 (7), 072204-072204. First column of wells (3 wells) were not water-jetted so that initial cell attachment could be determined and the next two-column of wells (3 wells) were water-jetted at 10 psi and 20 psi, respectively, for 10 seconds. Microalgae biomass was quantified by extracting chlorophyll using 0.5 mL of DMSO and measuring fluorescence of the transferred extracts at an excitation wavelength of 360 nm and emission wavelength at 670 nm. The relative fluorescence (RFU) measured from the extracts was considered to be directly proportional to the biomass remaining on the coating surfaces after water-jetting.

Adult Barnacle (*Amphibalanus amphitrite*) Adhesion

An adult barnacle reattachment and adhesion assay evaluated the fouling-release performance of the coatings towards macrofoulants. Stafslien et al., *J. Coating. Tech. Res.* 2012, 9 (6), 651-665; Rittschof et al., *Biofouling* 2008, 24 (1), 1-9. Coatings prepared on 4"×8" panels after water aging were utilized for this laboratory assay. Barnacles were dislodged from silicone substrates sent from Duke University and immobilized on experimental coatings (6 barnacles per coating) using a custom-designed immobilization template. The immobilized barnacles were allowed to reattach and grow for 2 weeks while immersed in an ASW aquarium tank system with daily feedings of brine shrimp *Artemia nauplii* (Florida Aqua Farms). After the 2-week attachment period, the number of non-attached barnacles was recorded, and the attached barnacles were pushed off (in shear) using a hand-held force gauge mounted onto a semi-automated stage. Once the barnacles were dislodged, their basal plate areas were determined from scanned images using Sigma Scan Pro 5.0 software program. Barnacle adhesion strength (MPa) was calculated by taking the ratio of peak force of removal to the basal plate area for each reattached barnacle. To ensure consistency, barnacles of similar sizes were tested. The average barnacle adhesion strength for each coating was reported as a function of the number of barnacles released with a measurable force and that exhibited no visible damage to the basis or shell plates.

4.6 Icephobic Characterization

Several methods have been reported to measure ice adhesion (Beemer et al., *J. Mater. Chem. A* 2016, 4 (47), 18253-18258; Saito et al., *Surface Coatings International Part B: Coatings Transactions* 1997, 80 (4), 168-171; Chen et al., *ACS Appl. Mater. Interfaces* 2017, 9 (4), 4202-4214; Upadhyay et al., *Prog. Org. Coat.* 2017, 112, 191-199; Robert, Surface having low adhesion to ice. 1952; Zhu et al., *ACS Appl. Mater. Interfaces* 2013, 5 (10), 4053-4062), although there is no standard universally accepted ice adhesion test. The details about the measurements and experimental setup can be found elsewhere. Upadhyay et al., *Prog. Org. Coat.* 2017, 112, 191-199. In general, the setup consisted of a test stand, force gauge, cooling plate, and cooling unit. Cooling plate hosted with coating panels that were tightened in the test stand location. The temperature of the cooling plate was −20° C. The temperature at the surface of experimental coating was −14° C. Ice was grown with a total of 6 mL on a surface in a thin transparent polycarbonate hollow cylinder (0.68 grams) with a 3.1 cm inside diameter and 1.2 cm height. Ice adhesion strength measurements were performed immediately after complete icing of water—approximately 12-14 minutes was required for complete ice formation. The grown ice was horizontally sheared using the force gauge probe with a controlled speed of 10.6 mm per minute. An average of nine replicates were recorded for each coating. The lower the required shear force to dislocate ice, the higher is the icephobicity of a coating.

4.7 Water Absorption and Barrier Performance

A Gamry® Inc., IFC 1000 potentiostat/Galvostat/ZRA collected electrochemical impedance spectroscopy (EIS) data for water absorption and barrier performance of experimental coatings. Single-frequency EIS (SF-EIS) experiments offered information about water absorption and multi-frequency EIS (MS-EIS) evaluated barrier performance of the studied coatings.

Capacitance measurements for a coating offered data to calculate water absorption for a coating, using the Brasher-Kingsbury equation (Equation 1), where φ(t) is the volume fraction of water absorbed by a coating at time t, $C_t$ is the capacitance of coating at time t, $C_0$ is the initial capacitance of coating, and 80 is the dielectric constant of water. Overall, this method assumes capacitance of a coating changes after its immersion in an aqueous electrolyte due to water diffusion into the coating. Equation 2 gives the capacitance for a coating at time t, where Z' is the imaginary component of the EIS measurement and f is the measurement frequency. Further details on this method and calculations can be found elsewhere. Upadhyay et al., *Prog. Org. Coat.* 2017, 112, 191-199; Brasher et al., *Journal of Applied Chemistry* 1954, 4 (2), 62-72.

$$\varphi(t) = \frac{\log \frac{C_t}{C_0}}{\log 80} \quad \text{Equation 1}$$

$$C_t = \frac{-1}{2\pi f Z'} \quad \text{Equation 2}$$

A three electrode setup performed the experiments, consisting of a substrate as working electrode, a Pt mesh as the counter electrode, and a saturated calomel electrode as the reference electrode. Upadhyay et al., *J. Coating. Tech. Res.* 2013, 10 (6), 865-878. Gamry® Framework™ software version 6.21 acquired the data. A Perspex™ cylinder mounted on the coated substrate which was clamped with an O-ring insert held the electrolyte solution of aqueous 3.5 wt. % NaCl. For MF-EIS measurements a potential perturbation of 10 mV (rms) w.r.t. the OCP (Open Circuit Potential) was applied to the substrate and its impedance response was acquired at frequencies ranging from $10^5$ to $10^{-2}$ Hz, at an acquisition rate of 10 points per decade. For SF-EIS, the applied frequency was $10^4$ Hz. Upadhyay et al., *J. Coating. Tech. Res.* 2013, 10 (6), 865-878.

4.8 Mechanical Tests

Methyl-ethyl ketone (MEK) double rub test, according to ASTM D 5402, evaluated resistance of coatings against solvents and the crosslinking extent through curing. A hammer (0.75 kg) with three-fold cheesecloth wrapped around its head was soaked in MEK and rubbed against the coating. The head of hammer was rewet after each 25 double rubs. The number of double rubs was noted when mars were observed on the surface of coatings.

Impact test, according to ASTM D 2794, signified reverse impact and front impact strength of coatings using a Gardner impact tester. The maximum drop height was 43 inches with a weight of 4 pounds. Coated steel panels were placed in testing location, and the load in varying heights was dropped on the coating. The results were recorded in inch-pounds (in-lb) when crazing or loss of adhesion from substrate was not observed at the maximum height that coatings could handle. Coatings that did not fail were reported having an impact strength of >172 in-lb. The resistance of coatings to applied force is reported when loss of adhesion, crack, or crazing is not observed for a coating. The test can be carried out in two ways: front and reverse. Front impact directly drops the weight on a coating film, while reverse impact drops the weight on back of a substrate that has a coating film on its other side.

Crosshatch adhesion test, according to ASTM D 3359, assessed the adhesion of coating to substrates by applying and removing pressure-sensitive tape over cuts made in the film. The results were reported on a scale of 0B to 5B, while 0B indicates complete removal of the coating and 5B indicates no removal of the coatings from the substrate as a result of this test.

Conical mandrel test, according to ASTM D 522, displayed the flexibility of the coatings on substrates. In principle, ideal coatings should not have any cracks when undergo bending test—this property shows how flexible the coatings are to handle applied force without showing any defect signs such as cracks. The results of flexibility were reported as the length of a formed crack in cm on the coating during the bending test.

Konig pendulum, according to ASTM D 4366, was used to quantify the hardness of the coatings. This test measures the time taken for the amplitude to decrease from 6° to 3°. The pendulum hardness test is based on the principle that the amplitude of the pendulum's oscillation in seconds will decrease more quickly when supported on a softer surface and will last longer when supported on a harder surface. The results are reported in seconds.

Pencil hardness test, according to ASTM D 3363, qualitatively measured the hardness of coatings. A series of pencils from hard (8H) to soft (8B) were pushed at 45° against the coating. The first pencil that does not gouge or scratch the surface was recorded.

4.9 Statistical Analysis

Analysis of variance for the 23 factorial design (Coating F1-F8 included in this design) and completely randomized design (CRD) (all experimental and control coatings included in this design) were performed in SAS software, version 9.4. The GLM procedure with Tukey's and Dunnett's method were utilized to determine the difference mean for each treatment group under the CRD design. The assessed responses for the analysis was, for the fouling-release marine coatings, the fouling-release extent of $U.$ $linza$ organism and adhesion strength of the reattached barnacles, and, for the anti-icing coatings, the shear force required to dislocate ice from the surface of a coating.

5. Results and Discussion

Amphiphilic coatings, systems that contain both hydrophobic and hydrophilic domains on their surfaces, have shown promising performance as marine coatings and as icephobic coatings. As recent literature has reported the preparation of amphiphilic fouling-release marine coatings based on isocyanate resin (Galhenage et al., $J.$ $Coating.$ $Tech.$ $Res.$ 2017, 14 (2), 307-322), a system that utilizes a new crosslinking chemistry while still benefiting from the urethane linkages is disclosed. Furthermore, with considerations that marine systems and icephobic systems share the same design strategies (Upadhyay et al., $Prog.$ $Org.$ $Coat.$ 2017, 112, 191-199), an amphiphilic system to further broaden this niche horizon of amphiphilic coatings for icephobic applications is disclosed. To this effect, this invention discloses fouling-release and anti-icing systems based on epoxy-amine crosslinking that became accessible through glycidyl-carbamate chemistry, conversion of the isocyanate groups of the IPDI trimer resin to epoxy functional groups using glycidol.

Coating formulations were prepared composed of three major parts including glycidyl-carbamate (GC) resin (the IPDI-based epoxy resin), amphiphilic GC prepolymers, and crosslinking agent. For the GC resin, polyisocyanate IPDI trimer (Desmodur Z4470) resin was fully functionalized with glycidol. The amphiphilic GC prepolymer based on IPDI trimer resin is furnished with chains of polydimethylsiloxane (PDMS) and poly (ethylene glycol) (m PEG), accounting for 66.6% of the isocyanate groups, while having a partial functionality of 33.3% via its epoxy groups. Molecular weight of PDMS (5000 and 10,000 $\overline{M}_n$) and PEG (550 and 750 $\overline{M}_n$) were the compositional variation for prepolymers.

Several factors were considered as variables to determine the optimum design strategies for the amphiphilic coatings. Molecular weights of PDMS (5,000 $\overline{M}_n$ and 10,000 $\overline{M}_n$) and PEG (550 $\overline{M}_n$ and 750 $\overline{M}_n$) were assessed at two levels for each component to determine how the molecular weight of amphiphilic chains impact performance. Amounts of PDMS and PEG in a system were investigated at 5 wt. %, 10 wt. %, 15 wt. %, and 20 wt. % to validate effect of amphiphilic concentration on performance. Additionally, for the fouling-release marine coatings, the effect of amine crosslinking agents (PACM vs 702B75) on performance was explored.

The complete conversion of the isocyanate IPDI resin to epoxy-functional GC (urethane) resin was confirmed with FTIR and epoxy titrations. FTIR spectrum of the GC resin shows the absence of signature isocyanate peak at 2250 $cm^{-1}$ and appearance of the secondary amine (due to formation of the urethane linkage) and ether peaks at 3350 $cm^{-1}$ and 1128 $cm^{-1}$, respectively (FIG. 1—Red spectrum). For amphiphilic GC prepolymer 10 kPDMS-750PEG, in addition to the complete disappearance of the isocyanate signal and advent of the urethane linkage signal, the FTIR displayed overlapping stretching for siloxane (Si—O—Si of PDMS) at 1030 $cm^{-1}$ and ether (C—O—C of PEG) at 1105 $cm^{-1}$, confirming attachment of the amphiphilic chains (FIG. 1—Blue spectrum).

Furthermore, epoxy titrations validated the presence of the epoxy-functional groups on both the resin and the amphiphilic prepolymers. The epoxy equivalent weight (EEW) values for the samples were in correlation with their type (Table 3). As expected, the GC resin had a lower EEW value, suggesting the availability of more epoxy functional groups in short segments on the modified isocyanate resin. The value of EEW for the prepolymer was significantly higher as theorized, supporting the limited presence of epoxy functional groups due to the attachment of PEG and PDMS chains on majority of the sites.

TABLE 3

Epoxy equivalent weight for GC resin and some prepolymers

| Material | Theoretical % Epoxy on Structure | Theoretical % PEG and PDMS on Structure | Average EEW ± σ |
| --- | --- | --- | --- |
| GC Resin | 100.0% | 0.0% | 320.16 ± 25.20 |
| Prepolymer 10kPDMS-550PEG | 33.3% | 66.6% | 1987.23 ± 135.20 |
| Prepolymer 10kPDMS-750PEG | 33.3% | 66.6% | 1842.54 ± 108.79 |
| Prepolymer 5kPDMS-500PEG | 33.3% | 66.6% | 1727.37 ± 78.08 |
| Prepolymer 5kPDMS-750PEG | 33.3% | 66.6% | 1695.20 ± 95.35 |

5.1 The Fouling-Release Marine Coatings

Figure 2:
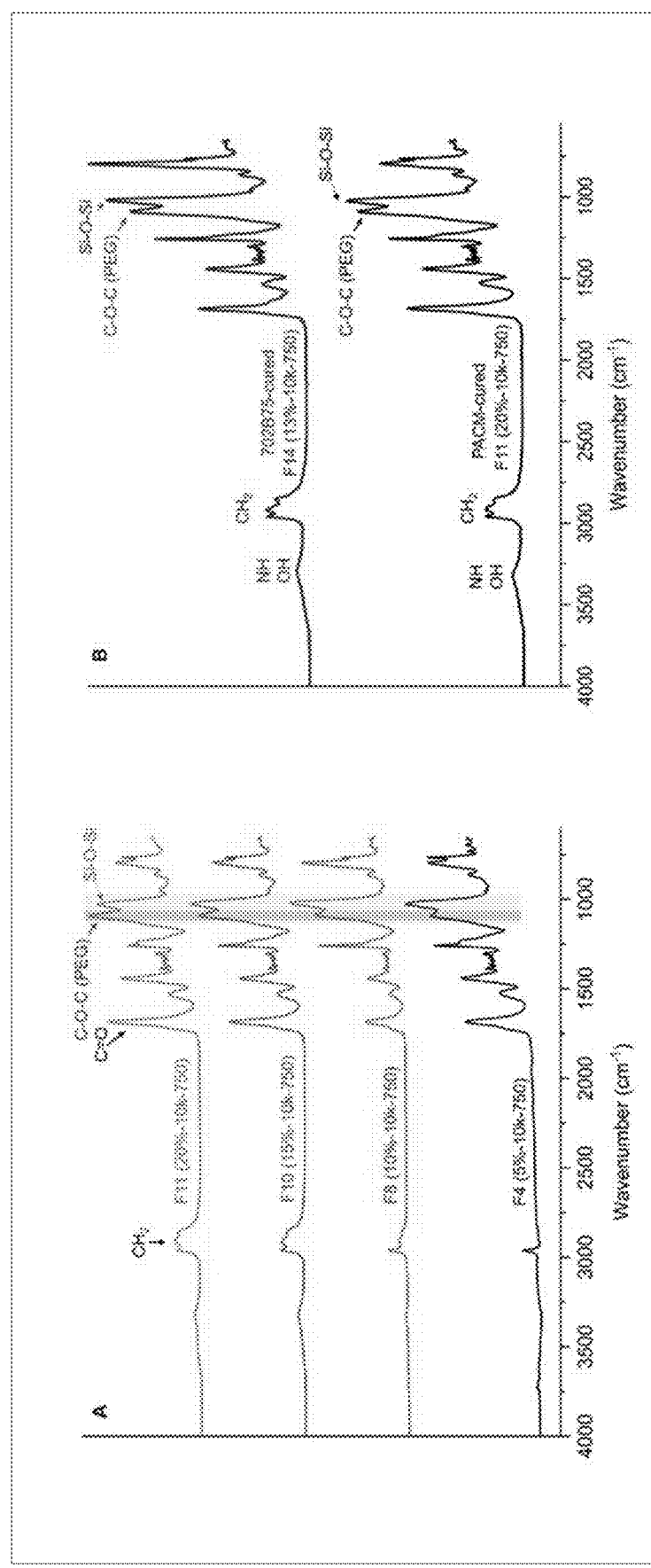
FIG. 2 shows the ATR-FTIR of the AmpSiGC coating surfaces.

The surfaces of the prepared coatings used for the fouling-release marine coatings were characterized with a series of experiments. ATR-FTIR was used to qualitatively assess the surface composition of the coatings. The spectrum of all coatings showed similar results and confirmed the amphiphilic nature of explored AmpSiGC systems. The comparison of formulations with varying amphiphilicity of 5 wt. % to 20 wt. % PEG/PDMS displayed the presence of siloxane (Si—O—Si) and ether (C—O—C) peaks at −1030 cm-1 (FIG. 2A—highlighted green) and 1105 $cm^{-1}$ (FIG. 2A—highlighted red), respectively. The intensity of PEG signal in relative to PDMS signal increased as the amphiphilicity content increased, which may be due to the availability of more PEG chains in a system that increase the probability for this moiety to diffuse into the surface. Also, a broadened overlapped stretching for hydroxyl group (formed due to crosslinking of epoxy and amine groups) and secondary amine (due to urethane linkage) is present at around 3350 cm$^{-1}$. Furthermore, the FTIR data indicated amphiphilic PEG and PDMS moieties are present on the surface regardless of the used crosslinker, comparing the spectra for coatings F11 and F14 crosslinked with PACM and 702B75, respectively (FIG. 2B).

Figure 3:
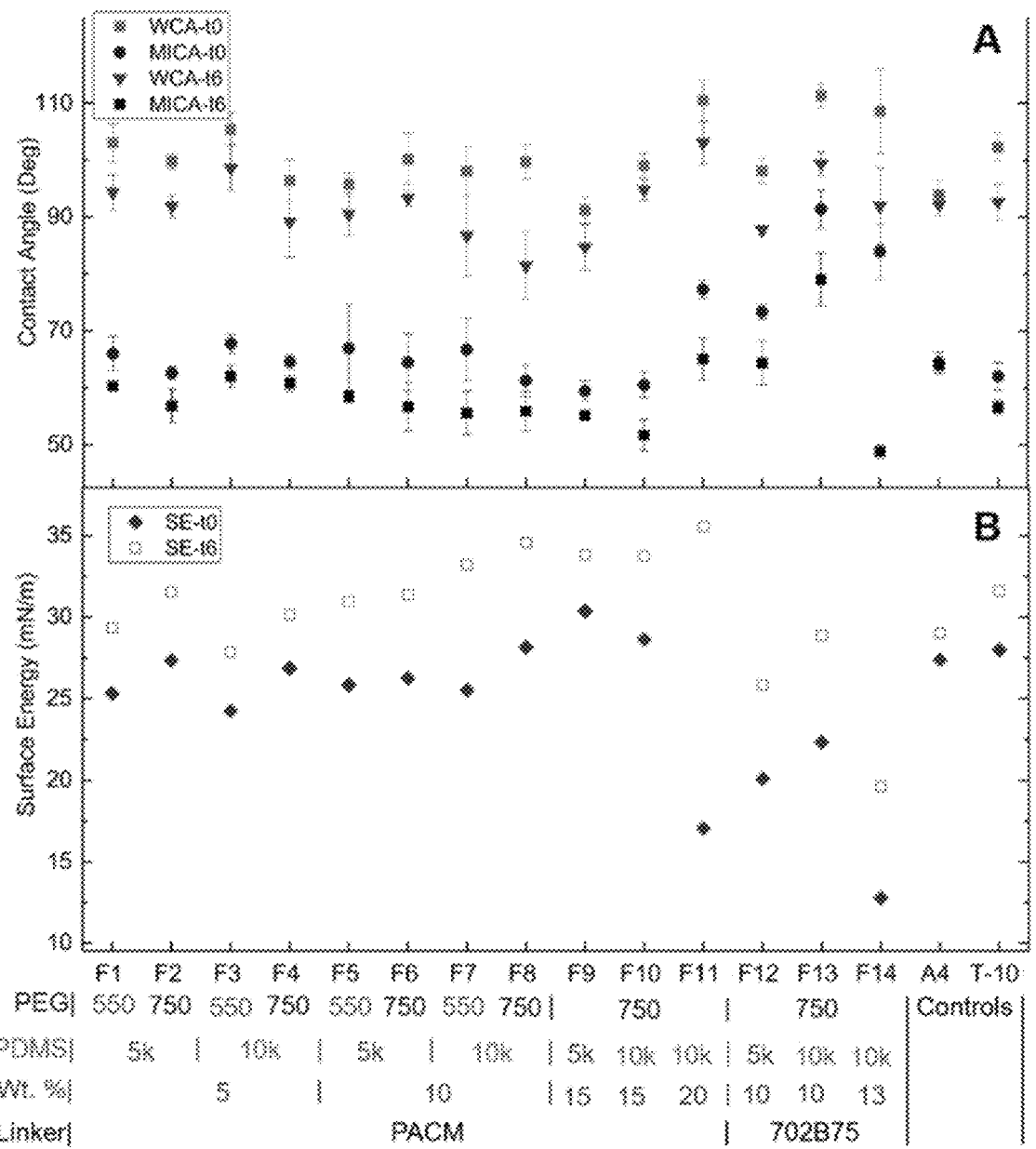
FIG. 3 shows the static contact angle data for the AmpSiGC fouling-release coatings.

Contact angle measurements were used to further evaluate the surfaces of the coatings. FIG. 3A shows the static contact angles and surface energies over time for the experimental coatings and control coatings (A-4 and T-10). The coatings overall displayed a dynamic surface as the contact angles (both water and diiodomethane) decreased as a function of time (6 minutes), like the T-10 amphiphilic control coating. The decrease for water contact angles (WCA) was more noticeable than methylene iodide contact angles (MICA). The decrease of contact angles was attributed to the presence of hydrophilic domains on the surface that swell due to interaction with the water droplet, facilitating the spread of the droplet, while this phenomenon was not present for the hydrophobic A4-20 control coating that did not contain any PEG. Formulations with 10 wt. % PEG and PDMS showed a higher dynamic nature than formulations with 5 wt. % amphiphilic components. Also, the higher amount of PDMS in a system reflected a higher initial contact angle as the upward trend is observed from formulation F4 with 5 wt. % PDMS to formulations F8, F10, and F11 with 10, 15, and 20 wt. % PDMS, respectively. PACM-based coatings like F8 and F11 showed lower contact angles than 702B75-based coatings like F13 and F14 (highest amount of PEG and PDMS for F14 was 13 wt. % compared to 20 wt. % for F11). The dynamic nature of contact angles has a direct correlation on surface energy of the surfaces as illustrated in FIG. 3B. The surface energy of coatings lied between 14 mN/m up to 30 mN/m, depending on amount of PEG and PDMS in a system and type of the curing agent. Overall, the higher the changes in contact angle values over time, the higher change for surface energy as well. The similar comparisons that were mentioned for contact angle values can be noticed for the surface energy data as well. Coatings with 5 wt. % and 10 wt. % PEG and PDMS (cured with PACM) exhibited properties like the T-10 control, while this was not the case for coatings with higher amounts of PEG and PDMS or with the 702B75 crosslinker.

Figure 4:
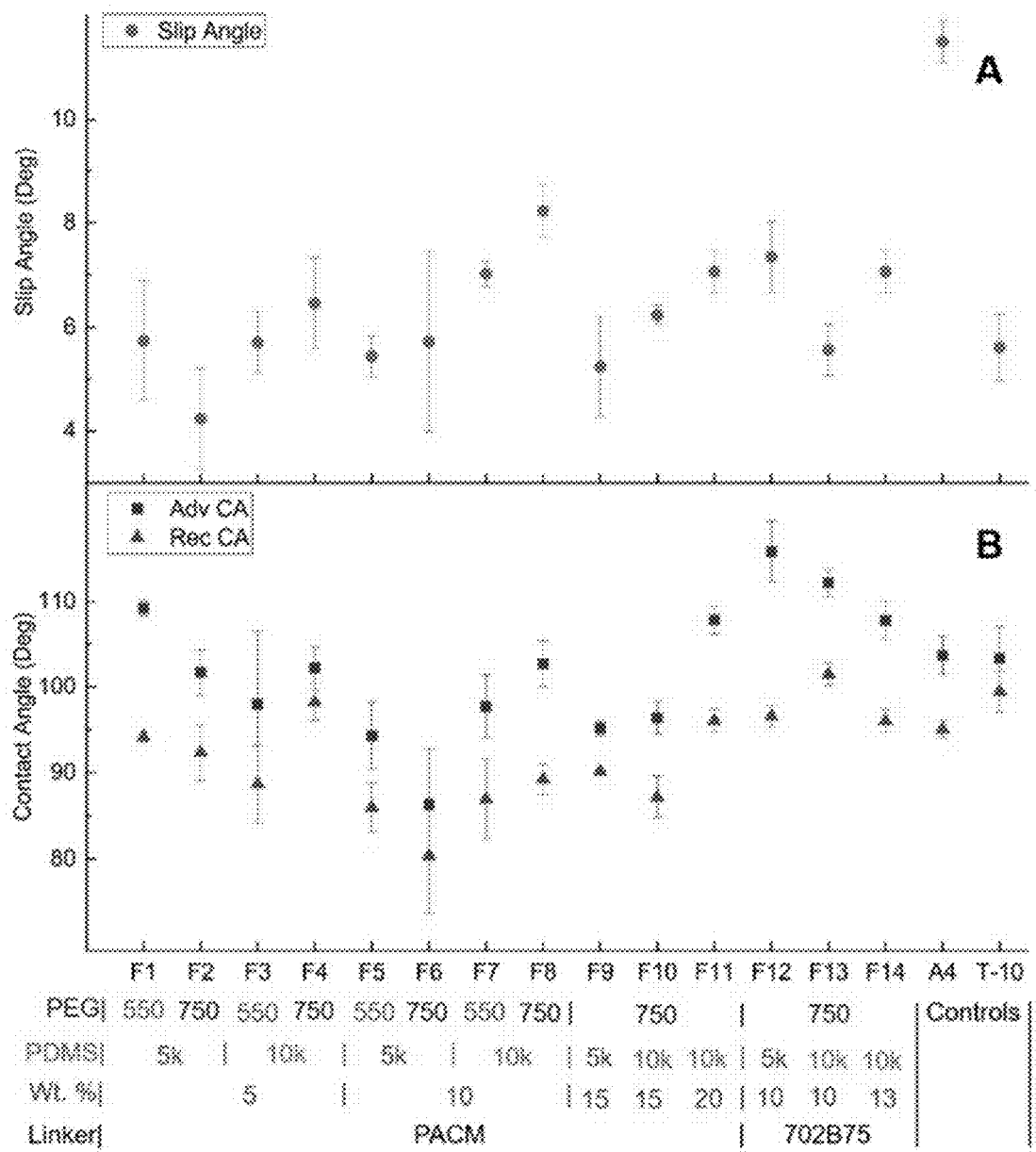
FIG. 4 shows the dynamic contact angle data for the AmpSiGC fouling-release coatings.

The surfaces of the coatings were further studied by dynamic contact angle measurements to determine advancing/receding contact angles and slip tilting degree (water droplet roll-off angle). Generally, the roll-off angle for the water droplet was between 4 to 8 degrees (FIG. 4A), a value like the amphiphilic T-10 coating and significantly different from hydrophobic A4 control system (with slip angle of 11 degrees). The type of crosslinker affected the advancing and receding contact angles for a surface (FIG. 4B). Coatings with PACM crosslinker showed hysteresis lower than 10 degrees that were comparable to T-10 and A4 control systems, signaling the presence of a smooth surface. Alternatively, coatings with 702B75 crosslinker showed a higher extent of hysteresis, specifically coating F12, indicating the surface is not as smooth as PACM-containing coatings.

Figure 5:
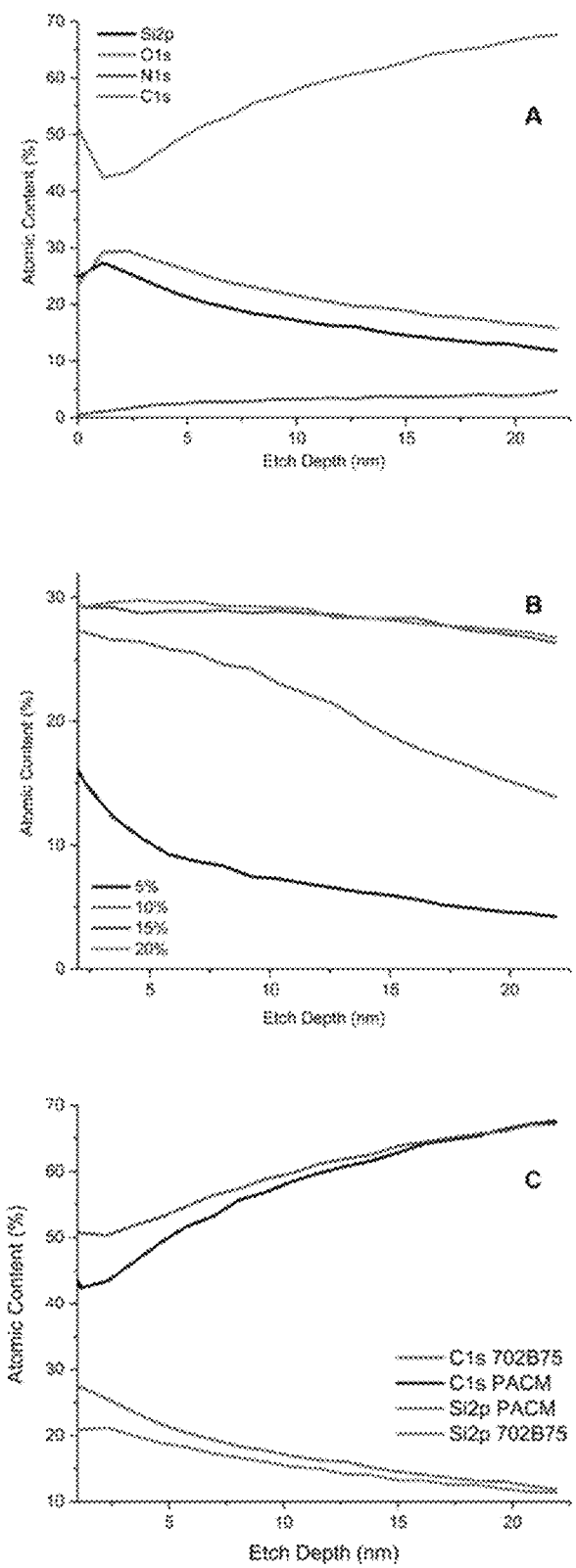
FIG. 5 shows the XPS data for the AmpSiGC fouling-release coatings.

The surfaces of the amphiphilic systems were characterized by XPS to determine the elemental composition of materials on the surface and in the outer layers of a coating using argon ion milling. The XPS analysis indicated all the coatings are self-stratified where the surface is primarily composed of PDMS-containing materials and the bulk is constructed of the glycidyl-carbamate matrix. As an example, the XPS depth profiling data for coating F8 (FIG. 5A) displays the concentration of silicon and oxygen atoms on the surface is dominant, but the silicon signal starts to decrease after ~5 nm thickness while the concentration of carbon and nitrogen atoms increase that is related to the crosslinked GC network in the bulk. The XPS depth profiling analysis also suggested that concentration of amphiphilic domains directly is related to the amount of incorporated amphiphilic moieties in a system (FIG. 5B). This data shows that systems with 15 wt. % and 20 wt. % PDMS have a high concentration of silicone atom on the surface that is well-extended through the bulk of the coating. Comparatively, coatings with lower amounts of amphiphilic chains have less initial concentration of PDMS on the surface; thus, the signal for silicone atom decreases considerably as a function of thickness. As expected, coatings with 10 wt. % amphiphilic moieties have a higher initial concentration of PDMS on the surface than systems with 5 wt. %. Furthermore, XPS data illustrated that self-stratification occurred for all systems regardless of the type of the curing agent (FIG. 5C). This data shows systems with PACM crosslinking agent have a slightly higher concentration of PDMS on the surface.

Figure 6:
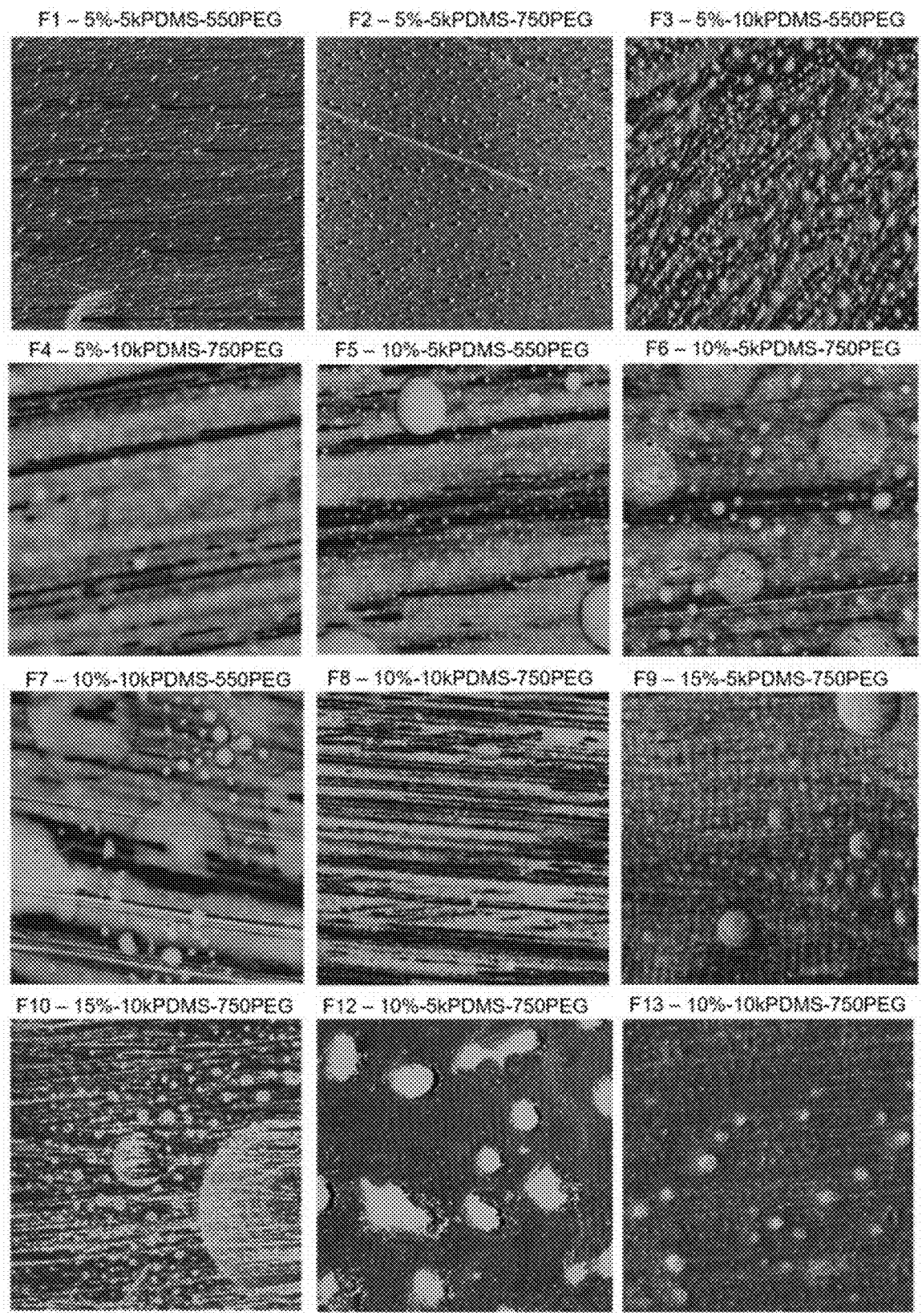
FIG. 6 shows the AFM phase images of the AmpSiGC fouling-release coatings. Each image is for an area of 100 µm×µm. Each label reflects the coating number and composition of an image.
Figure 7:
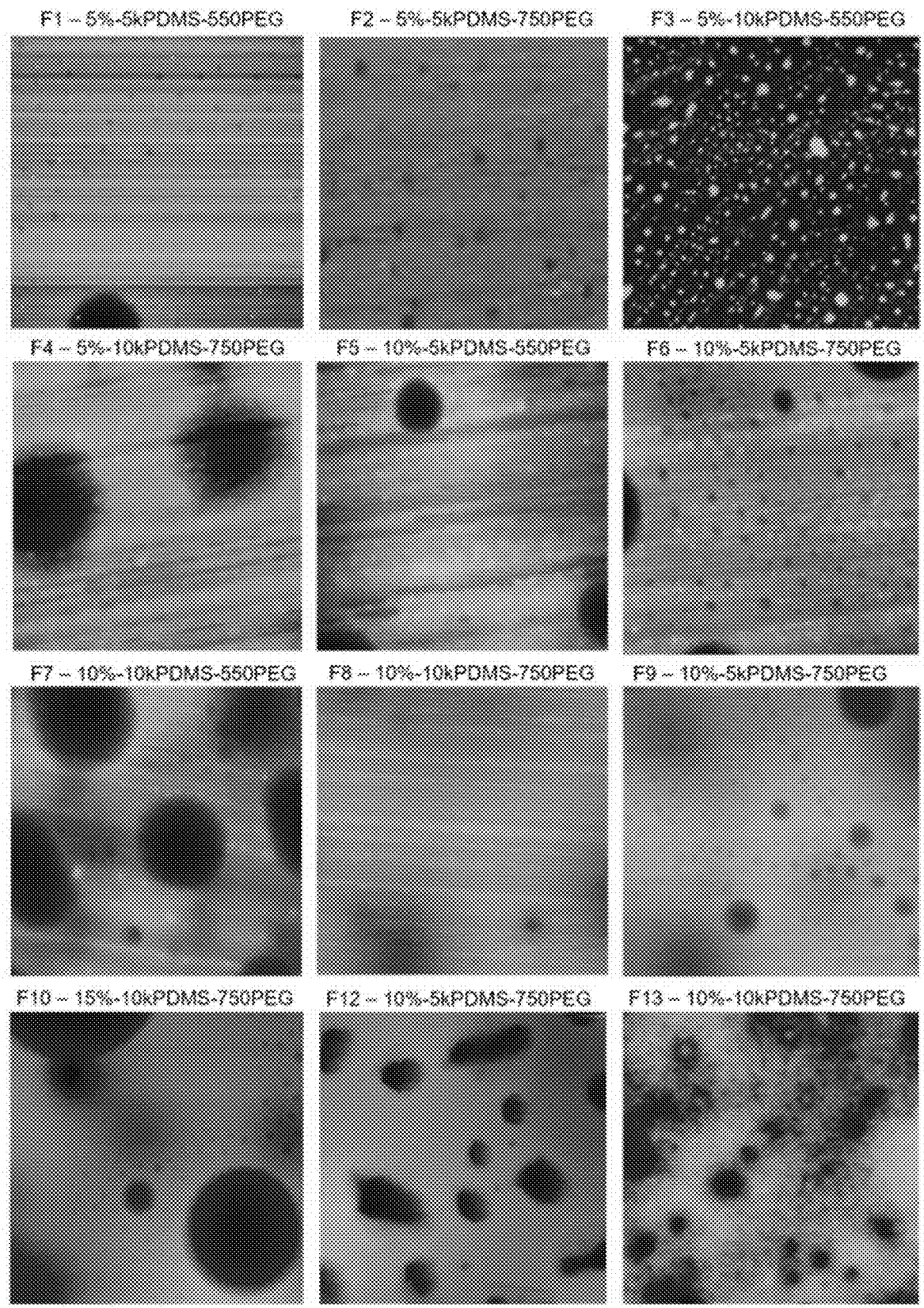
FIG. 7 shows the AFM Height Images for the AmpSiGC fouling-release coatings. Each image is for an area of 100 µm×µm. Each label reflects the coating number and composition of an image.

AFM was utilized as another technique to characterize the morphology of the developed surfaces. Generally, soft materials like PDMS appear lighter (having high phase angles) in AFM phase images and harder materials like PEG appear darker (having low phase angles). The AmpSiGC coatings possessed heterogeneous surfaces composed of light and dark patterns on the surface, signaling the presence of an amphiphilic morphology (FIG. 6). The AFM phase images (FIG. 6) are in correlation with AFM height images (FIG. 7). Comparing this data with phase AFM image of the control A4 system (FIG. 8), it was clearly observed the hydrophobic system lacked the patterns which further supports the amphiphilic nature of the AmpSiGC coatings. Coatings with 5 wt. % amphiphilic prepolymers showed smaller microdomains than systems with higher amounts of amphiphilic moieties. Among the 5 wt. % ones (cured with PACM), it appeared coatings that contain 5,000 $\overline{M}_n$ show a well-distributed pattern as small circular domains, while coatings with 10,000 $\overline{M}_n$ PDMS showed stretched-lines domains that is mixed with circular domains. For systems with 10 wt. % amphiphilic moieties (cured with PACM), several changes were noticed including a higher number of circular domains and a wider range of domain sizes. However, the number and size of the heterogonous domains did remain relatively the same with 15 wt. % of amphiphilicity. The 702B75-cured coatings such as F12 and F13 displayed a different morphology than PACM-cured coatings, suggesting the type of crosslinker impacts the pattern of a surface. AFM images for coating systems F11 and F14 could not be captured due to encountered limitations with the surfaces.

Biological assays to assess fouling-release performance of the developed coatings were conducted after 28 days of water immersion to ensure coatings are stable and any toxic ingredients were leached out. Before any experiments, the coatings were tested for leachate toxicity using *C. lytica* and *N. incerta* as described elsewhere. Majumdar et al., *ACS Combinatorial Science* 2011, 13 (3), 298-309. All the coatings indicated no sign of toxicity when compared to positive and negative growth controls, allowing for further biological evaluations.

*U. linza* is recognized as a potential biofouling macroalgae organism. This organism expresses a low affinity for hydrophilic surfaces but with a stronger adhesion, while it shows higher interest to settle on hydrophobic surfaces but with a weaker adhesion. Finlay et al., *Integrative and Comparative Biology* 2002, 42 (6), 1116-1122; Callow et al., *Applied Environmental Microbiology* 2000, 66 (8), 3249-

Figure 9:
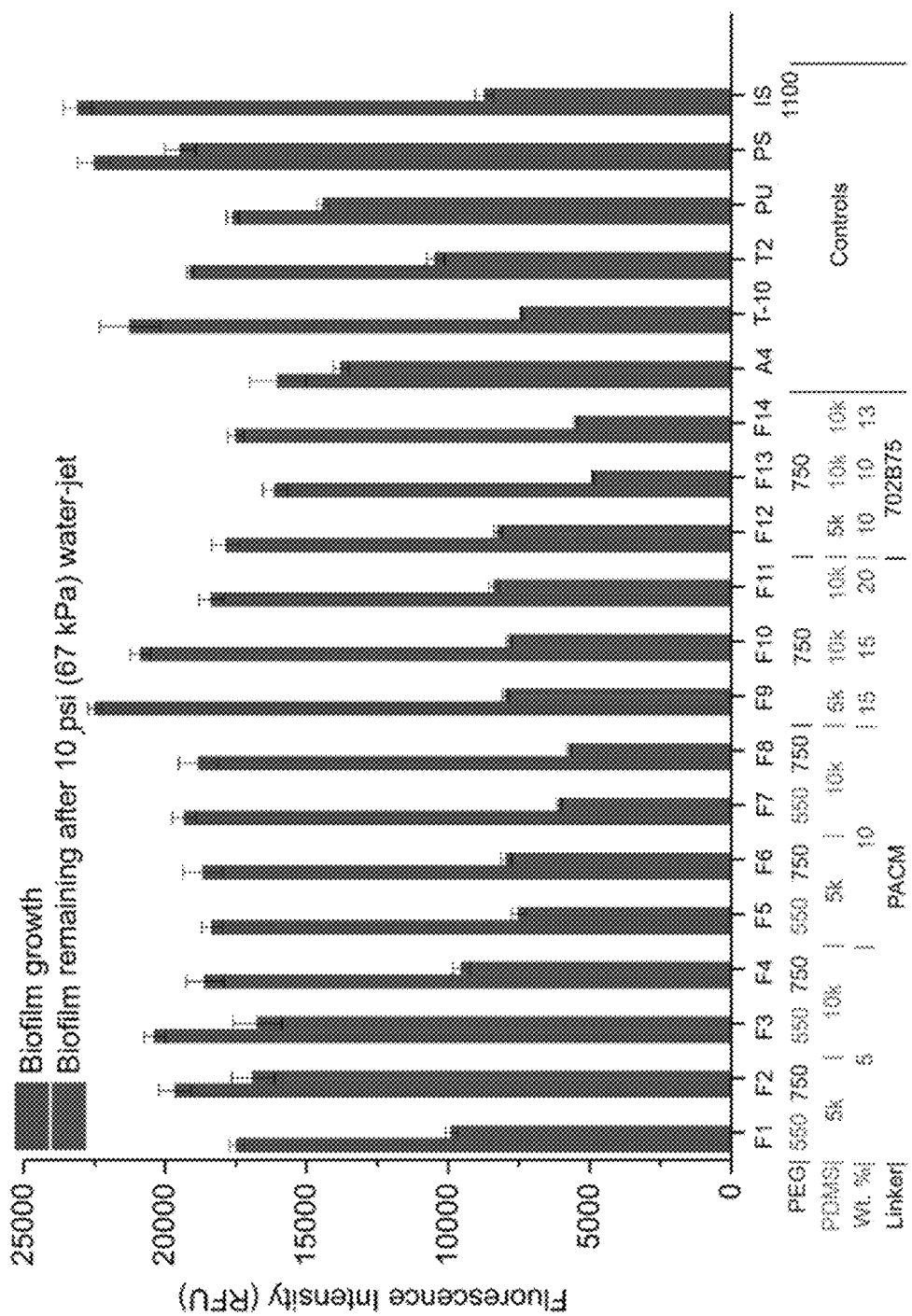
FIG. 9 shows the *U. linza* fouling-release data for biofilm growth (Red bar) and release at 10 psi (Blue bar). The X-axis is labeled to specify the formulations and its components including PEG MW, PDMS MW, wt. % of PEG and PDMS, and crosslinker type.
Figure 10:
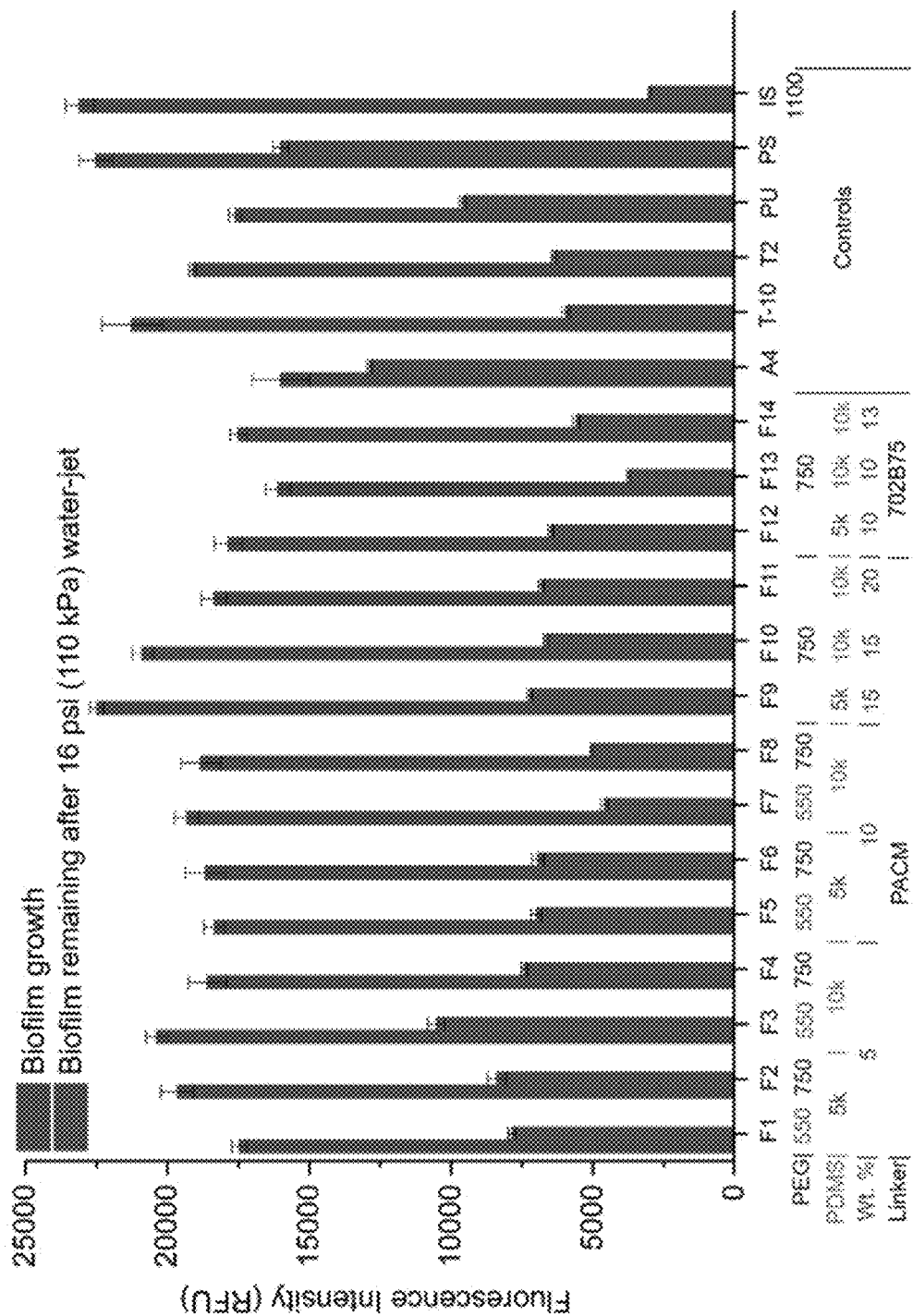
FIG. 10 shows the *U. lima* fouling-release data for biofilm growth (Red bar) and release at 16 psi (blue bar). X-axis is labeled to specify the formulations and its components including PEG MW, PDMS MW, wt. % of PEG and PDMS, and crosslinker type.

3254; Callow et al., *Journal of the Royal Society Interface* 2005, 2 (4), 319-325. This opposing behavior of *U. linza* suggests that an amphiphilic surface may be a desirable fit to tackle biofouling for it and similar-behaving organisms. Engineered AmpSiGC coatings and all the control coatings showed a relatively similar extent of *U. linza* biofouling (FIG. 9—Red bars; the higher the bar level, the higher amount of biofouling). Systems cured with 702B75 and systems with high amounts of amphiphilicity (i.e., 15 wt. % and up) had slightly lower initial biofouling than the other formulations. The release of *U. linza* was assessed at two water pressure levels of 10 psi (FIG. 9—Blue bars) and 16 psi (FIG. 10—blue bar). At 10 psi, all the systems with 10 wt. % amphiphilic portion or higher showed desirable performance, fouling-release results that were significantly better than A4 control system (tested with Tukey's method for comparison of means; P-values<0.05). Several AmpSiGC formulations such as F7, F8, F13, and F14 showed even better performance than the top-performing IS 1100 and internal T-10 coatings—each of these four coatings is composed of ~10 wt. % PEG (750 $\overline{M}_n$) and PDMS (10,000 $\overline{M}_n$) PDMS (FIG. 9). At 16 psi, the fouling-release of coatings followed a similar trend, except the extent of the *U. linza* release was improved due to a higher level of water pressure. The top-performing formulations at 10 psi (F7, F8, F13, and F14) still exhibited a better performance at 20 psi than A4 and T-10 systems while their release was slightly less than the IS 1100 (FIG. 10). Overall, the *U. linza* data suggested AmpSiGC systems offer well-performing fouling-release surfaces.

Figure 11:
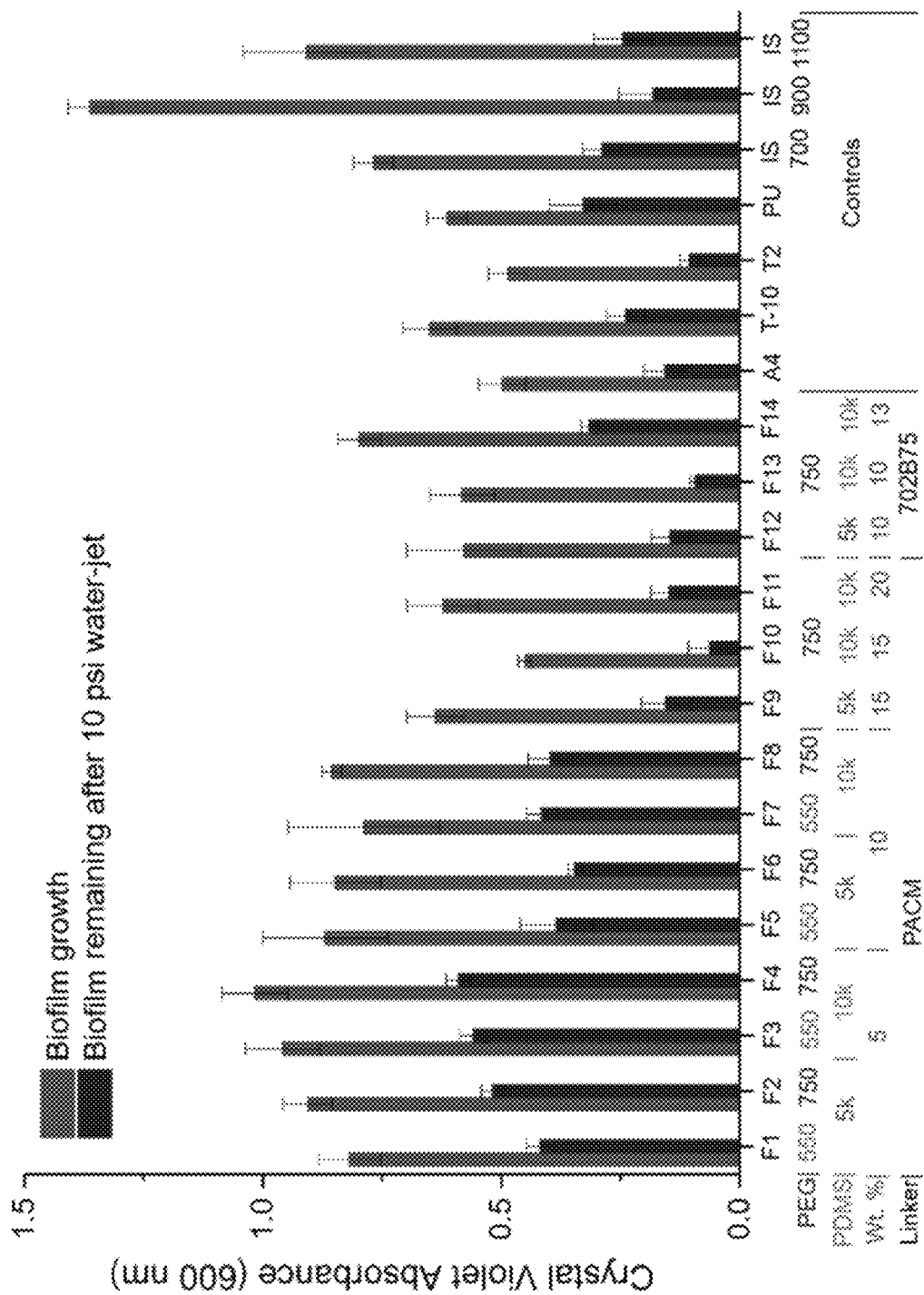
FIG. 11 shows the *C. lytica* fouling-release data for biofilm growth (Red bar) and release at 10 psi (Blue bar). The X-axis is labeled to specify the formulations and its components including PEG MW, PDMS MW, wt. % of PEG and PDMS, and crosslinker type.
Figure 12:
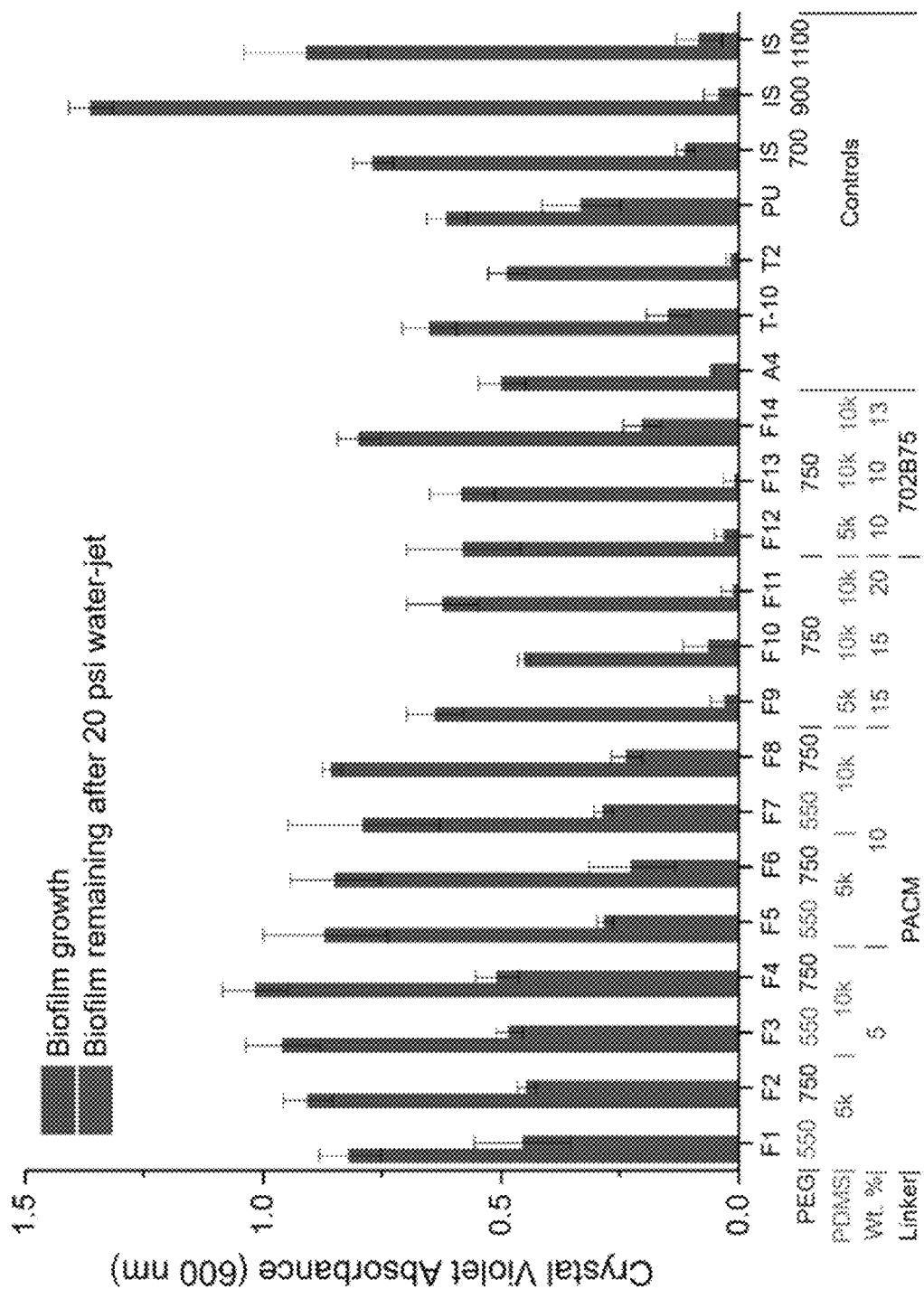
FIG. 12 shows the *C. lytica* fouling-release data for biofilm growth (Red bar) and release at 20 psi (blue bar). X-axis is labeled to specify the formulations and its components including PEG MW, PDMS MW, wt. % of PEG and PDMS, and crosslinker type.

*C. lytica* is a microorganism that is known for its biofouling with an affinity to a wide range of surfaces, including both hydrophilic and hydrophobic. Lejars et al., *Chemical reviews* 2012, 112 (8), 4347-4390. The extent of biofouling for coatings with 5 wt. % amphiphilicity is the highest and it decreases for coatings with 10 wt. % or higher amphiphilic content. Specifically, coatings F9-F11 that contain more than 15 wt. % PEG and PDMS and 702B75-cured coatings (F12 and F13 systems) demonstrate the least amount of initial biofouling which is comparable to the top-performing controls, suggesting the amount of PEG and PDMS and the type of crosslinker affect the affinity of *U. linza* to a surface. The fouling-release of *C. lytica* film was evaluated at two water pressure levels of 10 psi (FIG. 11) and 20 psi (FIG. 12), and the results for both pressures followed a similar trend. At 10 psi, several coating systems such as formulations F9-F13 outperformed the internal and commercial controls. All these coatings contained 15 wt. % or higher PEG and PDMS for PACM-cured systems (F9, F10, F11) or 10 wt. % PEG and PDMS for 702B75-cured systems (F12 and F13). In comparison, PACM-cured coatings with 10 wt. % amphiphilic chains (F5-F8) did not perform as well as 702B75-cured coatings at the same concentration, indicating choice of crosslinker can help to achieve better fouling-release performance with lower concentration of amphiphilic moieties in a system. Additionally, coatings F9-F13 outperformed almost all the well-known commercial marine paints, including IS 700, IS 900, and IS 1100 (FIG. 11). At 20 psi, the top-performing coatings F9-F13 demonstrated matching trends with higher extent of fouling-release due to higher water pressure (FIG. 12). The observations for all the comparisons among studied coatings and controls remained unchanged. Generally, the *N. incerta* data implies AmpSiGC surfaces deliver a desirable fouling-release performance which is better than the hydrophobic A4 and amphiphilic T-10 systems.

Figure 13:
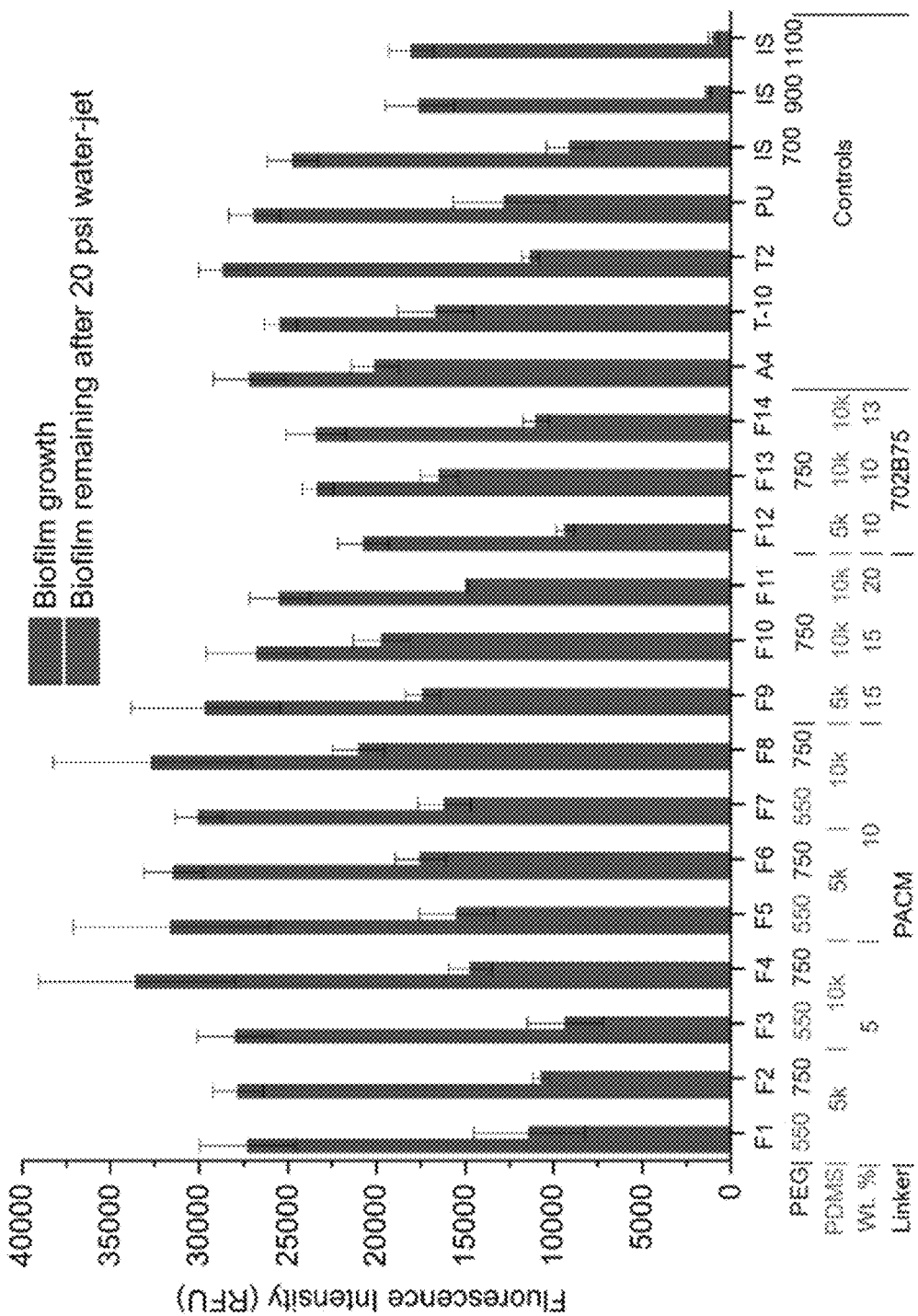
FIG. 13 shows the *N. incerta* fouling-release data for biofilm growth (Red bar) and release at 20 psi (Blue bar). The X-axis is labeled to specify the formulations and its components including PEG MW, PDMS MW, wt. % of PEG and PDMS, and crosslinker type.

A slime-forming microalga, diatom (*N. incerta*) is another major biofouling organism that settles on hydrophobic surfaces typically. Finlay et al., *Integrative and Comparative Biology* 2002, 42 (6), 1116-1122; Callow et al., *Applied Environmental Microbiology* 2000, 66 (8), 3249-3254. The extent of diatom biofouling for systems that contained between 5-10 wt. % amphiphilic chains and were cured with PACM was relatively higher than coatings with higher loadings of PEG and PDMS, 702B75-cured systems, or controls. While IS 900 and IS 1100 coatings showed the least diatom biofouling, coatings F10-F14 showed less or similar biofouling than several controls such as A4, T-10, and IS 700. The release of diatom film was evaluated at 10 psi and 20 psi water pressure levels, and a similar trend was observed in both scenarios. At 20 psi (FIG. 13), the results indicated two differing trends for systems depending on the type of the crosslinker used. For PACM-cured systems, coatings F1-F3 with the least amount of amphiphilic chains of PEG and PMDS at 5 wt. % demonstrated a better or comparable release than several controls including hydrophobic A4, amphiphilic T-10, PU, and IS 700. Alternatively, 702B75-cured coatings F12 and F14 with amphiphilic chains higher than 10 wt. % exhibited a similar performance. These coatings (F1-F3, F12, and F14) offered better performance than several commercial controls such as T2, PU, and IS 700, but not as well as the output of IS 900 and IS 1100 coatings. Overall, it can be summarized that several AmpSiGC coatings offer a promising performance better than both internal control coatings and several commercial systems.

Figure 14:
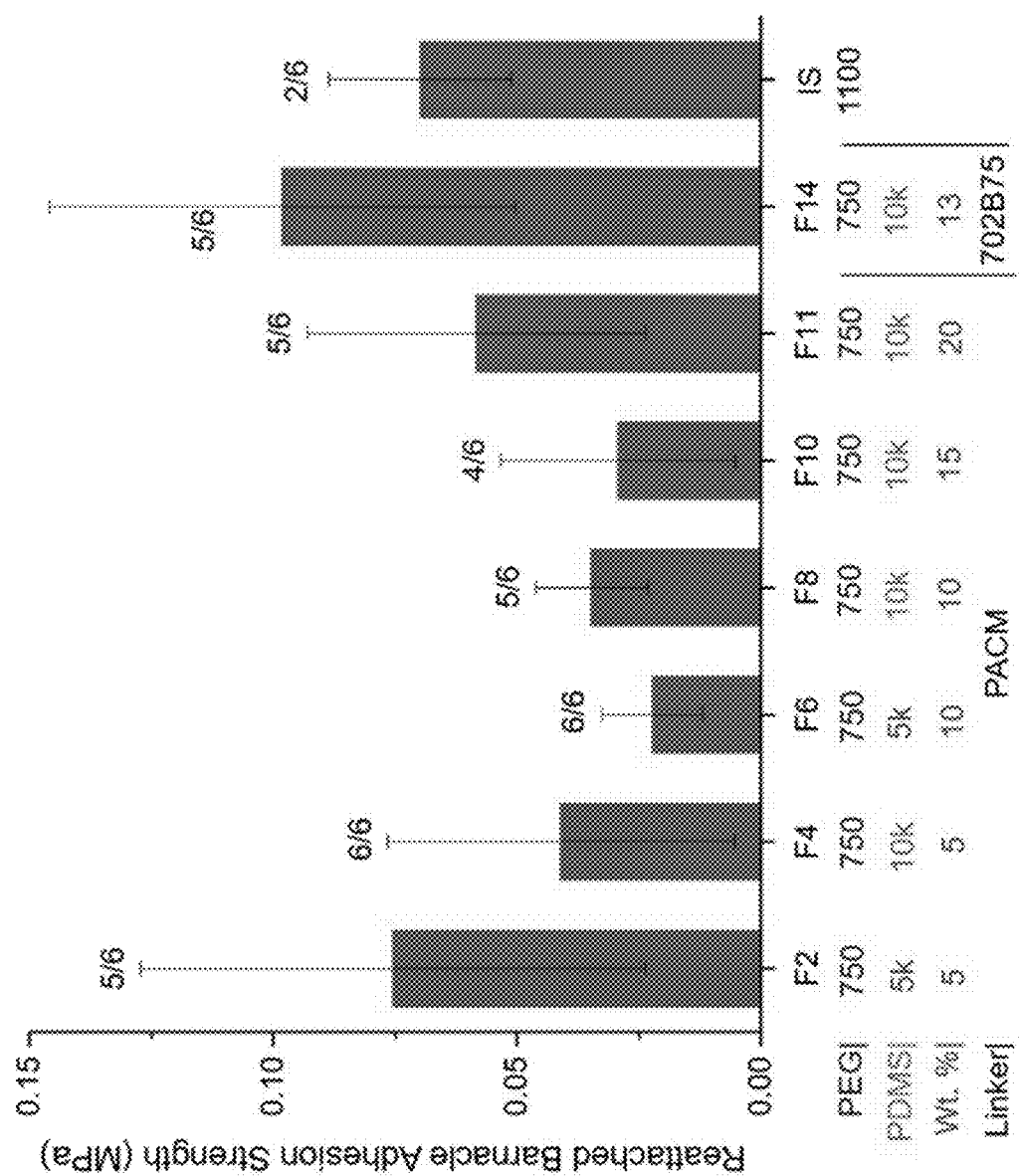
FIG. 14 shows the reattached barnacle (*A. Amphitrite*) adhesion strength data. Six barnacles were used for each reattachment. The number of attached barnacles out of six is labeled as a ratio for each system. Each bar shows the average adhesion strength based on the number of successfully reattached barnacles. The X-axis is labeled to specify the formulations and its components including PEG MW, PDMS MW, wt. % of PEG and PDMS, and crosslinker type.

A macrofouling organism, barnacle is another major macrofoulant organism that cause severe biofouling on a surface. Lejars et al., *Chem. Rev.* 2012, 112 (8), 4347-4390; Aldred et al., *The Journal of Bioadhesion and Biofilm Research Online*) *Journal* 2010, ISSN homepage, 892-7014; Tan et al., *Polym. Chem.* 2010, 1, 276-279. There are several types of barnacles and differences in their surface affinities for fouling imposes it challenging to introduce a conclusive rule about barnacles' general behavior (i.e., preference of hydrophilic vs hydrophobic surfaces). Stafslien et al., *J. Coating. Tech. Res.* 2012, 9 (6), 651-665; Rittschof et al., *Biofouling* 2008, 24 (1), 1-9; Huggett et al., *Biofouling* 2009, 25 (5), 387-399; Rittschof et al., *Sci. Mar.* 1989, 53 (2), 411-416; Di Fino et al., *Biofouling* 2014, 30 (2), 143-152; Petrone et al., *Biofouling* 2011, 27 (9), 1043-1055; Aldred et al., *Biofouling* 2019, 35 (2), 159-172; Gatley-Montross et al., *Biointerphases* 2017, 12 (5), 051003. Due to the limited availability of barnacles, several coatings out of the 14 formulations were selected to be assessed to include features of all the designed coatings. While AmpSiGC coatings hosted most of the reattached barnacles (probably due to higher hydrophilic domains on the surface), but they mostly showed better barnacle release than the IS 1100 commercial control, suggesting the amphiphilic systems function desirably as fouling-release (FR) surfaces (FIG. 14). Galhenage et al., *J. Coating. Tech. Res.* 2017, 14 (2), 307-322; Galhenage et al., *ACS Appl. Mater. Interfaces* 2016, 8 (42), 29025-29036. A closer analysis indicates that PACM-cured coatings with concentration of amphiphilic chains between 10-15 wt. % of PEG and PDMS offer desirable performance. However, the amphiphilic amounts lower and higher than this range perform slightly worse, yet better than the commercial control. Also, PACM-cured F14 coating performed better than 702B75-cured F11 coating (both systems contained the highest amount of amphiphilicity in their category), correlating with previous data that the crosslinker impacts FR output. Overall, it can be summed up that systems with PACM crosslinker, 10,000 $\overline{M}_n$ PDMS, 750 $\overline{M}_n$ PEG, and amphiphilicity between 10-15 wt. % provide a desirable performance against barnacles. Analysis of variance (ANOVA) was conducted on the data of barnacles, and the tabulated data was considered as a completely randomized design. The results indicated there was not a significant difference between the mean of performance of these coatings, attributed to the fluctuating standard deviations.

5.2 Anti-Icing Coatings

5.2.1 Contact Angle

Figure 15:
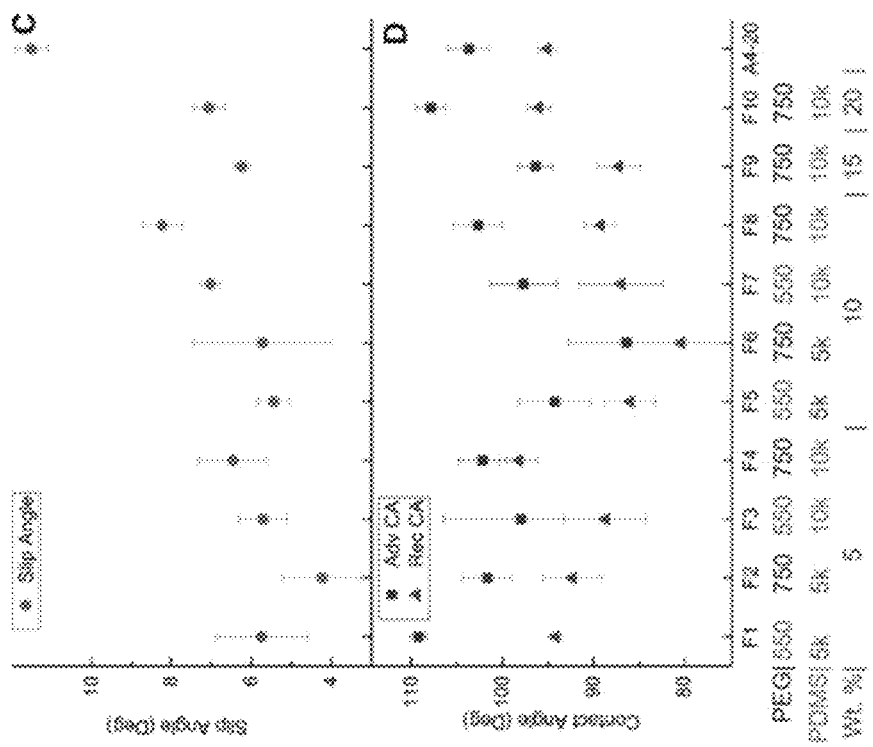
FIG. 15 shows the contact angle data for the AmpSiGC anti-icing coatings.
Figure 15:
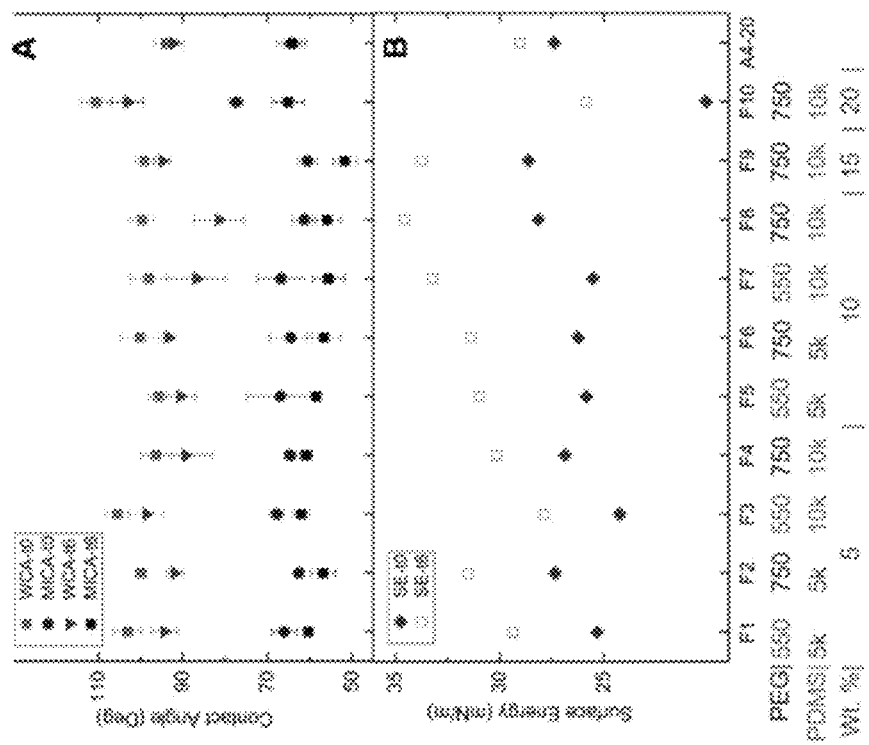

Contact angle data offered insights about the amphiphilic nature of the developed anti-icing coating systems (FIG. 15). Coatings showed a dynamic nature over time (FIG. 15A), displaying changing angles for both water contact angle (WCA) and methylene iodide contact angle (MICA). WCAs decreased for all studied coatings as a function of time, resulting from the swelling of available PEG chains on the surface that allowed the water droplet to spread more. In contrast, the A4-20 hydrophobic control coating did not exhibit such dynamic nature, supporting further the amphiphilic nature of the studied coatings. Coating F10 showed the highest WCA and MICA among coatings that can be attributed to its composition, containing the highest PEG and PDMS amount. Varying the chain length of PEG and PDMS did not seem to result in a considerable difference on WCAs and MICAs of the AmpSiGC coatings. Surface energy values for the coatings lie within ~25-35 mN/m for most of the coatings (FIG. 15B). It is noticeable that as WCA and MICA decrease over time for a coating, its surface energy value increased. The change in surface energy was higher for coatings that contain more than 5 wt. % PEG and PDMS. Slip angle for water droplet decreased for AmpSiGC coatings compared to the A4-20 hydrophobic coating, indicating that a water droplet rolls off the surfaces at a lower tilt (FIG. 15C). The tilting angle for the experimented coatings was within 4-8 degrees. The slip angles tend to slightly increase for coatings when the amount of PEG and PDMS increases in a formulation. Advancing and receding contact angles demonstrated the AmpSiGC coatings mostly have a hysteresis less than 10 degrees that are comparable to the A4-20 hydrophobic system (FIG. 15D). The hysteresis typically drops with decreasing contact angles as the F6 coating displays. The low slip angles as well as the small values of hysteresis indicated the smoothness of the surfaces and their ability to repel objects from their surfaces, while the hydrophobic A4-20 lagged in this perspective.

5.2.2 Ice Adhesion

Figure 16:
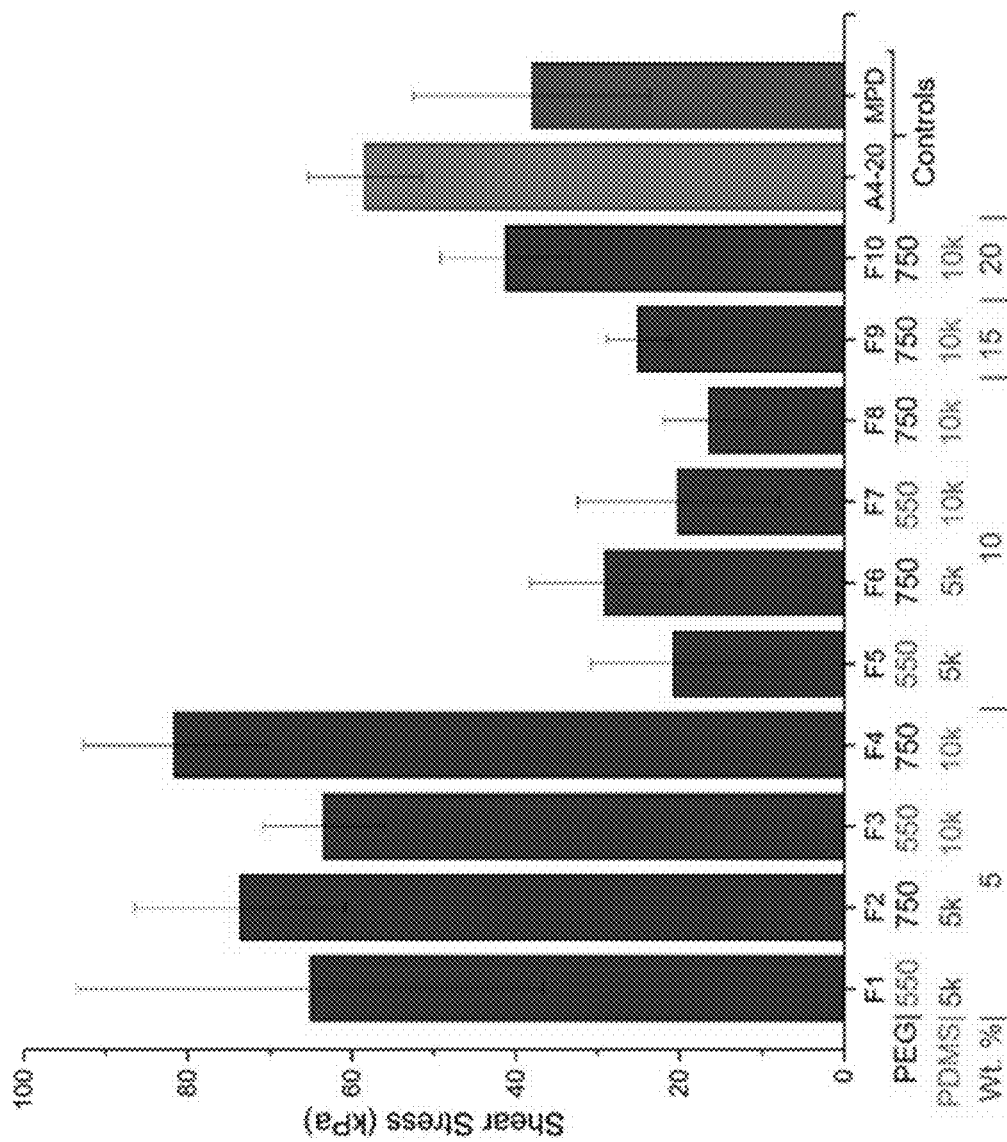
FIG. 16 shows the icephobic performance of the AmpSiGC anti-icing coatings. The measurements of average of 9 replicates with error bar representing the standard deviation. X-axis is labeled to specify the formulation and its components including PEG MW, PDMS MW, and wt. % of PEG and PDMS.

Ice adhesion measurements in FIG. 16 display the average required shear force (average of 9 samples) to dislocate ice from the surface of the evaluated coatings. The higher force required to remove ice, the weaker is icephobic performance of a coating. As theorized, the presence of PDMS and PEG at the interface affected the ice adhesion. The figure shows that ice adhesion had a higher affinity on formulations with 5 wt. % PEG and PDMS (Coatings F1-F4) than formulations with higher amounts of PEG and PDMS. Considering PDMS MW as a constant, PEG-550-containing coatings showed slightly better icephobic properties than the ones that have PEG 750 $\overline{M}_n$, comparing coatings F1 vs F2, F3 vs F4, and F5 vs F6. Also, changes to the MW of PDMS offered a slight impact on icephobic properties, contrasting coatings of PDMS 5000 $\overline{M}_n$ and PDMS 10,000 $\overline{M}_n$. The amount of amphiphilic prepolymers did influence the anti-icing properties where the presence of 10 wt. % or higher PEG and PDMS in a system delivers more desirable performance. Coatings F5-F9 not only demonstrated better performance against other studied coatings (F1-F4, F10) but also showed promising performance against the selected internal and commercial controls.

Analysis of variance (ANOVA) of formulations F1-F8 for the 23 factorial design validated that weight percent of prepolymers in a system significantly influences icephobic performance (P-value<0.05) while differences in MW of PDMS and PEG does not significantly contribute to such property (P-value>0.05). Additionally, cell-mean model ANOVA considered the ten formulations as a completely randomized design in order to compare the mean icephobic performance of the coatings. Overall, the comparison of means indicates coatings F5-F10 possess a significantly different icephobic performance than coatings F1-F4 (comparison P-values<0.05, Tukey's method). Coatings F1-F4 have 5 wt. % PEG and PDMS while Coatings F5-F10 contain 10 wt. % or higher PEG and PDMS. However, anti-icing property of formulations within each set are not significantly different (F1-F4 compared separately and F5-F10 compared separately). Dunnett's test suggest that there are several coatings that offer significantly better performance than the A4-20 control, including coatings F5, F6, F7, F8, and F9 (comparison P-value<0.05). The statistical analysis confirmed that the amount of PEG and PDMS in the system influences the performance and concluded there are several formulations that offer significantly desirable icephobic performance.

5.2.3 XPS

Figure 17:
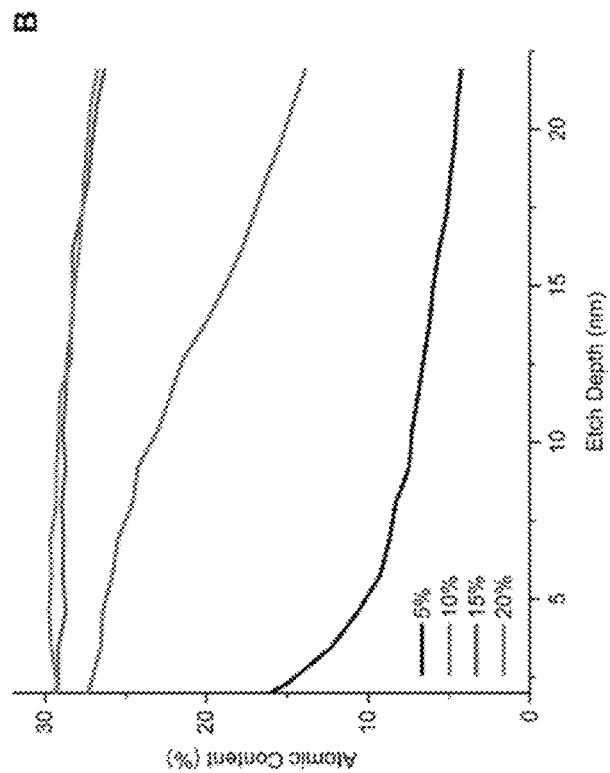
FIG. 17 shows the XPS data for the AmpSiGC anti-icing coatings.
Figure 17:
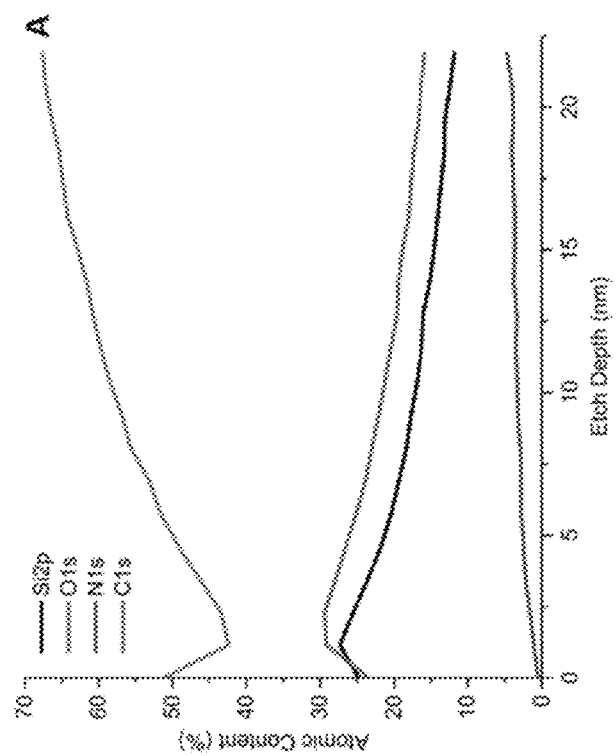

XPS was used to characterize the elemental composition of incorporated materials for both depth and surface analysis. XPS depth profiling supported the self-stratification for all coating formulations. Galhenage et al., *ACS Appl. Mater. Interfaces* 2016, 8 (42), 29025-29036. FIG. 17A shows the depth profiling XPS data for coating F8, 10%-10 kPDMS-750PEG formulation. The data conveys that Si and O atoms were dominant on the surface and their concentration started to decrease after 3 nm thickness while the concentration of C increased. This data is supportive of self-stratification behavior: PDMS-containing materials self-stratified to the surface to offer icephobic properties and the remaining materials remained in the bulk to offer adhesion and strength. Furthermore, the depth profiling analysis showed that the concentration of PDMS-containing materials on the surface and bulk directly depended on the incorporated amount of prepolymers. FIG. 17B highlights the depth profiling XPS data for coatings F4, F8, F9, and F10 containing 10 kPDMS-750PEG prepolymer at 5, 10, 15, and 20 wt. %, respectively. Once the incorporated amount was at 15% or higher, the PDMS-containing prepolymers occupied the surface and extended their presence into the bulk of coating. Therefore, the XPS analysis offers some insights that coatings with 10 wt. % or higher PEG and PDMS potentially possess more of such chains on the surface that contribute to the desired icephobic performance of the coatings (FIG. 16).

5.2.4 ATR-FTIR

Figure 18:
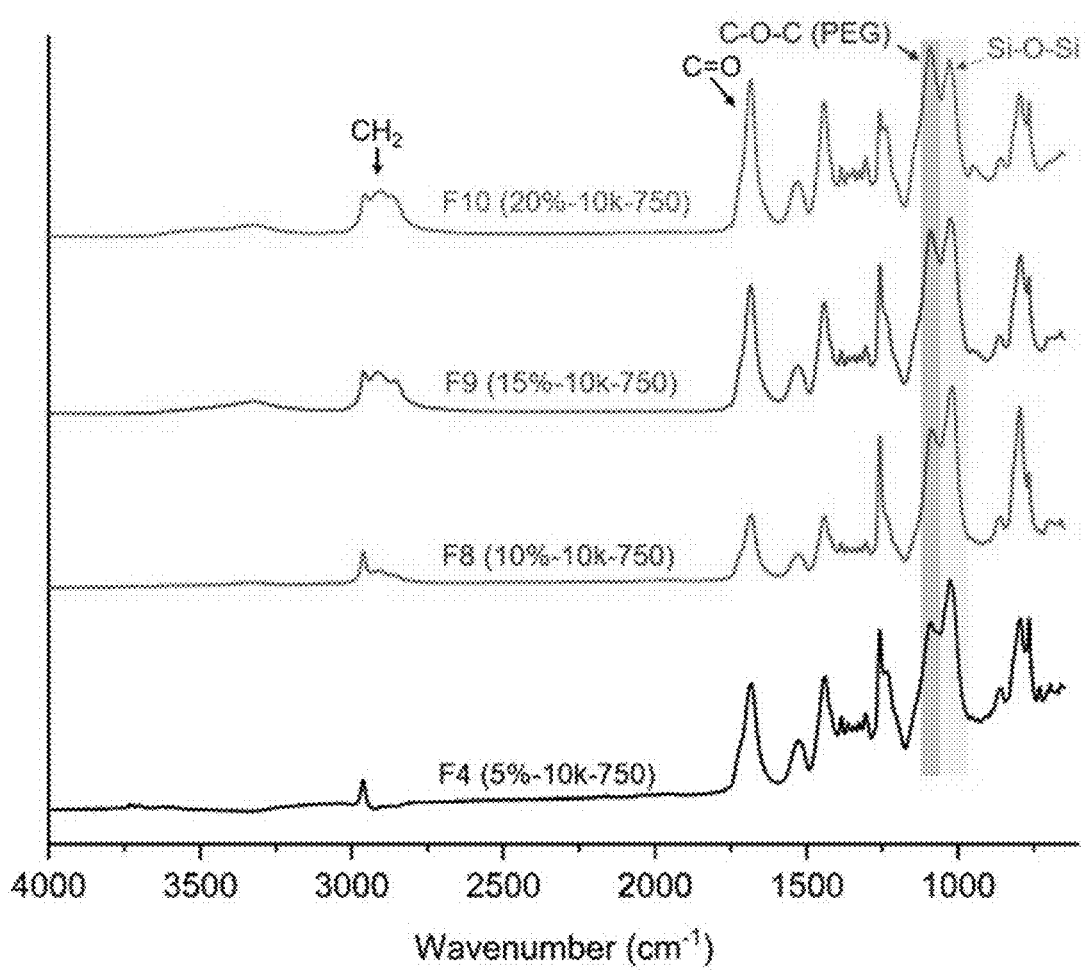
FIG. 18 shows the ATR-FTIR for the AmpSiGC anti-icing coating F4, F8, F9, and F10 containing 10 kPDMS-750PEG prepolymer in their composition at 5, 10, 15, and 20 wt. %, respectively.

ATR-FTIR qualitatively assessed the surface composition of the studied coatings. All the coatings exhibited a similar spectrum. FIG. 18 illustrates the ATR-FTIR for coating F4, F8, F9, and F10 that contain 10 kPDMS-750PEG prepolymer in their composition at 5, 10, 15, and 20 wt. %, respectively. The spectra of all coatings show the presence of both siloxane (—Si—O—Si—) at ~1030 cm$^{-1}$ (FIG. 18—highlighted green) and ether of PEG (—C—O—C—) at ~1105 cm$^{-1}$ (FIG. 18—highlighted red) on the surface. It was noted that the intensity of the ether peak increased as the amount of prepolymer increased, indicating a direct correlation among peak intensity and amount of prepolymer. Also, the peak of hydroxyl (—OH) as a result of crosslinking of epoxy groups and peak of secondary amine (—NH—) for the glycidyl carbamate (urethane) linkage were overlapped at ~3350 cm 1.

5.2.5 AFM Images

Figure 8:
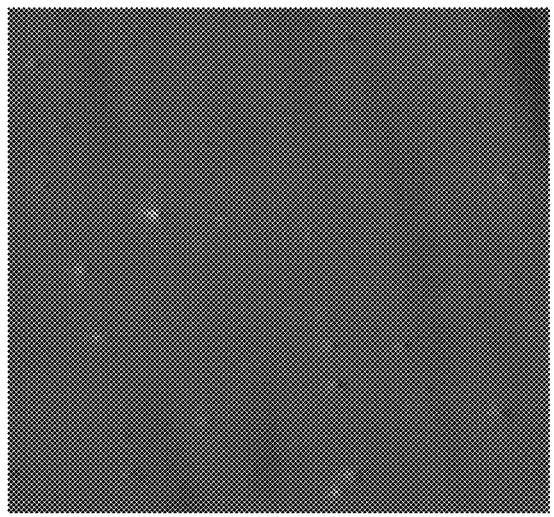
FIG. 8 shows the A4-20 Control Coating Phase Image.
Figure 19:
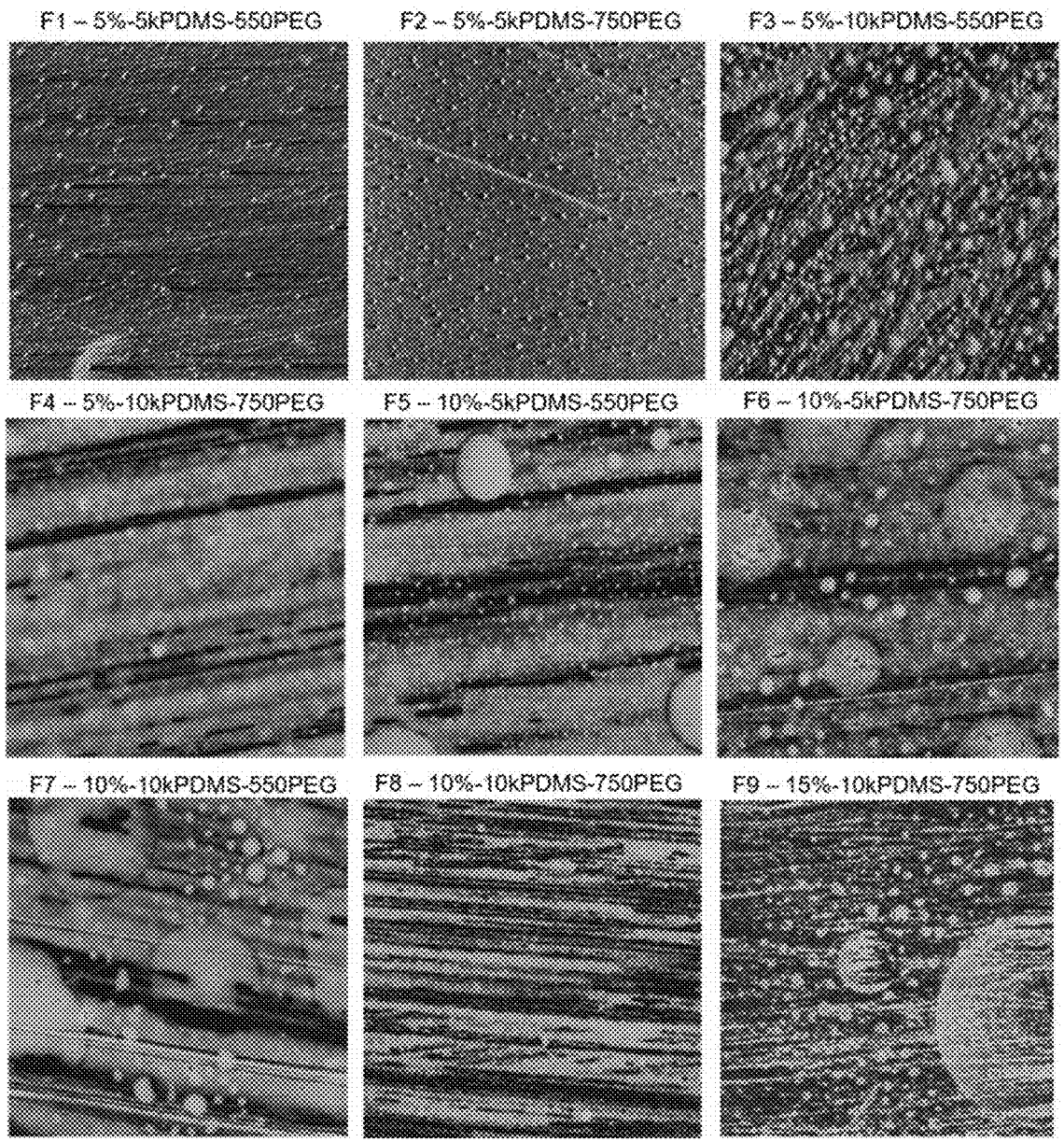
FIG. 19 shows the AFM phase images of the AmpSiGC anti-icing coatings. Each image is for an area of 100 μm×μm. Each label reflects the coating number and composition of an image.
Figure 20:
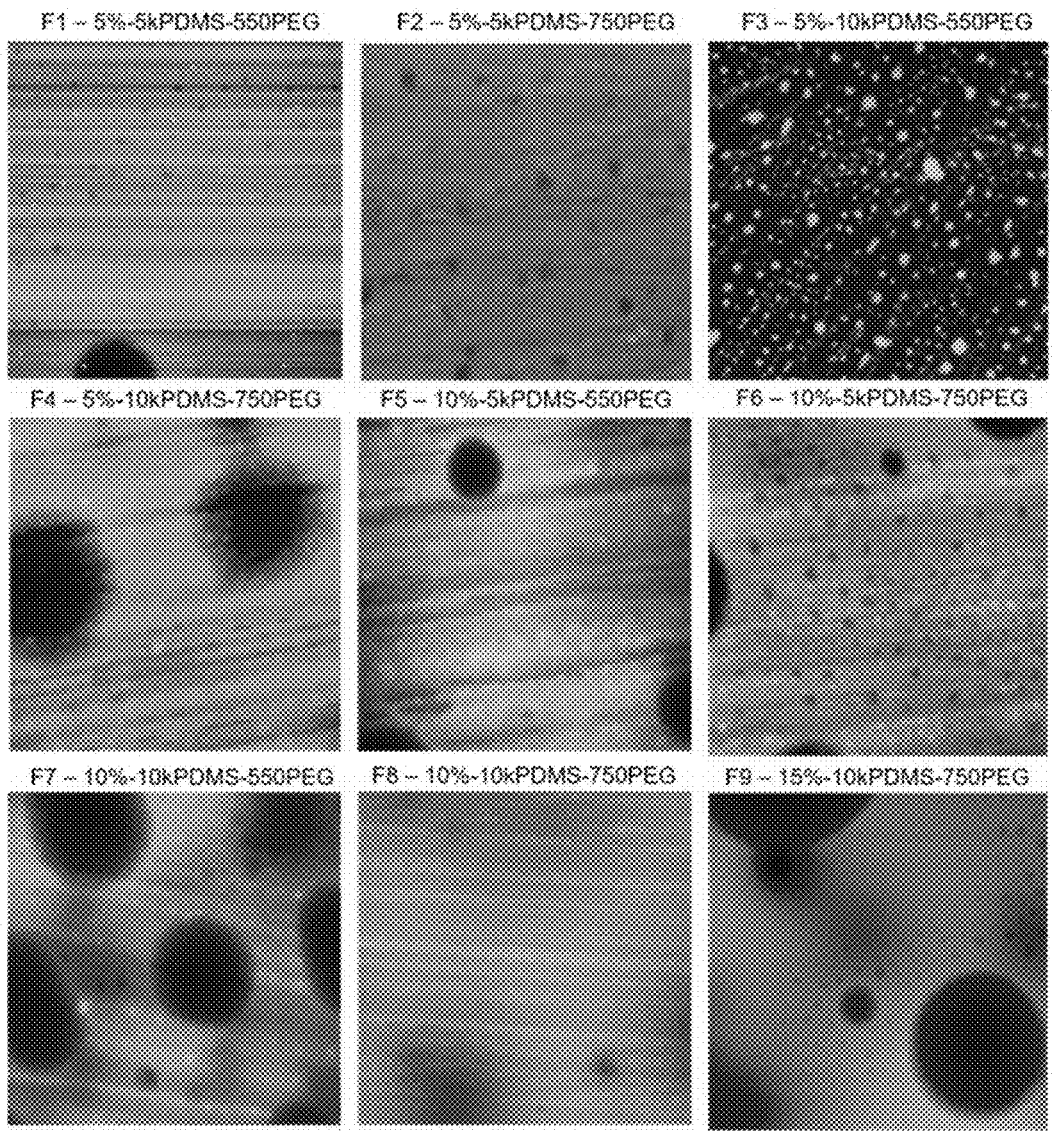
FIG. 20 shows the AFM Height Images for the AmpSiGC anti-icing coatings. Each image is for an area of 100 μm×μm. Each label reflects the coating number and composition of an image.

AFM was used to study the surfaces of the coatings: FIG. 19 illustrates phase images and FIG. 20 shows height images. Generally, soft materials like PDMS contribute to high phase angles and appear lighter while harder materials result in low phase angles and appear darker. AmpSiGC coatings exhibited distinguishable heterogenous patterns on their surface, a distinctive sign of amphiphilicity (Galhenage et al., *J. Coating. Tech. Res.* 2017, 14 (2), 307-322), in contrast to the hydrophobic A4-20 control system where its surface consists solely of PDMS (Bodkhe et al., *J. Coating. Tech. Res.* 2012, 9 (3), 235-249) (FIG. 8). Coatings F4-F9 have distinctive domains on the surface that are well-distributed throughout the scanned area, varying in size from small to large. While coatings F1-F4 also possess such domains, the number of domains and their size appears to be lower than coatings F5-F9. Coatings that contain 10,000 $\overline{M}_n$ PDMS and 750 $\overline{M}_n$ PEG (i.e., F4 and F8) have more stretched lines than coatings with lower MWs of PDMS and PEG such as F3 and F5. Also, coatings with higher MW of PDMS show larger domains than lower MW PDMS such as F7 and F5, respectively. Available domains on a surface appear to be mostly uniform in size for each formulation. AFM image for coating F10 could not be captured due to its surface limitations. Overall, the AFM images support that coatings containing 10 wt. % or higher PEG and PDMS have surfaces with appreciably higher domains and more heterogeneity on their surfaces. Thus, it is likely that the heterogenous amphiphilic surface of the coatings contributes to their icephobic properties.

5.2.6 Water Absorption and Barrier Properties

Figure 21:
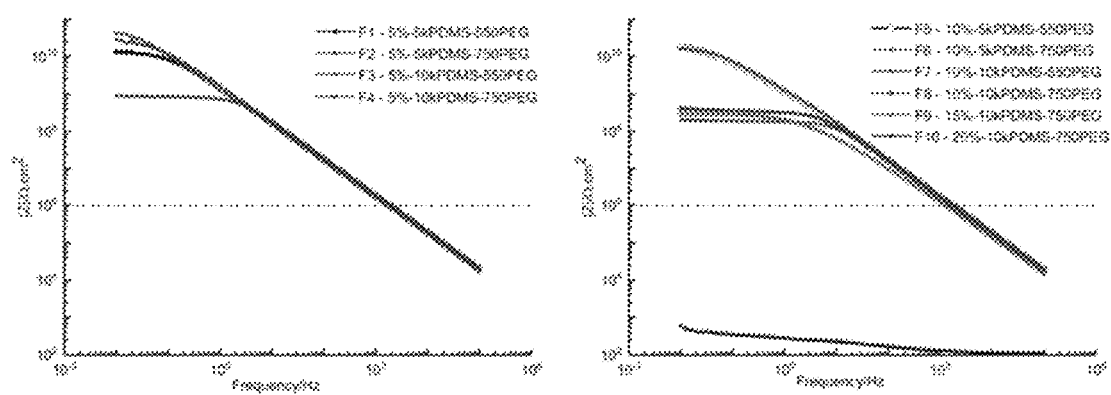
FIG. 21 shows the multifrequency EIS Bode modulus plots for the AmpSiGC anti-icing coatings. Each plot is labeled to address the composition of coating.

The presence of hydrophilic moieties like PEG in an amphiphilic system may be considered as a component that could cause swelling of a coating due to water absorption, reducing barrier properties of the coating, while in contrast the PDMS component can create a hydrophobic barrier. To this effect, EIS experiments assessed stability, barrier performance and amount of water absorption. Multi-frequency EIS (MF-EIS) quantified barrier properties, whereas single-frequency EIS (SF-EIS) determined the amount of water absorption for each coating. Upadhyay et al., *J. Coating. Tech. Res.* 2013, 10 (6), 865-878; Deflorian et al., *Electrochimica Acta* 1999, 44 (24), 4243-4249; Bellucci et al., *Corrosion* 1993, 49 (3), 235-247; Bierwagen et al., *Prog. Org. Coat.* 2003, 46 (2), 149-158. After 48 hours exposure to 3.5% NaCl aqueous solution, all coatings except F10 showed frequency impedance higher than 106 $\Omega cm^{-2}$ (FIG. 19), indicating coatings with good to excellent properties. Bierwagen et al., *Prog. Org. Coat.* 2000, 39 (1), 67-78. Plots in FIG. 21 indicate that the amount of hydrophilic content has a direct effect on the impedance of coatings. Coating F1-F4 with least amount of PEG (5 wt. %) exhibited higher impedance frequency than coatings that contained more PEG such as F5-F8 (10 wt. % PEG) and F9 (15 wt. %). This data shows the presence of 20 wt. % in the F10 system negatively affected its barrier properties, resulting in the lowest impedance frequency. Visually, coating F10 was swollen and readily delaminated after the EIS experiments ended.

Figure 22:
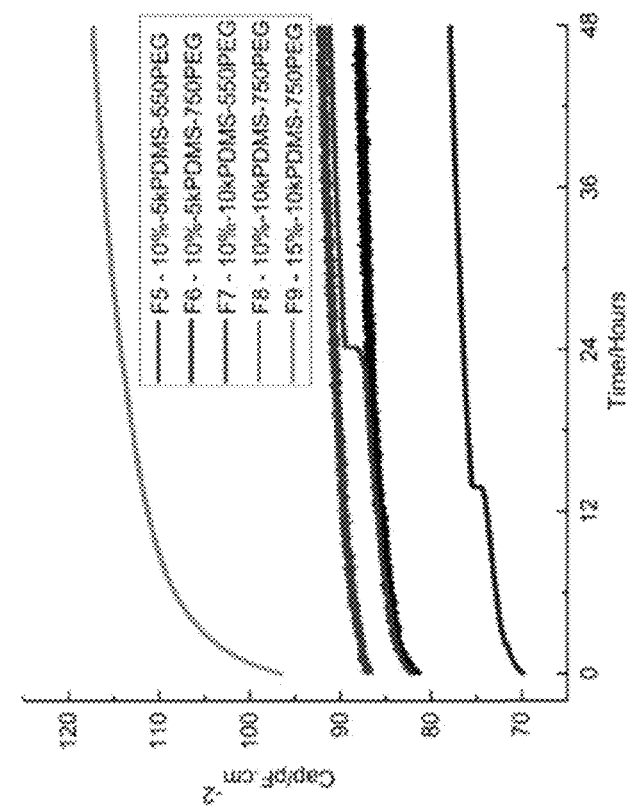
FIG. 22 shows the capacitance values for the AmpSiGC anti-icing coatings until 48 hours exposure to 3.5% NaCl aqueous solution. Each plot is labeled to address the composition of coating.
Figure 22:
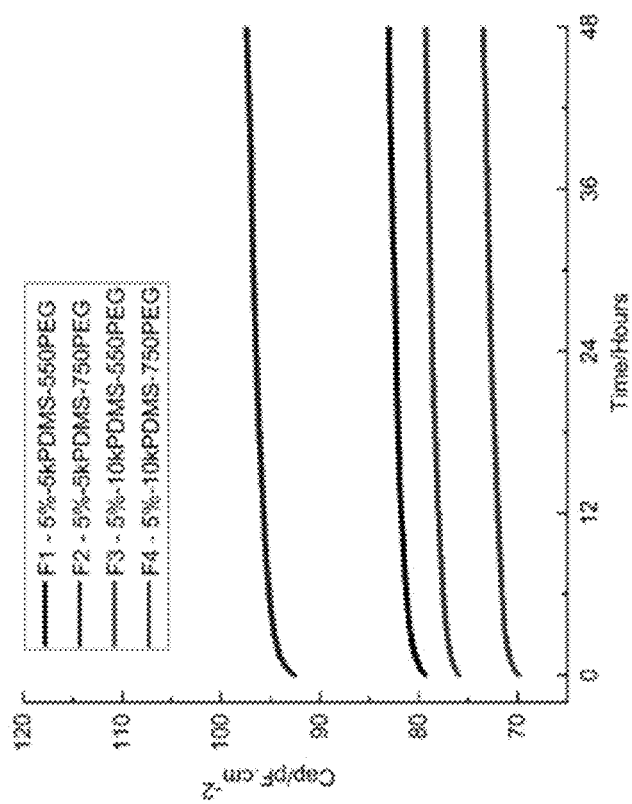
Figure 23:
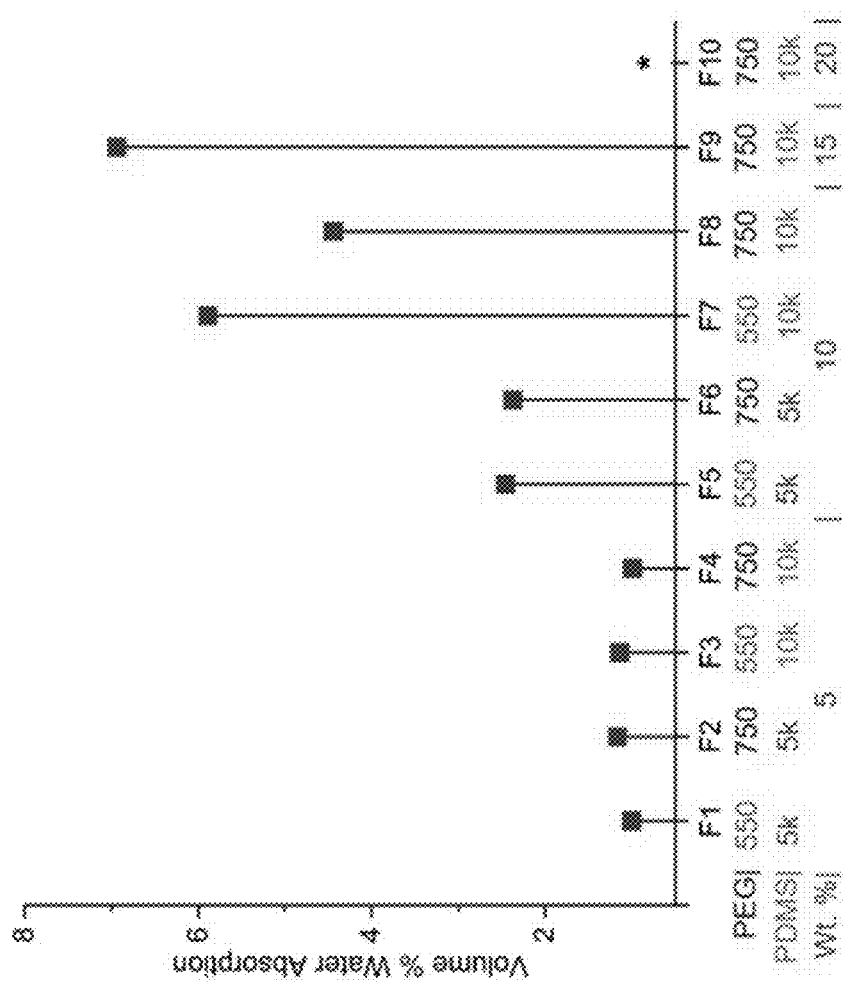
FIG. 23 shows the volume of water absorbed by the AmpSiGC anti-icing coatings after 48 hours exposure to 3.5% NaCl aqueous solution. X-axis is labeled to specify the formulation and its components including PEG MW, PDMS MW, and wt. % of PEG and PDMS. * F10 coating value was 98%—it was not plotted to design a scaled graph.

Utilizing the SF-EIS data and the Brasher-Kingsbury equation (Brasher et al., J. Appl. Chem. 1954, 4 (2), 62-72), the capacitance values of the coatings were calculated and plotted in FIG. 22 (as coating F10 swelled due to its highly hydrophilic nature, its data was not reliable for plotting purposes). As seen from this figure, all the coatings demonstrated almost complete saturation after 48 hours immersion. Comparing the initial capacitance and final capacitance values for each coating, it is noticeable that coatings F1-F4 showed the least changes in comparison to coatings F5-F9. Translating the capacitance data to volume fraction of water in a coating system (FIG. 23), coatings F1-F4 with 5 wt. % of amphiphilic prepolymers absorbed ~1% water, the least amount among all coatings. The water absorption for these coatings is like the water uptake for the A4-20 control system which is around 1% as well. Upadhyay et al., Prog. Org. Coat. 2017, 112, 191-199. As the hydrophilic PEG content in a system was increased, the amount of absorbed water also increased. Coatings with 10 wt. % PEG absorbed between ~2.5%-6% (FIG. 21), where coatings with 750 $\overline{M}_n$ PEG absorbed more water than 550 $\overline{M}_n$ PEG. Expectedly, coating F9 with 15 wt. % water allowed diffusion of up to 7% water. However, coating F10 absorbed almost 100% water, resulting in complete failure (data was not plotted due to incomparable results). The EIS evaluations show that 15 wt. % is the highest concentration of hydrophilic content for AmpSiGC systems that can be utilized for icephobic purposes without compromising other properties such as protection against water permeation.

5.2.7 Mechanical Properties

Table 4 outlines the results for the mechanical tests that were used to evaluate the properties of the AmpSiGC coatings. Overall, the experimental coatings showed desirable mechanical properties. MEK double rub test qualitatively evaluated solvent resistance and extent of cross-link density for the formulations. All coatings showed stability against MEK organic solvent, tolerating more than 400 MEK double rubs without showing any defect signs or solvent penetration. Impact tests measured response of coatings under sudden force. Epoxy-based coatings are known to be brittle. However, it was noticed as amount of PEG and PDMS in a system increased, the coating withheld a higher impact force, attributed to the presence of added aliphatic chains—the major improvement can be observed for coatings F9 and F10 with 15 wt. % and 20 wt. % PEG and PDMS in their systems, respectively. Similarly, conical mandrel bend test showed that the flexibility of the coatings improved as the amount of PEG and PDMS increased in a system. For crosshatch adhesion test, all coatings displayed very good adhesion to the surface with less than 5-10% removal of the coating. As reported, more flexible coatings appear to have better icephobic properties. Beemer et al., *J. Mater. Chem. A* 2016, 4 (47), 18253-18258; Landy et al., *J. Colloid Interface Sci.* 1967, 25 (2), 231-244. The flexibility for AmpSiGC coatings arises from addition of PEG and PDMS.

Furthermore, Konig pendulum hardness (KPH) values relatively decreased as more PEG-PDMS based prepolymers were introduced to a system. As KPH measures hardness on the surface of coatings, it was expected that systems with higher amphiphilic moieties will have lower KPH values considering the low modulus and flexibility of PDMS. Alternatively, pencil hardness offered an insight about the hardness of coatings in bulk and it was observed that all coatings possessed a desired hardness more than 6H, except F10 with a hardness of 4H which was attributed to presence of amphiphilic moieties throughout the bulk of coating as XPS experiments suggested previously.

TABLE 4

Results of mechanical tests on AmpSiGC Coatings

| Formulation | MEK Double Rub (Number of rubs) | Front Impact (in-lb) | Reverse Impact (in-lb) | Conical Mandrel (mm) | Crosshatch Adhesion | König Pendulum Hardness (s) | Pencil Hardness |
|---|---|---|---|---|---|---|---|
| F1 | >400 | 16 | 12 | 130 | 4 B | 94 | 8 H |
| F2 | >400 | 20 | 16 | 110 | 5 B | 100 | 7 H |
| F3 | >400 | 20 | 12 | 130 | 5 B | 105 | 7 H |
| F4 | >400 | 24 | 12 | 120 | 4 B | 98 | 8 H |
| F5 | >400 | 32 | 16 | 45 | 5 B | 83 | 8 H |
| F6 | >400 | 36 | 20 | 60 | 5 B | 91 | 8 H |
| F7 | >400 | 40 | 16 | 40 | 5 B | 87 | 7 H |
| F8 | >400 | 32 | 8 | 75 | 5 B | 90 | 8 H |
| F9 | >400 | 60 | 8 | 25 | 5 B | 74 | 6 H |
| F10 | >400 | 142 | 24 | No Fail | 5 B | 34 | 4 H |

CONCLUSION

A new method to develop amphiphilic glycidyl-carbamate-based (urethane-based) coatings by converting the isocyanate groups of the IPDI trimer resin to epoxy functional groups and by introducing PEG and PMDS chains to the IPDI resin is disclosed. This facile synthesis may eliminate the presence of the isocyanate groups from the final product/formulation which may cause health hazards to a worker and coating variability due to environmental humidity.

Fouling-release formulations considered four factors of interest, including molecular weight of PDMS, molecular weight of PEG, amount of PEG and PDMS in a system, and effect of crosslinking agent. The surface characterization of the coatings indicated that the goal to have an amphiphilic surface was met. Contact angle measurements showed the presence of a dynamic amphiphilic surface in comparison to a hydrophobic system. ATR-FTIR showed the presence of PEG and PDMS signals on the surface. XPS displayed the occurrence of self-stratification of PDMS-based moieties in correlation with amount of incorporated amphiphilic prepolymers. Additionally, AFM confirmed the presence of heterogeneous domains on the surface that their presence was attributed due to the amphiphilic nature of the surface (the heterogeneous patterns were missing from the control hydrophobic system). In terms of application, the AmpSiGC coatings demonstrated desirable performance as amphiphilic fouling-release coatings. Considering the fouling-release performance of four studied biological assays, it was generally observed that systems with 15 wt. % or higher concentration of amphiphilic moieties on the surface demonstrate promising performance (better than internal/external standards) against *U. linza*, *C. lytica*, and barnacles, regardless of the crosslinking agent used. For *N. incerta* (diatom), the fouling-release performance was dependent on type of crosslinker which would determine the favorable amphiphilic amount to offer a relatively good performance. In conclusion, it can be summarized that design of amphiphilic siloxane-GC systems can be tuned for a desirable performance by considering the following factors: 1) A 10,000 $\overline{M}_n$ PDMS is favored over lower molecular weights of PDMS—this is in correlation with previously reported work (Bodkhe et al., *J. Coating. Tech. Res.* 2012, 9 (3), 235-249; Galhenage et al., *J. Coating. Tech. Res.* 2017, 14 (2), 307-322; Rasulev et al., *ACS Appl. Mater. Interfaces* 2017, 9 (2), 1781-1792); 2) A 750 $\overline{M}_n$ PEG offers relatively better performance than 550 $\overline{M}_n$ PEG; 3) Amounts of hydrophobic and hydrophilic moieties in a system affects the fouling-release performance—the preferred amount is between 10-15 wt. % or higher depending on type of utilized crosslinker; and 4) A crosslinker has remarkable impact on fouling-release performance.

The invention further discloses a new and facile was to develop novel amphiphilic glycidyl carbamate coatings with icephobic properties via the incorporation of amphiphilic prepolymers. Formulations were designed to assess icephobic contribution of PDMS MW, PEG MW, and amount of PEG and PDMS in the system. Surfaces of coatings showed a dynamic surface under contact angle measurements, indicating the presence of hydrophilic moieties on the surface. Also, XPS, ATR-FTIR, and AFM experiments confirmed self-stratification of amphiphilic moieties and heterogeneous domain-formation on the surfaces. XPS validated that higher amount of PEG and PDMS in a formulation results in higher concentration of these materials on the surface. AFM images indicated phase separation on the surface where microdomains for both soft and hard segments were evident. The AmpSiGC coatings demonstrated desirable anti-icing properties, utilizing the present amphiphilicity on their surfaces. For icephobic applications, coatings with 10 wt. % or higher PEG and PDMS exhibited better ice-deterring properties than internal and commercial controls. However, it was noticed via EIS experiments that there is an upper threshold for adding hydrophilic content in a system. EIS experiments showed all coatings with 15 wt. % or less PEG and PDMS content possess stability and barrier properties. Although a coating with 20 wt. % PEG and PDMS performed well for anti-icing applications, it lacked other properties such as blocking water permeation. All coatings underwent mechanical tests and displayed desirable performance; as the amount of PEG and PDMS increased in a system, the coatings had better flexibility and strength. Overall, it was concluded that AmpSiGC coatings with PEG and PDMS contents within 10-15 wt. % of solids offer outstanding anti-icing/icephobic performance as well as other desirable properties such as protectiveness against water permeation and mechanical integrity of films.

The claimed invention is:

1. A curable coating composition comprising:
   a) at least one glycidyl carbamate (GC) resin comprising the reaction product of:
      a1) at least one organic polyisocyanate, and
      a2) glycidol,
   b) at least one amphiphilic GC-functional prepolymer comprising the reaction product of:
      b1) at least one organic polyisocyanate,
      b2) glycidol, b3) at least one poly(ethylene glycol) methyl ether (mPEG), and
b4) at least one polydimethylsiloxane (PDMS), and
c) at least one curing agent.

2. The curable coating composition of claim 1, wherein the organic polyisocyanate a1) and b1) are, independent of one another, selected from the group consisting of aliphatic, cycloaliphatic, araliphatic, aromatic polyisocyanate, and mixtures thereof.

3. The curable coating composition of claim 2, wherein the organic polyisocyanate a1) and b1) are, independent of one another, selected from the group consisting of:

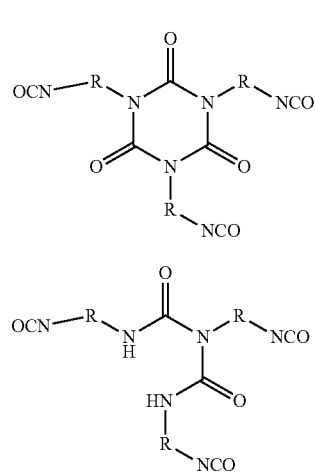

wherein R is independently an optionally substituted, divalent $C_1$-$C_{15}$ alkyl, an optionally substituted $C_3$-$C_{15}$ cycloalkyl, or a group selected from:

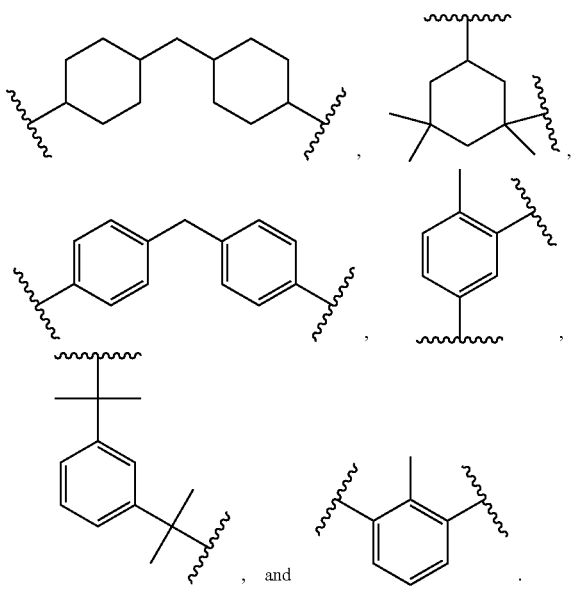

4. The curable coating composition of claim 1, wherein the organic polyisocyanate a1) and b1) are each an isophorone diisocyanate trimer.

5. The curable coating composition of claim 1, wherein the mPEG b3) has a molecular weight ranging from about 350 $\overline{M}_n$ to 20,000 $\overline{M}_n$ and is present in amount ranging from 0.01 to about 50 wt. %, based on the solid content of the amphiphilic GC-functional prepolymer, and the PDMS b4) has a molecular weight ranging from about 400 $\overline{M}_n$ to 50,000 $\overline{M}_n$ and is present in amount ranging from 0.01 to about 50 wt. %, based on the solid content of the amphiphilic GC-functional prepolymer.

6. The curable coating composition of claim 1, wherein the PDMS b4) is a monocarbinol-terminated PDMS.

7. The curable coating composition of claim 6, wherein the monocarbinol-terminated PDMS has the following structure:

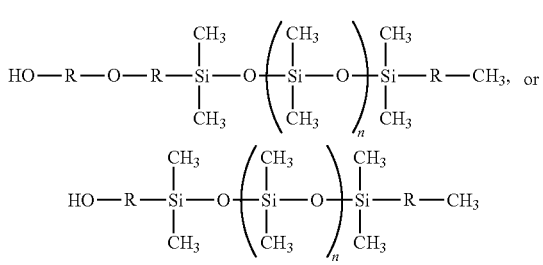

wherein R, independent of one another, is a $C_3$-$C_{12}$ straight chain alkyl or an alkylene ether;
wherein n ranges from 0 to about 270.

8. The curable coating composition of claim 1, wherein the curing agent is an amine functional curing agent.

9. The curable coating composition of claim 8, wherein the amine functional curing agent is selected from the group consisting of an amine crosslinker, a polyamide crosslinker, and mixtures thereof.

10. A cured coating composition, comprising the curable coating composition of claim 1.

11. A method for making the curable coating composition of claim 1, comprising:
reacting the at least one organic polyisocyanate, a1), with the glycidol, a2), to make the at least one GC resin, a),
reacting the at least one organic polyisocyanate, b1), with the glycidol, b2), the at least one mPEG, b3), and the at least one PDMS, b4) to make the at least one amphiphilic GC-functional prepolymer, b), and
mixing the at least one GC resin, a) and the at least one amphiphilic GC-functional prepolymer, b), with the at least one curing agent, c), to make the curable coating composition of claim 1.

12. A method for making a cured coating composition, comprising curing the curable coating composition of claim 1.

13. An article coated with the curable coating composition of claim 1.

14. The article of claim 13, wherein the curable coating composition is cured.

15. A fouling-release coating system, comprising the curable coating composition of claim 1.

16. A method for applying the fouling-release coating system of claim 15 on at least a part of the surface of a substrate.

17. A method for reducing or preventing biofouling of a surface exposed to an aqueous environment comprising the steps of:
coating the surface with the curable coating composition of claim 1 to form a coated surface, and
curing the coating composition on the coated surface.

18. An anti-icing coating system, comprising the curable coating composition of claim 1.

19. A method for applying the anti-icing coating system of claim 18 on at least a part of the surface of a substrate.

20. A method for reducing or preventing icing of a surface exposed to an aqueous environment comprising the steps of:
coating the surface with the curable coating composition of claim 1 to form a coated surface, and
curing the coating composition on the coated surface.

21. The curable coating composition of claim 4, wherein, in the reaction to make the GC resin, the isophorone diisocyanate is reacted with glycidol in a 1:1 ratio of NCO:OH groups, wherein, in the reaction to make the amphiphilic GC-functional prepolymer, the glycidol functionalizes about 33.3% of the NCO groups in the isophorone diisocyanate are functionalized by the glycidol and about 66.6% of the NCO groups in the isophorone diisocyanate are converted to urethane linkages by attached of the chains of the mPEG and PDMS.

22. The curable coating composition of claim 21, wherein the stoichiometric ratio of epoxy groups present in the GC resin and amphiphilic GC-functional prepolymer and amine hydrogen groups present in the amine functional curing agent ranges from about 1:0.1 to about 1:3.

23. The curable coating composition of claim 4, wherein, in the reaction to make the GC resin, the isophorone diisocyanate is reacted with glycidol in a 1:1 ratio of NCO:OH groups, wherein, in the reaction to make the amphiphilic GC-functional prepolymer, the ratio of stoichiometric equivalents of NCO:OH groups of glycidol+PDMS+mPEG is 1:1.

24. The curable coating composition of claim 23, wherein the stoichiometric ratio of epoxy groups present in the GC resin and amphiphilic GC-functional prepolymer and amine hydrogen groups present in the amine functional curing agent ranges from about 1:0.1 to about 1:3.

25. The curable coating composition of claim 1, wherein:
the organic polyisocyanate a1) and b1) are, independent of one another, selected from the group consisting of aliphatic, cycloaliphatic, araliphatic, aromatic polyisocyanate, and mixtures thereof;
the mPEG b3) has a molecular weight ranging from about 350 $\overline{M}_n$ to 20,000 $\overline{M}_n$ and is present in amount ranging from about 0.01 to about 50 wt. %, based on the solid content of the amphiphilic GC-functional prepolymer;
the PDMS b4) is a monocarbinol-terminated PDMS having a molecular weight ranging from about 400 $\overline{M}_n$ to 50,000 $\overline{M}_n$ and is present in amount ranging from 0.01 to about 50 wt. %, based on the solid content of the amphiphilic GC-functional prepolymer; and
the curing agent is an amine functional curing agent.

26. The curable coating composition of claim 25, wherein:
the organic polyisocyanate a1) and b1) are, independent of one another, selected from cycloaliphatic polyisocyanates;
the mPEG b3) has a molecular weight ranging from about 550 $\overline{M}_n$ to 750 $\overline{M}_n$ and is present in amount ranging from about 5 to about 20 wt. %, based on the solid content of the amphiphilic GC-functional prepolymer;
the PDMS b4) is a monocarbinol-terminated PDMS having a molecular weight ranging from about 5,000 $\overline{M}_n$ to 10,000 $\overline{M}_n$ and is present in amount ranging from about 5 to about 20 wt. %, based on the solid content of the amphiphilic GC-functional prepolymer; and
the amine functional curing agent is selected from the group consisting of an amine crosslinker, a polyamide crosslinker, and mixtures thereof.

\* \* \* \* \*